US010331569B2

(12) United States Patent
Florea et al.

(10) Patent No.: US 10,331,569 B2
(45) Date of Patent: *Jun. 25, 2019

(54) PACKET ROUTER BUFFER MANAGEMENT

(71) Applicant: Friday Harbor LLC, New York, NY (US)

(72) Inventors: Michael Florea, Lake Forest, CA (US); Silvestre Yrra, Chula Vista, CA (US); Jerome Vincent Coffin, San Diego, CA (US)

(73) Assignee: Friday Harbor LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/265,297

(22) Filed: Sep. 14, 2016

(65) Prior Publication Data

US 2017/0195248 A1 Jul. 6, 2017

Related U.S. Application Data

(60) Provisional application No. 62/275,149, filed on Jan. 5, 2016.

(51) Int. Cl.
*H04L 12/28* (2006.01)
*G06F 12/10* (2016.01)
(Continued)

(52) U.S. Cl.
CPC ............ *G06F 12/10* (2013.01); *G06F 12/109* (2013.01); *G06F 12/1081* (2013.01);
(Continued)

(58) Field of Classification Search
CPC ...................................................... H04J 12/56
(Continued)

(56) References Cited

U.S. PATENT DOCUMENTS 4,920,487 A  4/1990 Baffes
6,189,093 B1  2/2001 Ekner
(Continued)

FOREIGN PATENT DOCUMENTS

GB          2457309          8/2009

OTHER PUBLICATIONS

"Routing Lookups in Hardware at Memory Access Speeds" by P. Gupta, S. Lin, and N. McKeown, IEEE Infocom '98—Proceedings of the Seventeenth Annual Joint Conference of the Computer and Communications Societies, vol. 3, pp. 1240-1247, IEEE 1998.
(Continued)

*Primary Examiner* — Dang T Ton
(74) *Attorney, Agent, or Firm* — Sheppard Mullin Richter & Hampton LLP

(57) ABSTRACT

A router that requests a reservation for an egress port prior to dequeuing a received packet. A reservation is granted only if there is space on the egress port for at least a maximum size packet. An ingress processor requests allocation of a packet buffer. An allocator grants the packet buffer, but if there are fewer than a threshold number of buffers available, the ingress processor will not accept the grant unless the received packet is to be routed to a port inside the device comprising the router. This conserves the packet buffer(s) for packets destined for locations within the device. After a reservation is obtained and a packet buffer has been accepted, the ingress processor begins dequeuing a received packet from an ingress port queue to the buffer, and provides an identifier of the buffer to an egress processor. The identifier is enqueued by the egress processor. After the identifier is dequeued, the egress processor copies the packet from the buffer to an egress queue and releases the buffer. The buffer can be released prior to completion of the data being copied.

19 Claims, 28 Drawing Sheets

(51) Int. Cl.

| | | |
|---|---|---|
| *H04L 12/863* | (2013.01) | |
| *H04L 12/911* | (2013.01) | |
| *H04L 29/06* | (2006.01) | |
| *H04L 12/913* | (2013.01) | |
| *H04L 12/937* | (2013.01) | |
| *H04L 12/935* | (2013.01) | |
| *H04L 12/931* | (2013.01) | |
| *H04L 12/721* | (2013.01) | |
| *H04L 12/741* | (2013.01) | |
| *G06F 12/1081* | (2016.01) | |
| *G06F 12/109* | (2016.01) | |

(52) U.S. Cl.
CPC ............ *H04L 45/566* (2013.01); *H04L 45/74* (2013.01); *H04L 47/627* (2013.01); *H04L 47/724* (2013.01); *H04L 47/726* (2013.01); *H04L 49/254* (2013.01); *H04L 49/3027* (2013.01); *H04L 49/70* (2013.01); *H04L 69/22* (2013.01); *G06F 2212/1016* (2013.01); *G06F 2212/152* (2013.01); *G06F 2212/657* (2013.01)

(58) Field of Classification Search
USPC ........................................................ 370/401
See application file for complete search history.

(56) References Cited

U.S. PATENT DOCUMENTS

| | | |
|---|---|---|
| 6,917,553 B2 | 7/2005 | Mizugaki |
| 7,006,536 B1 | 2/2006 | Somashekhar |
| 7,221,678 B1 | 5/2007 | Hughes |
| 7,729,239 B1 | 6/2010 | Aronov |
| 8,219,778 B2 | 7/2012 | Palladino |
| 8,655,815 B2 | 2/2014 | Palmer |
| 8,848,726 B1 | 9/2014 | Palmer |
| 8,954,721 B2 | 2/2015 | Amann |
| 2002/0144078 A1 | 10/2002 | Topham |
| 2003/0229662 A1 | 12/2003 | Luick |
| 2004/0196859 A1 | 10/2004 | Benner |
| 2005/0068897 A1 | 3/2005 | Arita |
| 2006/0165070 A1 | 7/2006 | Hall |
| 2006/0294588 A1 | 12/2006 | Lahann |
| 2007/0195761 A1 | 8/2007 | Tatar |
| 2007/0220522 A1 | 9/2007 | Coene |
| 2008/0263315 A1 | 10/2008 | Zhang |
| 2008/0282232 A1 | 11/2008 | Cong |
| 2009/0327647 A1 | 12/2009 | Ingle |
| 2010/0070714 A1 | 3/2010 | Hoover |
| 2010/0228940 A1 | 9/2010 | Asnaashari |
| 2011/0010483 A1 | 1/2011 | Liljeberg |
| 2011/0191477 A1 | 8/2011 | Zhang |
| 2011/0317691 A1 | 12/2011 | Kajihara |
| 2012/0204181 A1 | 8/2012 | Yachide |
| 2012/0327757 A1 | 12/2012 | Wang |
| 2013/0024648 A1 | 1/2013 | Chen |
| 2013/0067484 A1 | 3/2013 | Sonoda |
| 2013/0152099 A1 | 6/2013 | Bass |
| 2013/0239111 A1 | 9/2013 | Bingham |
| 2014/0032457 A1 | 1/2014 | Palmer |
| 2014/0156907 A1 | 6/2014 | Palmer |
| 2014/0204943 A1 | 7/2014 | Palmer |
| 2014/0297846 A1 | 10/2014 | Hoja |
| 2014/0359638 A1 | 12/2014 | De Lima |
| 2015/0007185 A1 | 1/2015 | Dey |
| 2015/0049758 A1 | 2/2015 | Ancajas |
| 2016/0020993 A1 | 1/2016 | Wu |
| 2016/0142341 A1* | 5/2016 | Panchagnula ......... H04L 49/254 370/392 |
| 2016/0224379 A1 | 8/2016 | Palmer |
| 2016/0330127 A1 | 11/2016 | Kim |
| 2017/0118033 A1 | 4/2017 | Srinivasan |

OTHER PUBLICATIONS

"Hardware Based Routing Lookup for IPv4," by W.S. Yang and J. J. Shieh, ICS 2000, Workshop on Computer Networks, Internet, and Multimedia, Taiwan, pp. 223-230, 2000.

"Binary Decision Diagrams for Efficient Hardware Implementation of Fast IP Routing Lookups," by R. Sangireddy and A.K. Somani, Tenth International Conference on Computer Communication Networks, pp. 12-17, IEEE 2001.

Atmel Corporation. "High-speed, Loadable 16-bit Binary Counter." Application Note. Field Programmable Gate Array. 1999.

Bensoussan, A., et al., The Multics Virtual Memory: Concepts and Design, Communications of the ACM, vol. 15, No. 5, 1972, retrieved Jun. 16, 2016, pp. 308-318.

Green, Paul, "Multics Virtual Memory—Tutorial and Reflections", Aug. 5, 2005, Retrieved Jun. 14, 2016, 18 pages.

International Application No. PCT/US2016/015064, Notification Concerning Transmittal of International Preliminary Report on Patentability, dated Aug. 10, 2017, 8 pages.

International Search Report for Application No. PCT/US2016/067972, dated Mar. 10, 2017, Applicant: Amazon Technologies, Inc., 25 pages.

International Search Report for International Application No. PCT/US2016/015064, dated May 6, 2016, 5 pages.

Todri, Aida, et al., "Power Supply Noise Aware Workload Assignment for Multi-Core Systems", 2008, Proc. ICCAD, 2008, pp. 830-337.

Written Opinion for International Application No. PCT/US2016/015064, dated May 6, 2016, 11 pages.

* cited by examiner

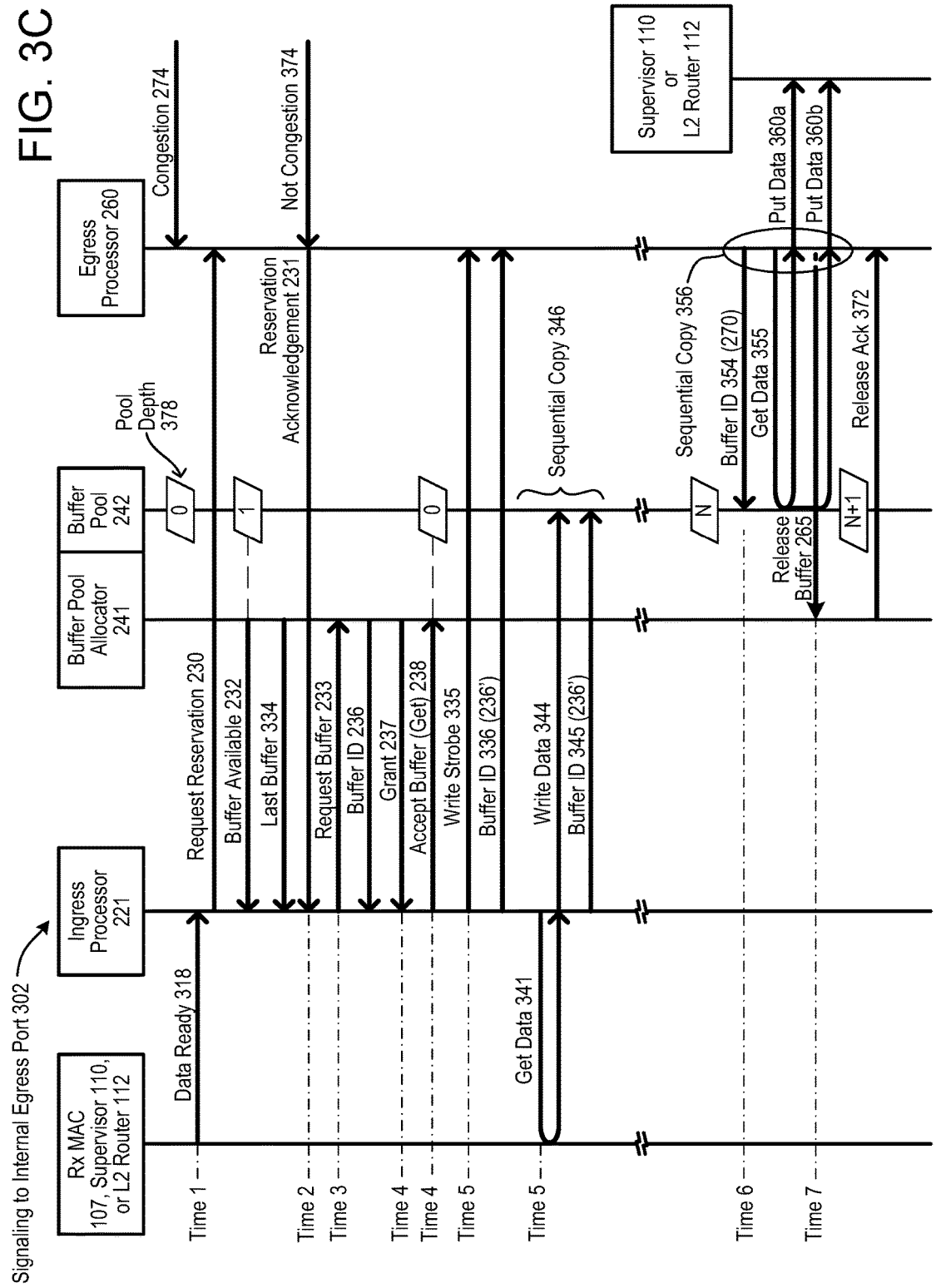

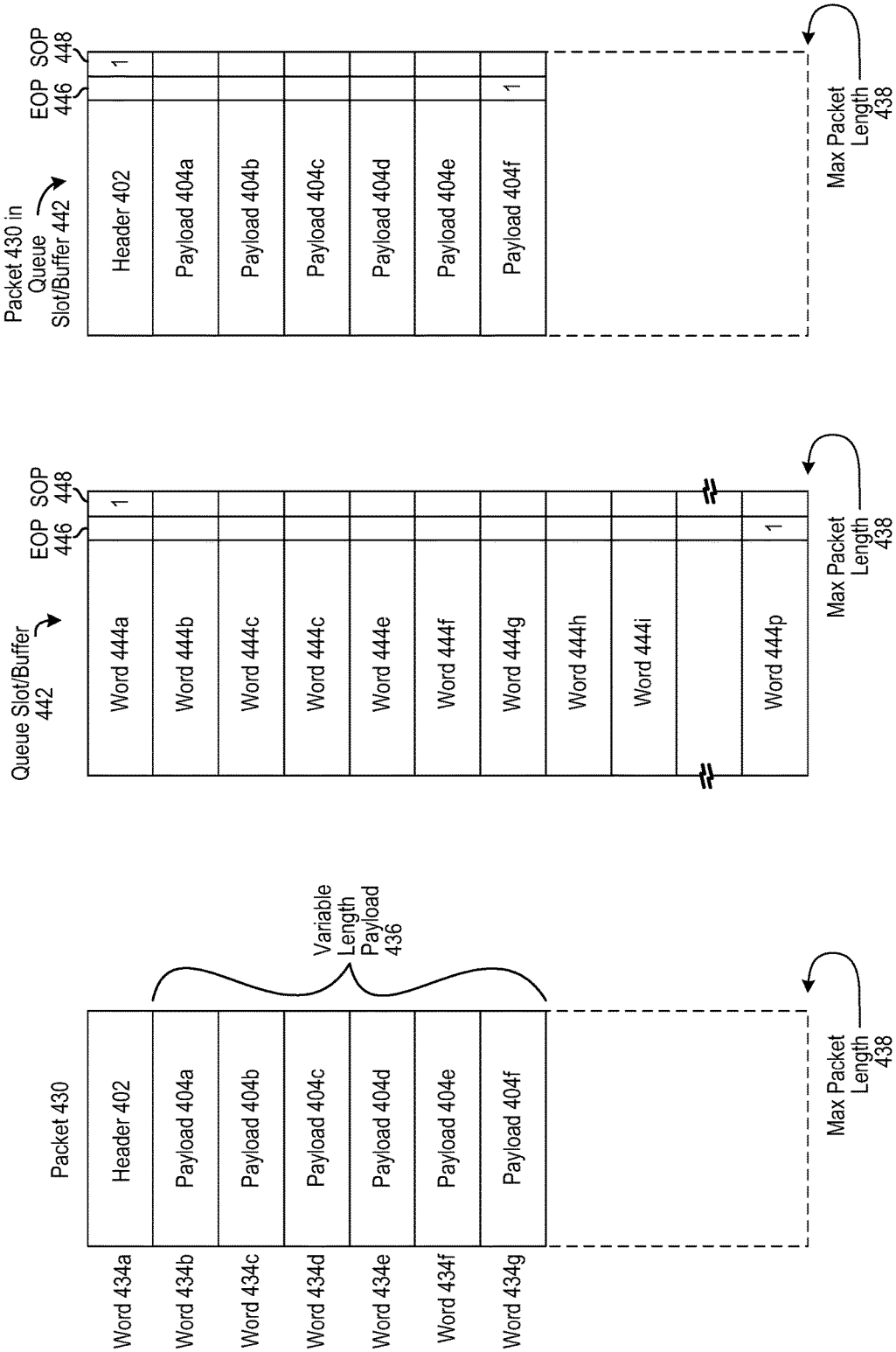
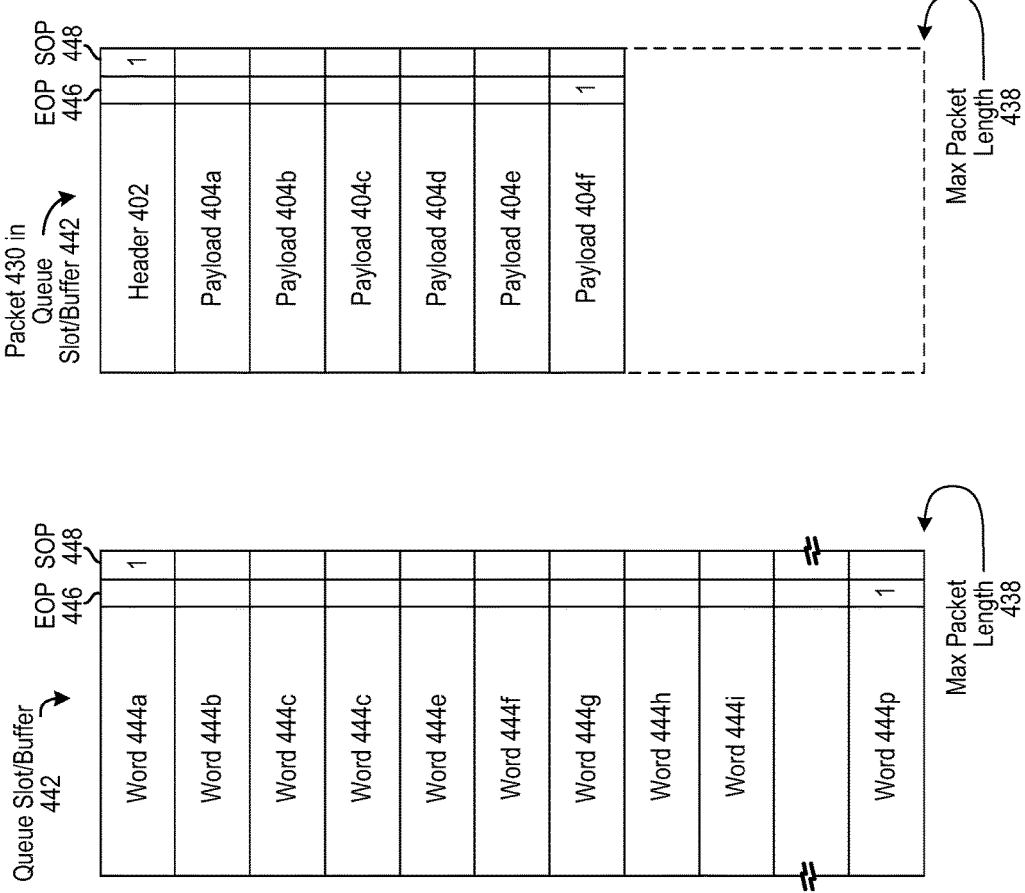
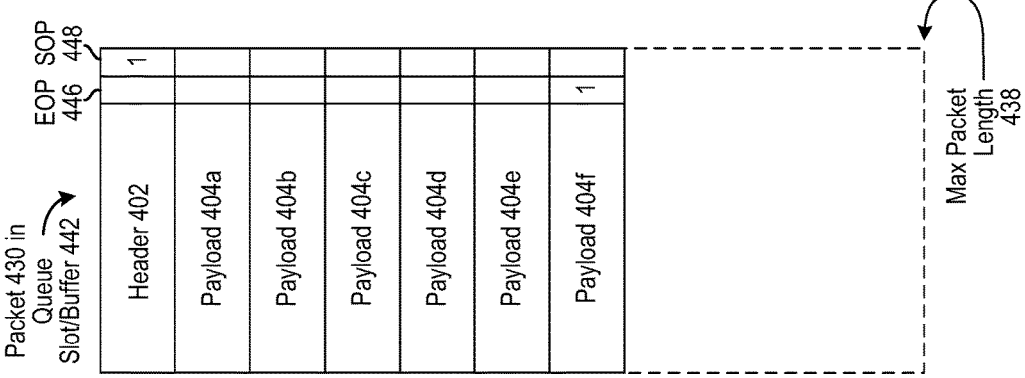
FIG. 4C
FIG. 4B
FIG. 4A

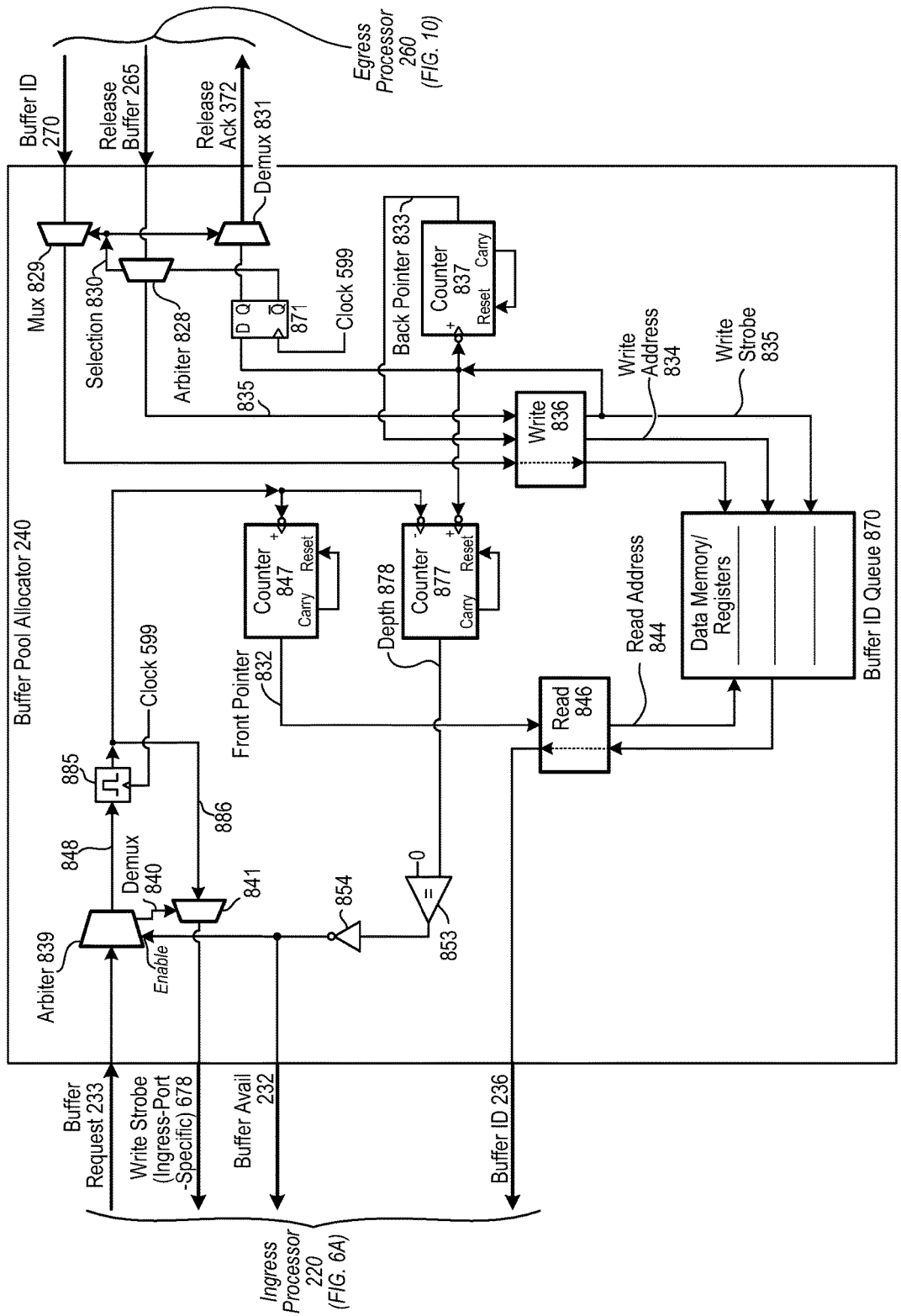

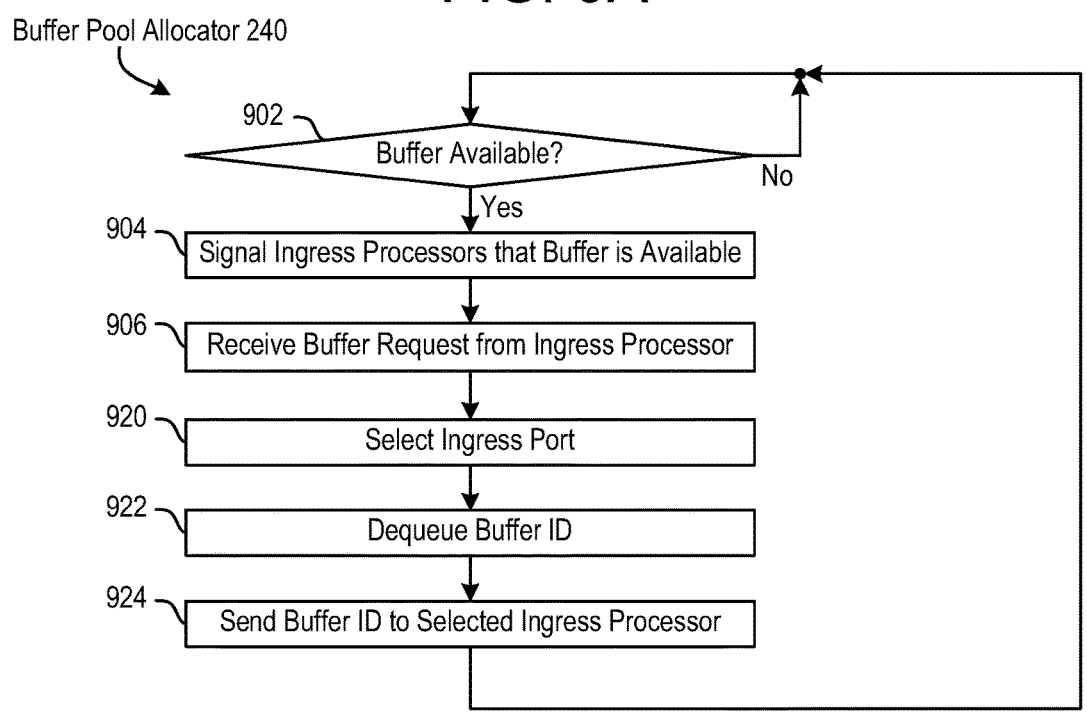

PACKET ROUTER BUFFER MANAGEMENT

PRIORITY CLAIM

Priority is claimed from U.S. Provisional Patent Application 62/275,149 filed Jan. 5, 2016 and entitled "Lambda-Fabric: A Scale-Invariant Computing Interconnect Scheme," an entirety of which is incorporated herein by reference.

BACKGROUND

Multi-processor computer architectures capable of parallel computing operations were originally developed for supercomputers. Today, with modern microprocessors containing multiple processor "cores," the principles of parallel computing have become relevant to both on-chip and distributed computing environment.

BRIEF DESCRIPTION OF DRAWINGS

For a more complete understanding of the present disclosure, reference is now made to the following description taken in conjunction with the accompanying drawings.

FIGS. 3B and 3C are transaction flow diagrams illustrating examples of signaling between and within components in FIGS. 2C and 2D.

FIG. 4A illustrates an example of how a packet is divided into words.

FIG. 4B illustrates an example of the structure of a storage slot of a data queue and a buffer of a buffer pool.

FIG. 4C illustrates an example of a packet stored in a storage slot of a buffer.

FIGS. 8A and 8B are block diagrams conceptually illustrating example components of a buffer pool allocator.

FIGS. 9A to 9C are flow charts illustrating examples of processes performed by buffer pool allocators.

DETAILED DESCRIPTION

Processors have increased in complexity and scope and may benefit from a routed packet network on a semiconductor chip including multiple processing elements. By using a same packet format on-chip as well as off-chip, a seamless fabric may be created for high data throughput computation that does not require data to be re-packed and re-transmitted between devices.

Figure 1:
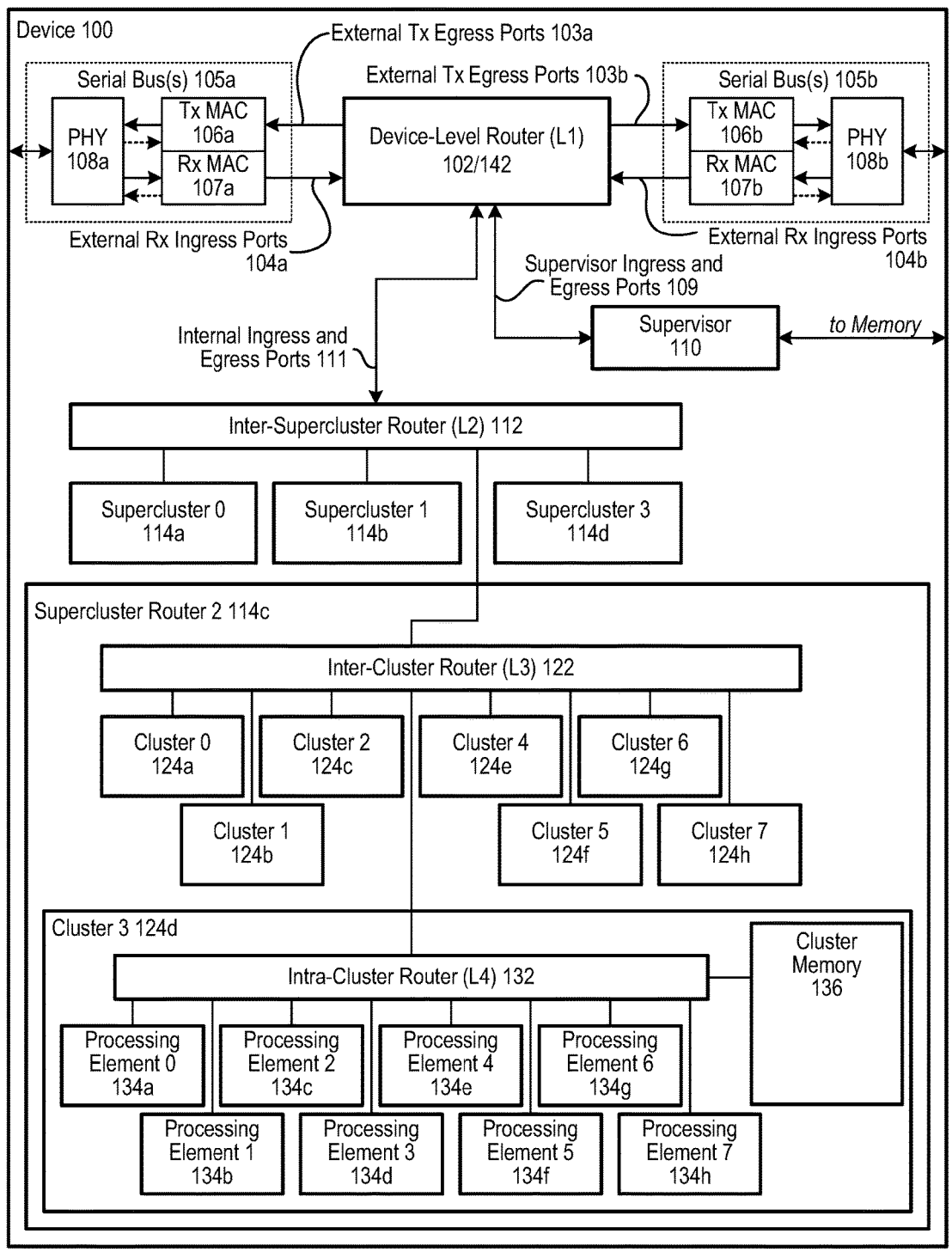
FIG. 1 is a block diagram conceptually illustrating an example of a multiprocessor chip including a device-level (L1) router.

FIG. 1 illustrates a multi-core chip 100 that facilitates such an architecture. A top level (L1) packet router 102/142 moves data inside the chip 100 and between chips. L1 packet router is indicated with two reference numerals to indicate two possible implementations of the L1 router. The specification of these two possible implementations, described in greater detail below, does not preclude other implementations within the scope of this disclosure. Data packets may be preceded by a header containing data for routing the packets. Routing to internal parts of the chip may be performed, for example, in accordance with addressing rules. Routing to external ports may be performed, for example, by comparing the packet header against a set of stored, programmable routing tables, along with any associated registers. The same hardware may route internal to internal (loopback), internal to external (outbound), external to internal (inbound) and external to external (pass through). The routing framework supports a wide variety of geometries of chip connections, and allows execution-time optimization of the fabric to adapt to changing data flows.

L1 router 102/142 may have its own clock domain and be connected by a plurality of asynchronous data busses (via internal ports 111) to multiple clusters of processor cores on the chip (device 100). The L1 router 102/142 may also be connected to one or more external ports (103a/b, 104a/b) that connect the chip to other chips, devices, components, and networks. Such ports may be, for example, media access control (MAC) layer ports (106a/b, 107a/b) providing access to one or more external communication channels (physical layer or PHY 108a/b) of external data busses (105a/b). Via another internal "supervisor" port 109, the L1 router may also be connected to a chip-level supervisor processor 110 and/or data feeder that communicates with chip-level memory, such as a supervisor processor/feeder that distributes executable instructions to configure the programmable elements on the chip 100.

Conventional routers may include some form of flow control, but the flow control may be only partially effective. Conventional routers may need other techniques to remedy ineffective flow control. First, conventional routers may include a large amount of buffer space to handle the situation when many packets are received before they can be transmitted through to their destination. Second, conventional routers may discard packets (and depend on the source to re-send, if necessary).

Figure 2A:
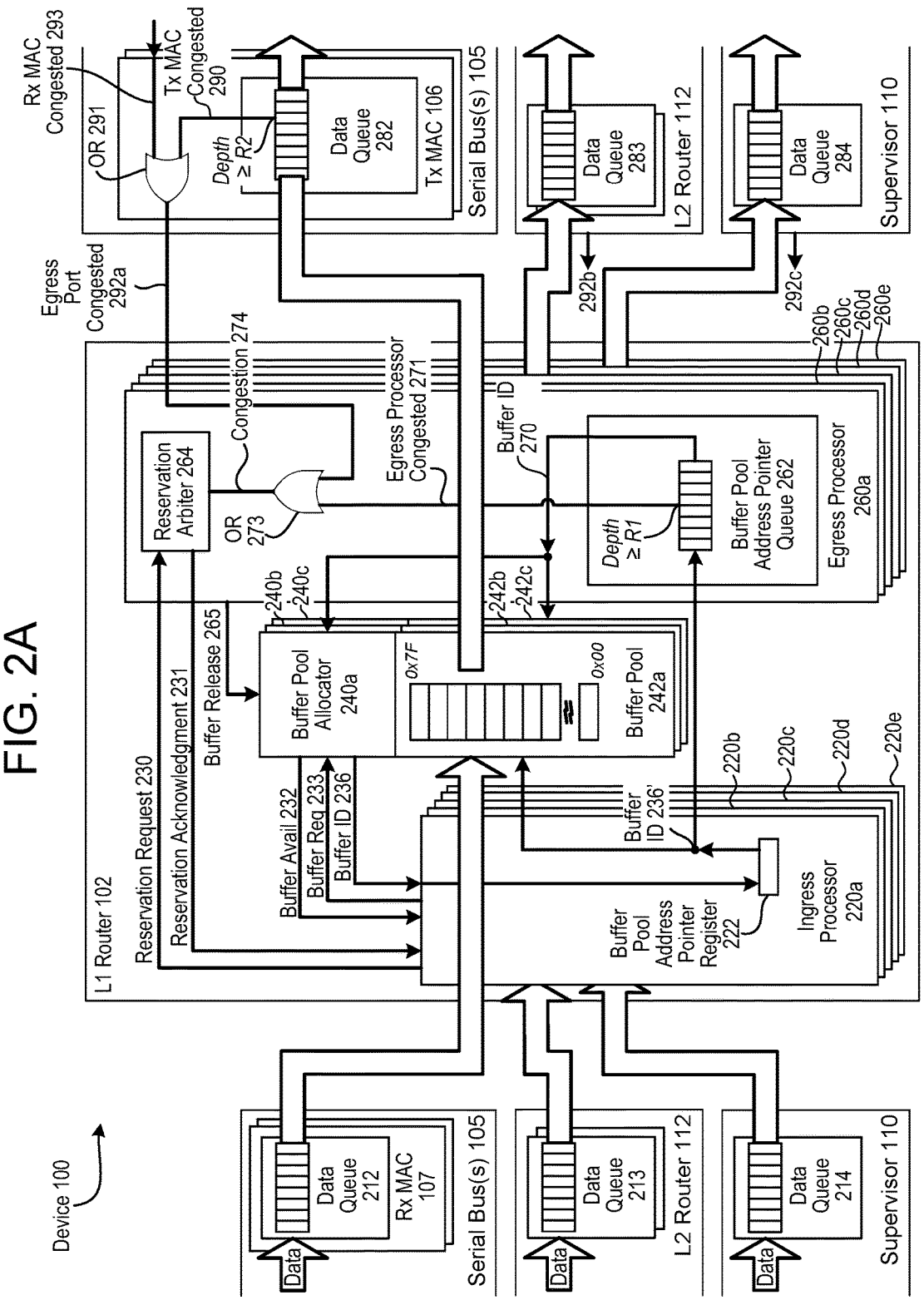
FIG. 2A is block diagram conceptually illustrating components and signaling of an implementation of an L1 router.

Referring to FIG. 2A, some implementations of an L1 router, referred to as L1 router 102, improve flow control by reserving space in an egress port first-in-first-out (FIFO) data queue 282-284 used for egress from the L1 router, prior to dequeuing a received packet from an ingress port queue 212-214 used for ingress into the L1 router and copying the packet into a buffer of a buffer pool 242. Buffers may be divided into three pools (242*a*, 242*b*, 242*c*).

A first buffer pool 242*a* is shared by ingress processors (e.g., 220*a*, 220*b*) that manage packets received through external ingress ports 104, such as packets received from outside the chip 100 via a serial bus receiver MAC 107. A second buffer pool 242*b* is shared by ingress processors (e.g., 220*c*, 220*d*) that manage packets received through internal ingress ports 111. A third buffer pool is used by the ingress processor (e.g., 242*e*) that manages packets received through the supervisor port 109. Each buffer pool 242 may be managed by a buffer pool allocator (240*a*, 240*b*, 240*c*).

Figure 2B:
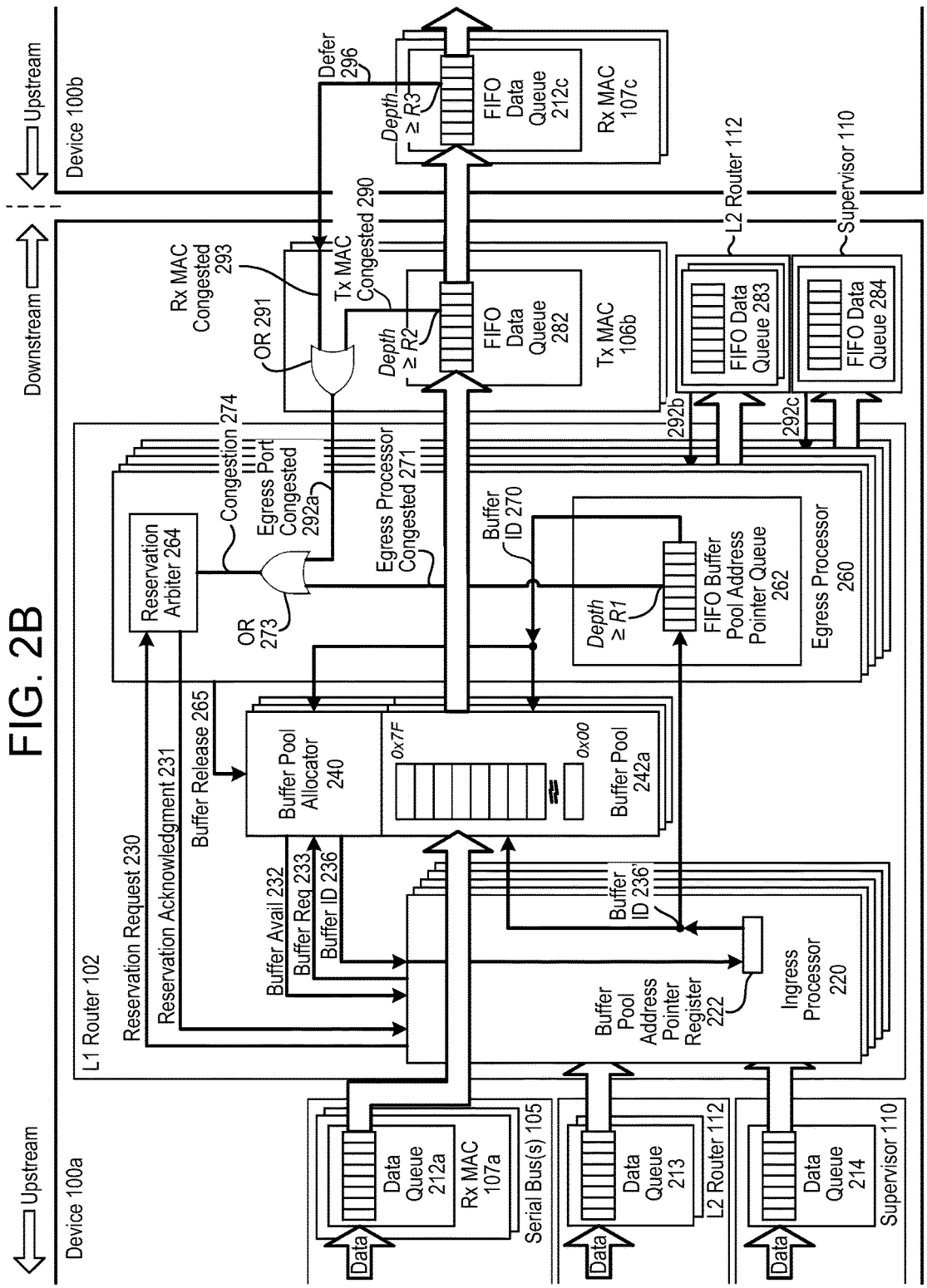
FIG. 2B is a block diagram conceptually illustrating components and signaling of an implementation of an L1 router within a system of chips.
Figure 2C:
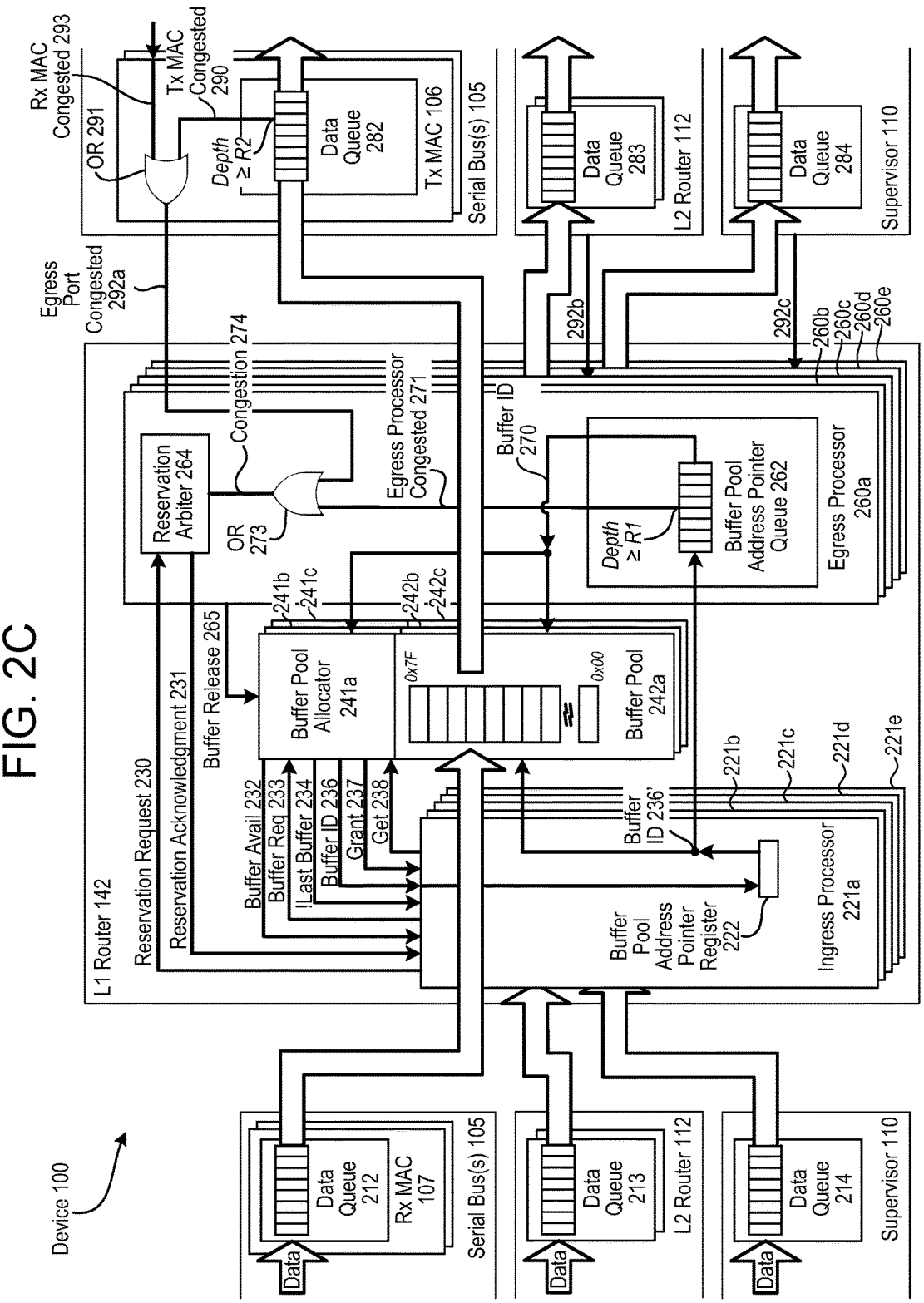
FIG. 2C is a block diagram conceptually illustrating components and signaling of an implementation of an L1 router.

Referring to FIG. 2C, some implementations of an L1 Router, referred to as L1 router 142 improve flow control by reserving space in an egress port first-in-first-out (FIFO) data queue 282-284 used for egress from the L1 router, prior to dequeuing a received packet from an ingress port queue 212-214 used for ingress into the L1 router and copying the packet into a buffer of a buffer pool 242. Buffers may be divided into three pools (242*a*, 242*b*, 242*c*) in a same manner as in FIG. 2A.

A first buffer pool 242*a* is shared by ingress processors (e.g., 221*a*, 221*b*) that manage packets received through external ingress ports 104, such as packets received from outside the chip via a serial bus receiver MAC 107. A second buffer pool 242*b* is shared by ingress processors (e.g., 221*c*, 221*d*) that manage packets received through internal ingress ports 111. A third buffer pool is used by the ingress processor (e.g., 242*e*) that manages packets received through the supervisor port 109. Each buffer pool 242 may be managed by a buffer pool allocator (241*a*, 241*b*, 241*c*).

The buffer pool allocators receive and grant requests for buffers from the ingress processors 221. When header information of an inbound packet indicates that the packet is to be routed through an external egress port 103 to a destination outside the device/chip containing the L1 router 142, an ingress processor 221 will not accept a granted buffer reservation from the associated buffer pool allocator 241 if a total number of available buffers is less than a threshold. In some example implementations described herein, an ingress processor 221 will not accept a granted buffer if the granted buffer is the last buffer remaining in the pool 242 (e.g., the threshold is two). The techniques described herein, however, are not limited to a threshold of two, and any appropriate threshold may be used by modifying the example implementations to allow for a larger threshold.

Preserving one or more buffers for packets destined for the current device prevents a class of deadlocks from occurring. It also ensures that if any other router connected to the current device has packets destined for this device, the L1 router 142 will eventually be able to deliver those packets.

Looking at it on a network-wide basis, separation of the buffers into internal buffer pools (242*b*, 242*c*) and external buffer pools (242*a*) ensures that regardless of incoming traffic, the current device has a chance to send its outgoing data onto the network. Preserving one or more buffers for incoming traffic approximately mirrors that, ensuring that traffic on the network can "drain" into its destination device.

The order of allocation minimizes the number of buffers needed to support a given level of throughput. It also helps ensure that when/if a particular path is delivering packets slowly, back-pressure is applied to the ingress port (and from there back to the router sending data to that ingress port) as quickly as possible (before a packet is received into the buffer).

Referring to both FIGS. 2A and 2C, further improvements to flow control interact with the remainder of the L1 router 102/142 to improve availability of buffers. This may be accomplished by carrying out flow control at different levels in the L1 router(s) of a system, and responding to congestion prior to the egress buffers reaching capacity.

A first level of flow control is local, occurring inside the L1 router 102/142. Each egress port has an egress processor 260 that includes a first-in-first-out (FIFO) queue 262 to hold buffer identifiers ("buffer IDs"). If the depth of the identifier queue 262 of the egress processor equals or exceeds a threshold (R1), an egress processor congestion signal 271 is asserted. While the egress processor congestion signal 271 is asserted, the granting of egress port reservations to ingress port processors 220/221 with packets destined for an egress port associated with a congested egress processor will be postponed until the congestion clears. As a result, packets destined for the egress port associated with that egress processor 260 will not be admitted into the L1 router 102/142 until at least one slot in the egress buffer ID queue 262 empties, and the depth falls below the threshold (R1). The threshold (R1) will typically be set to preserve a plurality buffers to accommodate reservations that have already been granted (e.g., R1 serves as a "high-water" that is less than the capacity of the identifier queue 262). In other words, the egress processor signal 271 is asserted even though there is still capacity available in the egress processor's identifier queue 262 to store one-or-more additional buffer IDs.

A second level of flow control is "hop" flow control between a serial bus transmitter media access control (MAC) layer port (Tx MAC) 106 and the L1 router 102/142. Each Tx MAC includes a data queue 282. After being granted a reservation by an egress port processor 260 and allocated a buffer pool buffer, a packet is copied from a data queue 212 of a serial bus receiver media access control (MAC) layer receiver port (Rx MAC) 107 to an assigned buffer in the buffer pool 242, and thereafter is copied from the buffer into the Tx MAC data queue 282. The depth of the Tx MAC queue 282 is compared with a threshold (R2) that is less the queue's full capacity. When the depth of the Tx MAC data queue 282 equals or exceeds the threshold (R2), a Tx MAC congestion signal 290 is asserted. In other words, the Tx MAC congestion signal 290 is asserted even though there is capacity available in the Tx MAC data queue 282 to store one-or-more additional packets. While the Tx MAC congestion signal 290 is asserted, the corresponding egress processor 260 will postpone granting further reservations to ingress processors 220/221 with packets destined for an egress port of a congested Tx MAC until the congestion clears. This helps conserve the shared buffers until data can be transmitted. In addition to being used with the external Tx egress ports 103*a/b*, this "hop" flow control may be used with the internal ports 111 (using egress port congestion signal 292*b*) and the supervisor port 109 (using egress port congestion signal 292*c*).

Figure 2D:
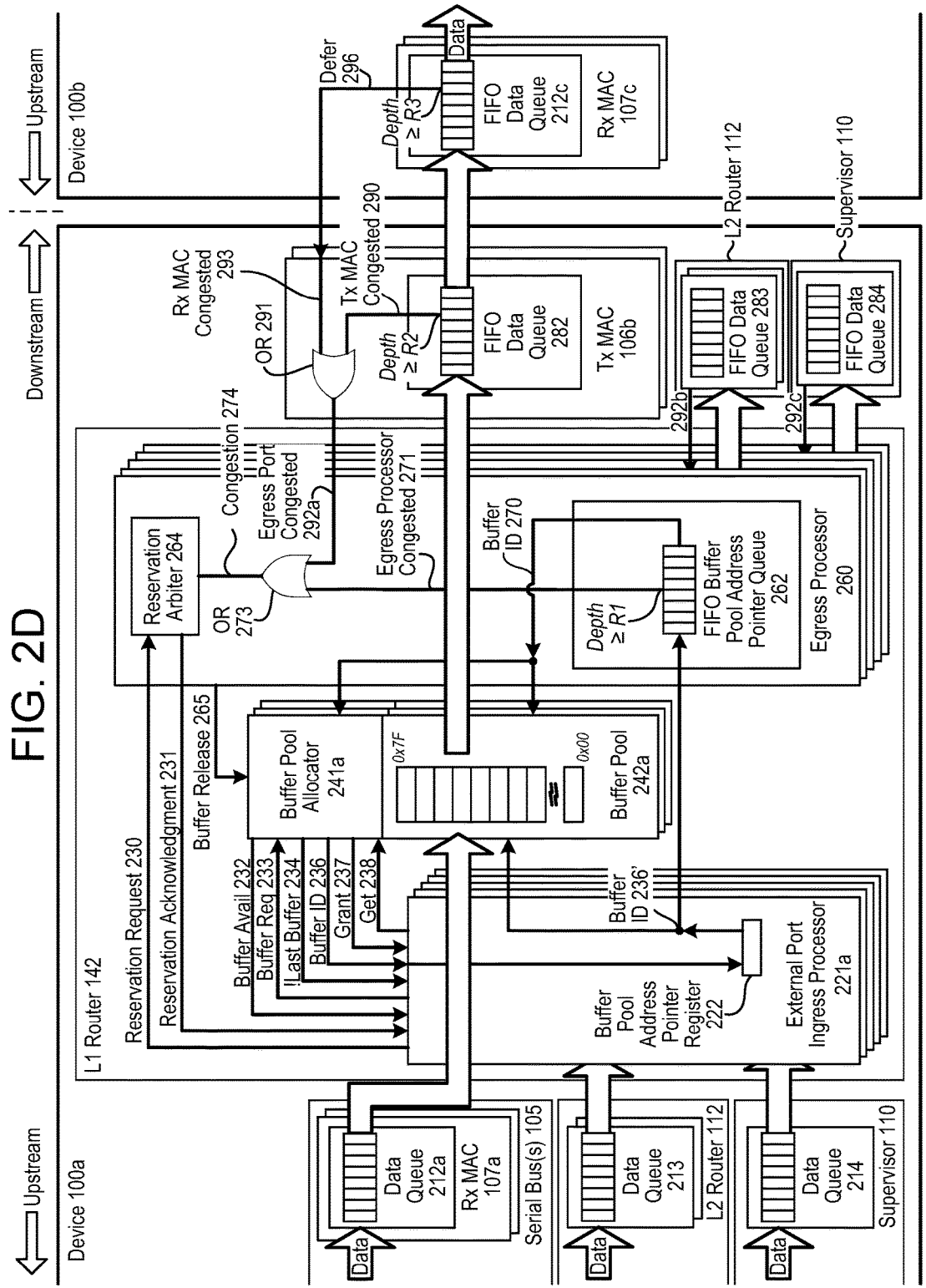
FIG. 2D is a block diagram conceptually illustrating components and signaling of an implementation of an L1 router within a system of chips.

A third level of flow control is signaling to the L1 router 102/142 by an external destination device or router. FIG. 2B shows a device 100a communicably connected to a second device 100b, highlighting the path of a packet received by the device 100b via an external ingress port. FIG. 2D shows a device 100c communicably connected to a second device 100d, highlighting the path of a packet received by the device 100c via an external ingress port. The PHY external communication channels 108 from FIG. 1 are omitted from FIGS. 2B and 2D for brevity. Device 100a and device 100b contain an L1 router 102 while device 100c and device 100d contain an L1 router 142. A Tx MAC 106b of upstream device 100a and upstream device 100c transmits packets over a communication medium (a PHY external communication channel 108, such as a fiber optic link, Ethernet, etc.) to an Rx MAC 107c of a downstream device 100b or downstream device 100d, respectively.

A depth of a data queue 212c of the Rx MAC 107c of the downstream device is compared to a threshold (R3), where the threshold (R3) is less than the full capacity of the reception queue 212c. When the depth is at or exceeds a threshold (R3), the Rx MAC 107c of the downstream device sends a DEFER packet 296 to the Tx MAC 106b of the upstream device. In other words, a DEFER packet 296 is sent even though there is capacity available in the Rx MAC data queue 212c to store one-or-more additional packets. In response to receipt of the "defer" message, the Tx MAC 106b asserts an Rx MAC congestion signal 293 that causes the egress processor 260 of the L1 router 102/142 to postpone granting further reservations to ingress processors 220/221 with packets destined for an egress port associated with a congested Rx MAC 107c until the congestion clears. When the depth of the Rx MAC 107c data queue falls below the threshold (R3), the Rx MAC 107c sends a "resume" packet to the Tx MAC 106b. In response to receipt of the "resume" message, the Tx MAC 106b de-asserts an Rx MAC congestion signal 293.

The data flows in FIGS. 2A to 2D are in one direction ("downstream") as a demonstration. As can be seen in FIG. 1, the "downstream" and "upstream" labels are relative to a particular dataflow direction, not the directions of the serial busses 105a/b in FIG. 1. As such, the L1 routers 102/142 support bidirectional data flows, where each PHY external communication channel 108 corresponds to at least one ingress port (e.g., ingress port 104 via Rx MAC 107) and at least one egress port (e.g., egress port 103 via Tx MAC 106).

The combination of remote flow control and local flow control provides end-to-end flow control from a final destination back to the original source (which may be further enhanced with the buffer allocation management provided by buffer pool allocator 241). The hop flow control optimizes usage of the buffers, assuring that a buffer will only be allocated when it is known that there is sufficient space in a Tx MAC data queue. With R1, R2, and R3 thresholds on the external ports set low enough (e.g., 50% capacity) to accommodate the flow rates, the maximum amount of time between a buffer being allocated and when that buffer can be released for reuse may be fixed, providing a deterministic upper bound for the flow rate. The deterministic upper bound depends, in part, on the maximum length of a packet (e.g., packet 430 in FIG. 4A).

Ordinarily, in view of the variable latencies within a device 100 (e.g., the availability of processing elements 134, the length of a memory transaction performed by the supervisor 110, etc.), loopback and inbound data flows may be non-deterministic. However, by guaranteeing there is a slot in the buffer identifier descriptor queue 262 associated with internal ports 111 and supervisor ports 109, prior to the packet being loaded into a buffer, the time the packet spends within the L1 router itself may be deterministic.

The buffers of the buffer pools 242 used by the L1 router 102/142 may be dual-ported memory (e.g., dual ported registers, dynamic random access memory (RAM) cells, or static RAM cells, etc.). A dual-ported memory cell/register may be written to and read from at a same time (i.e., within a same clock cycle). Use of dual-ported memory allows the L1 router 102/142 to combine advantages of store-and-forward designs (e.g., the ability to deal with bursty traffic patterns) with advantages of cut-through router designs (e.g., reduced latency). The data queues 212-214 and 282-284, the buffer pool address registers 222, and the buffer pool address queues 262 may also be dual ported.

Advantages of the new designs over existing router technology include that the new designs allow a router to have fewer buffers than existing designs. Needing fewer buffers allows faster memory technology to be used for the buffers and/or the physical space on the chip needed to accommodate the buffers to be reduced, since ordinarily there is a design trade-off between the size of a memory cell/register and its speed. Another advantage is that latency is reduced compared to existing designs because packets can be transferred into and out of the buffer pool buffers more quickly. Another advantage is the increase in the dependability of the network, since the L1 routers 102/142 don't discard packets (short of simply malfunctioning). A further advantage of the L1 router 142 is a reduction of system deadlocks due to the preservation of one or more buffers for the transfer of packets to addresses within the device.

Referring to FIGS. 2A to 2D and 4A, when data packets (430) arrive in the L1 router 102/142, the packets are added to a data queue 212 of an ingress port's Rx MAC 107. An ingress processor 220/221 of the L1 router 102/142 examines the header (402) at the start of each packet (430) to determine the destination of the packet's data payload and the egress processor 260 of the L1 router to which the packet should be directed. Each chip 100 may be assigned a unique device identifier ("device ID"), and packet headers (402) may identify a destination chip by including the device ID in an address contained in the packet header. Packets that are received by the L1 router 102/142 that have a device ID matching that of the chip 100 containing the L1 router 102/142 are routed within the chip through the supervisor port 109 to the supervisor 110 or through one of the internal ports 111 communicably linked to a cluster of processor elements 134 within the device 100. Packets that are received with a non-matching device ID by the L1 router 102/142 are routed to an external Tx egress port 103a/b that will relay the packet back off the chip.

Returning to FIG. 1, an example of a network-on-a-chip architecture implemented on the processor chip 100 may include a large number (e.g., two-hundred-fifty-six) of processing elements 134, each processing element 134 comprising a processor "core," connected together on the chip via a switched or routed fabric similar to what is typically seen in a computer network. The processing elements 134 may be arranged in a hierarchical architecture, although other arrangements may be used. In the hierarchy, each chip 100 may include four superclusters 114a-114d, each supercluster 114 may comprise eight clusters 124a-124h, and each cluster 124 may comprise eight processing elements 134a-134h. If each processing element 134 includes two-hundred-fifty six externally exposed registers, then within the chip 100, each of the registers may be individually addressed with a sixteen bit address: two bits to identify the supercluster, three bits to identify the cluster, three bits to identify the processing element, and eight bits to identify the register.

Memory within a system including the processor chip 100 may also be hierarchical, and memory of different tiers may be physically different types of memory. Each processing element 134 may have a local program memory containing instructions that will be fetched by a micro-sequencer of the processing element's core, and loaded into the instruction registers for execution in accordance with a program counter. Processing elements 134 within a cluster 124 may also share a cluster memory 136, such as a shared memory serving a cluster 124 including eight processor cores 134a-134h. While a processor core may experience low latency when accessing its own registers, accessing global addresses external to a processing element 134 may experience a larger latency due to (among other things) the physical distance between the addressed component and the processing element 134. As a result of this additional latency, the time needed for a processor core to access an external main memory, a shared cluster memory 136, and the registers of other processing elements may be greater than the time needed for a core to access its own execution registers.

Each tier in the architecture hierarchy may include a router. The top-level (L1) router 102/142 may have its own clock domain and be connected by a plurality of asynchronous data busses to multiple clusters of processor cores on the chip. The L1 router 102/142 may also be connected to one or more external-facing ports that connect the chip to other chips, devices, components, and networks. The chip-level router (L1) 102/142 routes packets destined for other chips or destinations through the external transmission ports 103 over one or more high-speed serial busses 105. Each serial bus 105 may comprise at least one media access control (MAC) transmission (Tx) port 106, at least one media access control (MAC) receiver (Rx) port 107, and a physical layer hardware transceiver 108.

The L1 router 102/142 may route packets to and from a primary general-purpose memory used by the chip 100 through a supervisor port 109 to a memory supervisor 110 that manages the general-purpose memory. Packets to-and-from lower-tier components may be routed through internal ports 111.

Each of the superclusters 114a-114d may be interconnected via an inter-supercluster router (L2) 112 which routes packets between superclusters and between a supercluster 112 and the chip-level router (L1) 102/142. Each supercluster 112 may include an inter-cluster router (L3) 122 which routes packets between each cluster 124 in the supercluster 114, and between a cluster 124 and the inter-supercluster router (L2) 112. Each cluster 124 may include an intra-cluster router (L4) 132 which routes packets between each processing element 134 in the cluster 124, and between a processing element 134 and the inter-cluster router (L3) 122. The level 4 (L4) intra-cluster router 132 may also direct packets between processing elements 134 of the cluster and a cluster memory 136. Tiers may also include cross-connects (not illustrated) to route packets between elements in a same tier in the hierarchy.

The network topology in FIG. 1 is an example, and other topologies may be used, such as "flattening" the tree of connections. For example, the L2 and L3 routers can be combined to eliminate the superclusters, connecting all thirty two clusters 124 directly to an inter-cluster router that is directly linked to the L1 router 102/142.

Each external ingress port 104 may be associated with an Rx MAC 107 and an ingress processor 220. Likewise, each internal ingress port and L2 router ingress data queue 213 may be associated with an ingress processor 220/221 (e.g., one internal ingress port per ingress processor), and the supervisor ingress port and ingress data queue 214 of the supervisor 110 may be associated with an ingress processor 220/221 (e.g. one supervisor ingress port per ingress processor). So if there are two external Rx MACs 107, two L2 router ingress data queues 213, and one supervisor ingress data queue 214, there will be five ingress processors 220/221.

The L1 router 102/142 may include a plurality of buffer pools, such as the three buffer pools 242 illustrated in FIGS. 2A to 2D: one pool dedicated to the external ingress ports 104, one pool dedicated to the internal ingress ports of the internal ports 111, and one pool dedicated to the supervisor ingress port of the supervisor port 109. Each external egress port 103 may be associated with a Tx MAC 106 and an egress processor 260 (e.g., one external egress port per egress processor). Likewise, each internal egress port and L2 router egress data queue 283 may be associated with an egress processor 260 (e.g., one internal egress port per egress processor), and the supervisor egress port and data egress queue 284 of the supervisor 110 may be associated with an egress processor 260 (e.g., one supervisor egress port per egress processor).

As a matter of nomenclature, the data queue 213 of the L2 router 112 and the data queue 214 of the supervisor 110, while used for ingress into the L1 router 102/142, may be egress queues of their respective components. Likewise, the data queue 283 of the L2 router 112 and the data queue 284 of the supervisor 110, while used for egress from the L1 router 102/142, may be ingress queues of their respective components. However, as used herein, "ingress" and "egress" are relative to the L1 routers 102/142.

Figure 3A:
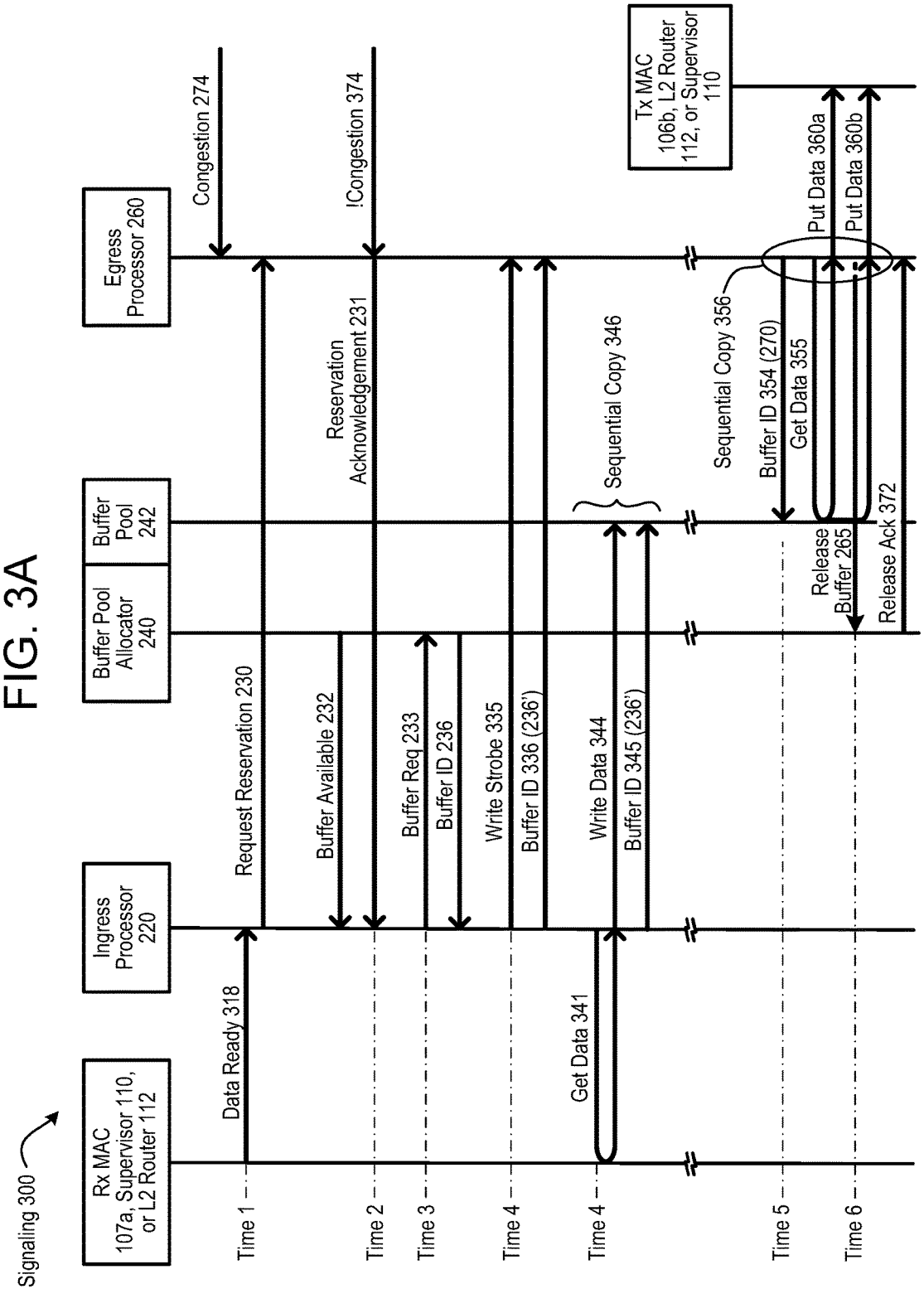
FIG. 3A is a transaction flow diagram illustrating an example of signaling between and within components in FIGS. 2A and 2B.

FIG. 3A is a transaction flow diagram illustrating an example of signaling 300 between and within components in FIGS. 2A and 2B. After a packet is enqueued into an ingress data queue of an ingress component (the ingress data queue 212a of the Rx MAC 107a, the ingress data queue 213 of the L2 router 112, or the ingress data queue 214 of the supervisor 110), the ingress component signals an associated ingress processor 220 at Time 1 that new data is ready to be dequeued by asserting a data ready signal 318. Without dequeuing the packet, the ingress processor 220 reads the destination address of the packet. Based on the destination address, the ingress processor 220 determines the egress port to which the packet should be routed. Having determined which egress port to use, the ingress processor 220 asserts a reservation request signal 230 to the egress processor 260 associated with that egress port.

In response to the reservation request signal 230, the reservation arbiter 264 of the egress processor 260 will assert a reservation acknowledgement signal 231, unless the congestion signal 274 is asserted and/or the egress processor 260 is waiting for another ingress processor to enqueue a buffer ID into the egress processor's buffer identifier queue 262 after granting that other ingress processor a reservation. The congestion signal 274 is a logical OR result of the egress processor congested signal 271, the egress data queue congested signal 290, and the downstream ingress data queue congested signal 293, as combined by the OR logic (e.g., OR gates 273 and 291).

While the congestion signal 274 is asserted and/or while waiting for an ingress processor to use a previously granted reservation, the reservation arbiter 264 will postpone asserting the reservation acknowledgement signal 231. However, when the egress processor 260 is not waiting on another ingress processor, once the congestion signal 274 is de-asserted (illustrated as 374 and denoted by the !Congestion at Time 2, which is the inverse of the congestion signal 274), the reservation arbiter 264 of the egress processor 260 asserts the reservation acknowledgement signal 231.

For egress ports associated with the L2 router 112 and the supervisor 110, the congestion signal 274 is a logical OR result of the egress processor congested signal 271 and the egress port congested signal 292*b*/292*c*. The egress port congestion signal 292*b*/292*c* may be based on the depth of the data queues 283/284 alone (e.g., depth≥R2), or may also be combined with congestion indications from subsequent components (e.g., from a L3 inter-cluster router 122).

Having received the reservation acknowledgement, the ingress processor 220 asserts a buffer request signal 233 at Time 3, after a buffer available signal 232 is asserted by the buffer pool allocator 240 (indicating that a buffer of the buffer pool is available for allocation). If the buffer available signal 232 is already asserted when the ingress processor receives the reservation acknowledgement 231, then the assertion of the buffer request signal 233 may be on the next clock cycle after the reservation is acknowledged. Once asserted, the buffer request signal 233 may remain asserted until the buffer pool allocator 240 replies with a buffer ID 236, even if the buffer available signal 232 is de-asserted in the interim.

The assertion of the buffer request signal 233 is received by the buffer pool allocator 240, which assigns an available buffer to the ingress processor 220, sending a buffer ID 236 of the assigned buffer in response to the buffer request signal 233. The buffer ID is stored in a buffer pool address pointer register 222 of the ingress processor 220.

At Time 4, the ingress processor 220 initiates two operations. One operation is to assert a write strobe 335 and output the buffer ID 336 (236'), causing the buffer ID 236' (as read from register 222) to be enqueued in the buffer identifier queue 262 (also referred to as a "descriptor" queue) of the destination egress processor 260. This enqueuing releases the reservation arbiter 264 of the egress processor 260 to accept another reservation request. Another operation is to initiate a sequential copy 346 of the packet from the ingress port data queue 212-214 to the assigned buffer pool 242 buffer, signaling the ingress port data queue 212-214 with a get data signal 341 to dequeue data, and signaling the buffer pool 242 to write (344) the data to a buffer location corresponding to the buffer ID 345 (236'). The "sequential" nature of the copy is that the packet may be copied a word at a time. A "word" is a fixed-sized piece of data, such as a quantity of data handled as a unit by the instruction set and/or the processor core of a processing element 134, and can vary from device-to-device and from core-to-core. For example, a "word" might be 32 bits in one architecture, whereas a "word" might be 64 bits on another architecture.

At Time 5, after a buffer ID 270 is dequeued (354) from the egress port descriptor queue 262, the egress processor 260 initiates a sequential copy 356 of the data from the buffer corresponding to the dequeued buffer ID 345. The egress processor 260 gets (355) data from the buffer specified by the buffer ID 354, and begins enqueuing the data into the egress data queue (e.g., queue 282 of the Tx MAC 106*b*, queue 283 of the L2 router 112, or queue 284 of the Supervisor 110). The first word enqueued into the data queue 282-284 is illustrated by the put data 360*a* operation.

At Time 6, prior to completion of the sequential copy 356, the egress processor 260 releases (265) the assigned buffer, with the sequential copy to the egress data queue 282-284 concluding thereafter with the "put" data 360*b*, enqueuing the last word of the packet into the egress data queue 282-284. The ability to release the assigned buffer prior to completing the copy of the packet is made possible by determining the length of the packet from the packet header (included in the first word to be copied), and releasing the buffer a predetermined number of clock cycles prior to the end of the packet. The predetermined number of clock cycles is based on a minimum number of clock cycles before the data in a released buffer may overwritten by another ingress processor 220. As a result, the throughput of the buffer pool 242 may be maximized. After the buffer ID is released (265) by an egress processor 260, the buffer pool allocator 240 responds with a release acknowledgement 372, which may be received either before or after copying of the packet is completed. If not received before copying is complete, the egress processor 260 may wait for the acknowledgement 372 before beginning the copying of a next packet.

Figure 3B:
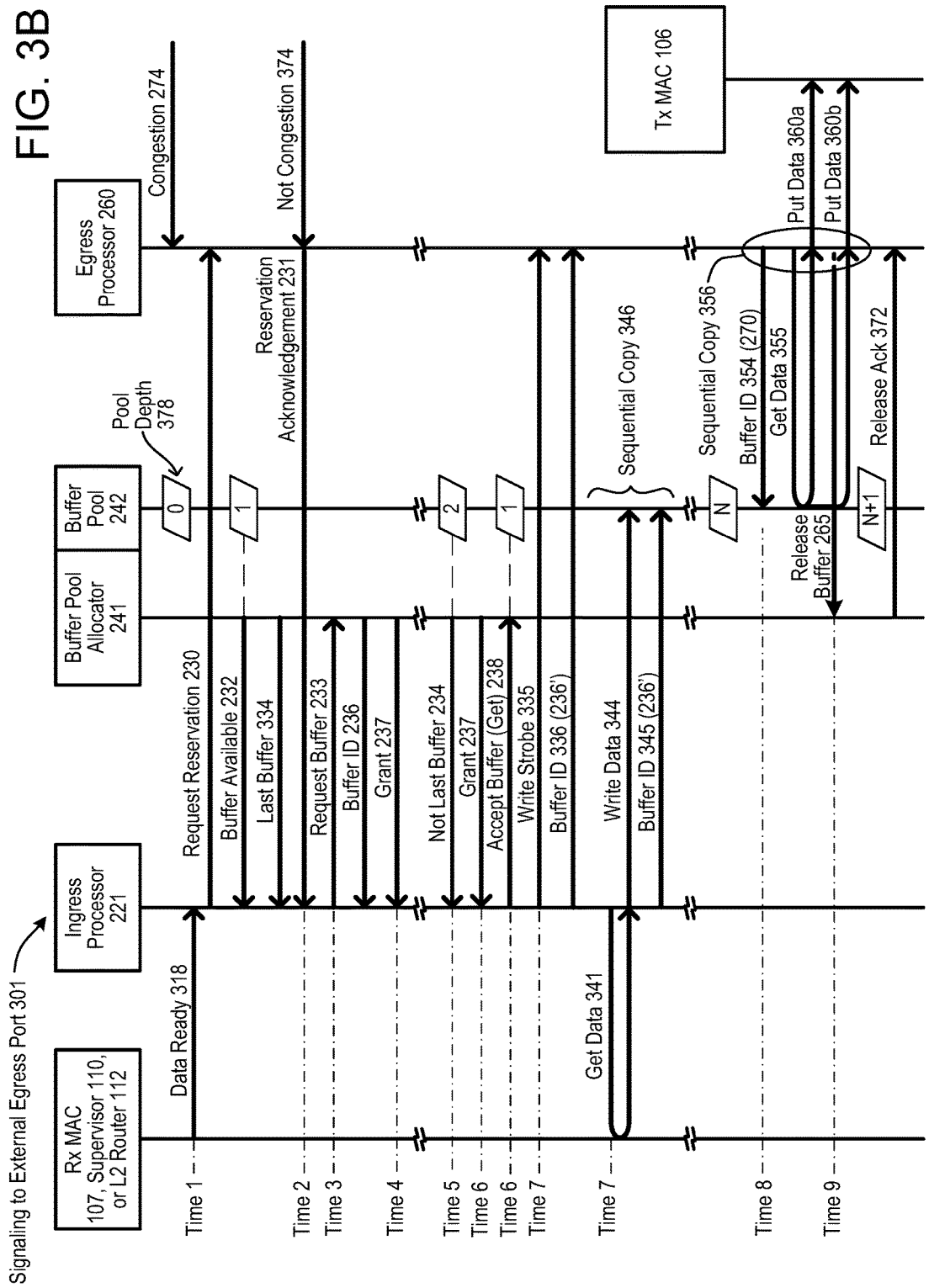

FIG. 3B is a transaction flow diagram illustrating an example of signaling 301 between and within components in FIGS. 2C and 2D for a packet destined for an external egress port. After a packet is enqueued into the data queue 212*a* of the Rx MAC 107*a*, the data queue 213 of the L2 router 112, or the data queue 214 of the supervisor 110, the ingress component signals an associated ingress processor 221 at Time 1 that new data is ready to be dequeued by asserting a data ready signal 318. Without dequeuing the packet, the ingress processor 221 reads the destination address of the packet. Based on the destination address, the ingress processor 221 determines the egress port to which the packet should be routed. Having determined which egress port to use, the ingress processor 221 asserts a reservation request signal 230 to the egress processor 260 associated with that egress port.

In response to the reservation request signal 230, the reservation arbiter 264 of the egress processor 260 will assert a reservation acknowledgement signal 231, unless the congestion signal 274 is asserted and/or the egress processor 260 is waiting for another ingress processor to enqueue a buffer ID into the egress processor's buffer identifier queue 262 after granting that other ingress processor a reservation. The congestion signal 274 is a logical OR result of the egress processor congested signal 271 and egress port congestion signal 292*a*/292*b*/292*c*, as discussed above with FIG. 3A.

While the congestion signal 274 is asserted and/or while waiting for an ingress processor to use a previously granted reservation, the reservation arbiter 264 will postpone asserting the reservation acknowledgement signal 231. However, when the egress processor 260 is not waiting on another ingress processor, once the congestion signal 274 is de-asserted (illustrated as Not Congestion 374, which is the inverse of the congestion signal 274) at Time 2, the reservation arbiter 264 of the egress processor 260 asserts the reservation acknowledgement signal 231.

Having received the reservation acknowledgement, the ingress processor 221 asserts a buffer request signal 233 at Time 3, after a buffer available signal 232 is asserted by the buffer pool allocator 241 (indicating that a buffer of the buffer pool is available for allocation in accordance with the pool depth 378). If the buffer available signal 232 is already asserted when the ingress processor receives the reservation acknowledgement 231, then the assertion of the buffer request signal 233 may be on the next clock cycle after the reservation is acknowledged. Once asserted, the buffer request signal 233 may remain asserted until the buffer pool allocator 241 replies with a buffer grant 237 and a buffer ID 236, and the grant is accepted (Get 238), even if the buffer available signal 232 is de-asserted or the ingress processor 221 does not accept a grant in the interim.

The assertion of the buffer request signal 233 is received by an arbiter (839 in FIG. 8B) of the buffer pool allocator 241. After the arbiter 839 selects among the buffer requests 233 from the ingress processor 221, the buffer pool allocator 241 outputs a buffer ID 236 of an available buffer and asserts a grant signal 237 line of the selected ingress processor 221 at Time 4.

However, because the pool depth 378 at Time 4 is equal to one, the buffer pool allocator 241 has also signaled that it is the last buffer (334, corresponding to the inverse of the Not Last Buffer signal 234). Since the destination of the packet is an external egress port, the ingress processor 221 will not accept the grant. As a result, if another ingress processor has requested a buffer, the arbiter 839 will select a different ingress processor on the next clock cycle, and offer the buffer to that ingress processor. If only the one ingress processor is requesting a buffer, the arbiter 839 may offer the buffer to that ingress processor again on the next clock cycle, which it will again decline to accept if it is the last buffer. If no other buffer is available and no other ingress processor requests a reservation for a packet headed for a destination on the device, this grant-decline pattern may continue until a second buffer becomes available.

At Time 5, after another buffer is released and the pool depth 378 increases to two, the buffer pool allocator asserts a Not Last Buffer signal 234 (illustrated as "!Last Buffer" 234 in FIGS. 2C and 2D, with the exclamation point prefix denoting a logical NOT). At Time 6 (which may be the same clock cycle as Time 5 or later), the arbiter 839 again selects the ingress processor 221 and asserts the grant signal 237, responding to the request buffer signal 233 from Time 3 (which remains asserted until the ingress processor 221 accepts a grant).

In the same clock cycle (Time 6), since the offered buffer is not the last buffer, the ingress processor 221 accepts the grant, asserting a Get signal 238. The ingress processor 221 also stores the buffer ID in a buffer pool address pointer register 222 of the ingress processor 221. On the next clock cycle after acceptance, at Time 7, the ingress processor 221 initiates two operations. One operation is to assert a write strobe 335 and outputs the buffer ID 336 (236') stored in register 222, causing the buffer ID 236' (as read from register 222) to be enqueued in the buffer identifier queue 262 of the destination egress processor 260. This enqueuing releases the reservation arbiter 264 of the egress processor 260 to accept another reservation request. Another operation is to initiate the sequential copy 346 of the packet (as described with FIG. 3A) from the ingress port data queue 212-214 to the assigned buffer pool 242 buffer, signaling the ingress port data queue with a get data signal 341 to dequeue data, and signaling the buffer pool 242 to write (344) the data to a buffer location corresponding to the buffer ID 345 (236').

At Time 8, after a buffer ID 270 is dequeued (354) from the egress port descriptor queue 262, the egress processor 260 initiates the sequential copy 356 (as described with FIG. 3A) of the data from the buffer corresponding to the dequeued buffer ID 345. The egress processor 260 gets (355) data from the buffer specified by the buffer ID 354, and begins enqueuing the data into the egress data queue 282 of the egress Tx MAC 106. The first word enqueued into the data queue 282 is illustrated by the put data 360a operation.

At Time 9, prior to completion of the sequential copy 356, the egress processor 260 releases (265) the assigned buffer, with the sequential copy concluding thereafter with the "put" data 360b, enqueuing the last word of the packet into the egress data queue 282. As discussed in connection to FIG. 3A, the ability to release the assigned buffer prior to completing the copy of the packet is made possible by determining the length of the packet from the packet header (included in the first word to be copied), and releasing the buffer a predetermined number of clock cycles prior to the end of the packet. The predetermined number of clock cycles is based on a minimum number of clock cycles before the data in a released buffer may overwritten by another ingress processor 221. As a result, the throughput of the buffer pool 242 may be maximized. After the buffer ID is released (265) by an egress processor 260, the buffer pool allocator 241 responds with a release acknowledgement 372, which may be received either before or after copying of the packet is completed. If not received before copying is complete, the egress processor 260 may wait for the acknowledgement 372 before beginning the copying of a next packet.

FIG. 3C is a transaction flow diagram illustrating an example of signaling 302 between and within components in FIGS. 2C and 2D for a packet destined for a component within the device containing the L1 router 142. After a packet is enqueued into an ingress data queue 212-214, the ingress component signals an associated ingress processor 221 at Time 1 that new data is ready to be dequeued by asserting a data ready signal 318. Without dequeuing the packet, the ingress processor 221 reads the destination address of the packet. Based on the destination address, the ingress processor 221 determines the egress port to which the packet should be routed. Having determined which egress port to use, the ingress processor 221 asserts a reservation request signal 230 to the egress processor 260 associated with that egress port.

As discussed with FIGS. 3A and 3B, at Time 2, the reservation arbiter 264 of the egress processor 260 will assert a reservation acknowledgement signal 231. At Time 3, the ingress processor requests a buffer (signal 233) from the buffer pool allocator 241. At Time 4, the buffer pool allocator 241 grants (237) the buffer request. However, in comparison to FIG. 3B, this time the ingress processor 221 accepts the buffer, asserting a Get signal 238 at Time 4 (within the same clock cycle that the grant signal 237 was received). Even though the offered buffer is once again the last buffer, the ingress processor 221 accepts the grant because the packet is destined to be routed to a component on the same device as the L1 router 142.

At Time 5, on the next clock cycle after grant acceptance, the ingress processor 221 initiates two operations. One operation is to assert a write strobe 335 and outputs the buffer ID 336 (236') stored in register 222, causing the buffer ID 236' (as read from register 222) to be enqueued in the egress processor's buffer identifier queue 262 of the destination egress processor 260. This enqueuing releases the reservation arbiter 264 of the egress processor 260 to accept another reservation request. Another operation is to initiate a sequential copy 346 of the packet from the ingress port data queue 212-214 to the assigned buffer pool 242 buffer, signaling the ingress port data queue with a get data signal 341 to dequeue data, and signaling the buffer pool 242 to write (344) the data to a buffer location corresponding to the buffer ID 345 (236').

At Time 6, after a buffer ID 270 is dequeued (354) from the egress port descriptor queue 262, the egress processor 260 initiates a sequential copy 356 of the data from the buffer corresponding to the dequeued buffer ID 345. The egress processor 260 gets (355) data from the buffer specified by the buffer ID 354, and begins enqueuing the data into an egress data queue 283 of the L2 router 112 or an egress data queue 284 of the supervisor 110. The first word enqueued into the data queue 283/284 is illustrated by the put data 360a operation.

At Time 7, prior to completion of the sequential copy 356, the egress processor 260 releases (265) the assigned buffer, with the sequential copy concluding thereafter with the "put" data 360b, enqueuing the last word of the packet into the egress data queue 283/284. After the buffer ID is released (265) by an egress processor 260, the buffer pool allocator 241 responds with a release acknowledgement 372, which may be received either before or after copying of the packet is completed. If not received before copying is complete, the egress processor 260 may wait for the acknowledgement 372 before beginning the copying of a next packet.

Referring to FIGS. 3A-3C, the reservation arbiter 264 of the egress processors 260 may select among multiple reservation requests 230 from different ingress processors 220/221 based in part on quality-of-service (QoS) data extracted from the packet header by an ingress processor 220/221 and included with the reservation request. Based on the QoS information, a reservation acknowledgement for a later-arriving reservation request 230 may receive a reservation acknowledgement 231, prior to an earlier-received request that has lower priority. When more than one reservation request is received in a same clock cycle, and each have identical priority, the reservation arbiter may use a default scheduling algorithm to select which request to respond to first, such as by using round-robin scheduling.

FIG. 4A illustrates an example of how a packet 430 is divided into words 434a-434g. The packet comprises a header 402 in the first word 434a. The length of the payload 436 of the packet 430 is variable, with the length specified in the header 402. As illustrated, the payload 436 is composed of six words 404a to 404f, such that the length of the packet is seven words. Each packet 430 has a maximum allowable length 438, which is depends upon the packet communication protocol.

FIG. 4B illustrates how each packet storage slot/buffer 442 in a data queue 212-214 and 282-284, and a buffer in the buffer pool 242, can store a packet having the maximum packet length 438. So, for example, a single packet storage slot 442 of a data queue or a buffer of the buffer pool may store words 444a to 444p. If a packet 430 is received that comprises only a header 402 (i.e., a single word 434a), the packet will be stored in the first word 444a of the packet storage slot/buffer 442. Likewise, if a packet is received that has the maximum length 438, all of the words 444a-444p of the packet storage slot/buffer will be used to store the packet.

Each queue slot and buffer 442 includes two additional bits that may be appended onto each word of a packet: an end-of-packet (EOP) indicator 446 and a start-of-packet (SOP) indicator 448. The EOP and SOP indicators may be appended onto the words of a packet for use within the device 100 when the packet enters the device 100 via an Rx MAC 107. The ingress and egress data queues coupled to the L1 router 102/142 and each buffer of the buffer pool 242 may accommodate storing the EOP and SOP bits with the packet 430, with EOP and SOP bits being copied when a packet 430 is copied. The EOP and SOP may be used to facilitate packet management at a top level of the network hierarchy within the device 100 (e.g., in packets exchanged via the L1 router 102/142) or throughout the device 100.

FIG. 4C illustrates the example packet 430 from FIG. 4A stored in a queue slot or buffer from FIG. 4B. The SOP bit 448 is set to true for the first word 444a containing the header 402, and the EOP but 446 is set to true for the last word 444g containing the final word 404f of the payload 436.

Figure 4D:
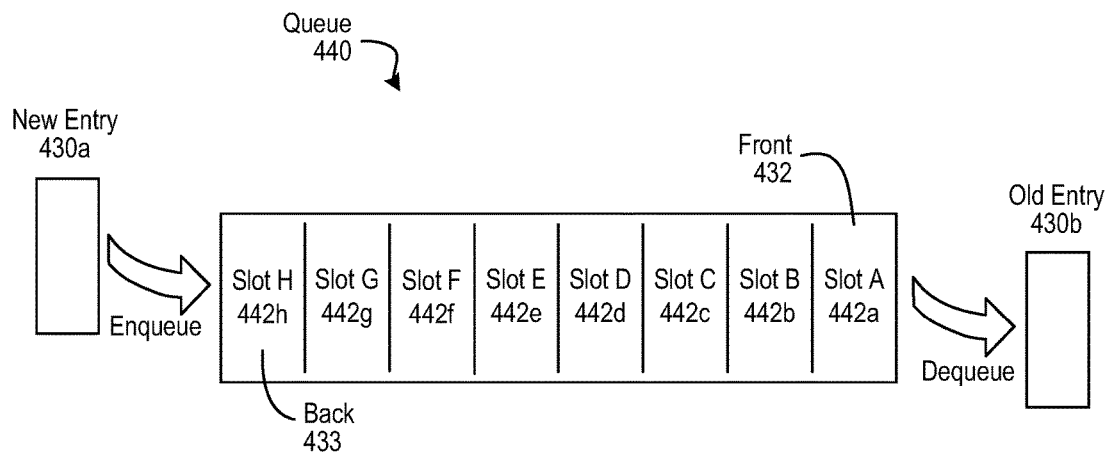
FIG. 4D illustrates an example of packets being enqueued and dequeued into a first-in-first-out (FIFO) storage queue.

FIG. 4D illustrates a packet being enqueue and dequeued from the memory/register stack of a data queue 440, such as the ingress data queues 212-214 and the egress data queues 282-284. Each queue 440 comprises a stack of storage slots 442a to 442h, where each "slot" is sized to store a single packet based on the maximum length 438 that a packet may be, along with any appended packet management bits such as EOP 446 and SOP 448. "Enqueuing" includes a write to a slot/buffer 442 and advancing a "back" pointer 433 (although not necessarily in that order). "Dequeuing" includes a read from a slot/buffer 442 and advancing a "front" pointer 432 (although not necessarily in that order). Dequeuing can be either destructive (erasing the data that is read) or nondestructive (leaving the data intact in the slot/buffer until it is overwritten by a subsequent enqueuing operation). When an input queue receives a new packet 430a, it is enqueued to the back in accordance with a back pointer 433. When a component dequeues a packet 430b, the packet 430b is dequeued from the front of the queue in accordance with a front pointer 432. The "depth" of the queue 440 is equal to the number of slots 442 that are enqueued with data (i.e., the number of slots 442 that contain data to be dequeued). When the queue is empty (i.e., depth=0), the front pointer 432 and the back pointer 433 may point to a same slot. The principles of operation are the same for the buffer identifier queue 262 of the egress processor and a buffer ID queue 870 (FIGS. 8A and 8B) within the buffer pool allocator 240/241, except the slots of those queues 262 and 870 may each be sized to store a single buffer ID (e.g., a single word per slot).

Figure 4E:
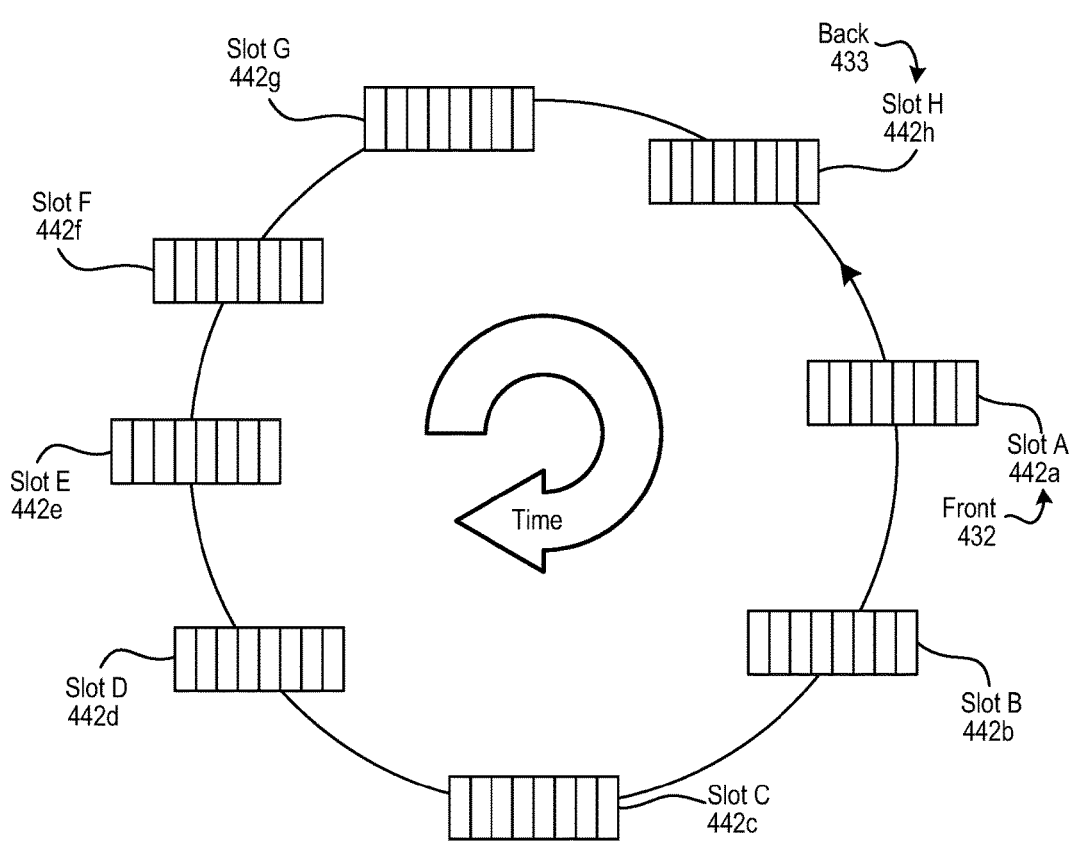
FIG. 4E is a representation of how slots within a queue may be accessed and recycled in a circular manner.

FIG. 4E is an abstract representation of how slots within the queue stack are accessed and recycled in a first-in-first-out (FIFO) manner. Enqueued packets remain in their assigned slot 442a-442h, with the back pointer 433 and front pointer 432 changing as the packets 430 are enqueued and dequeued. At "full capacity," no slots 442 are available in the queue 440. Capacity being "available" means there is at least one free slot.

Figure 5:
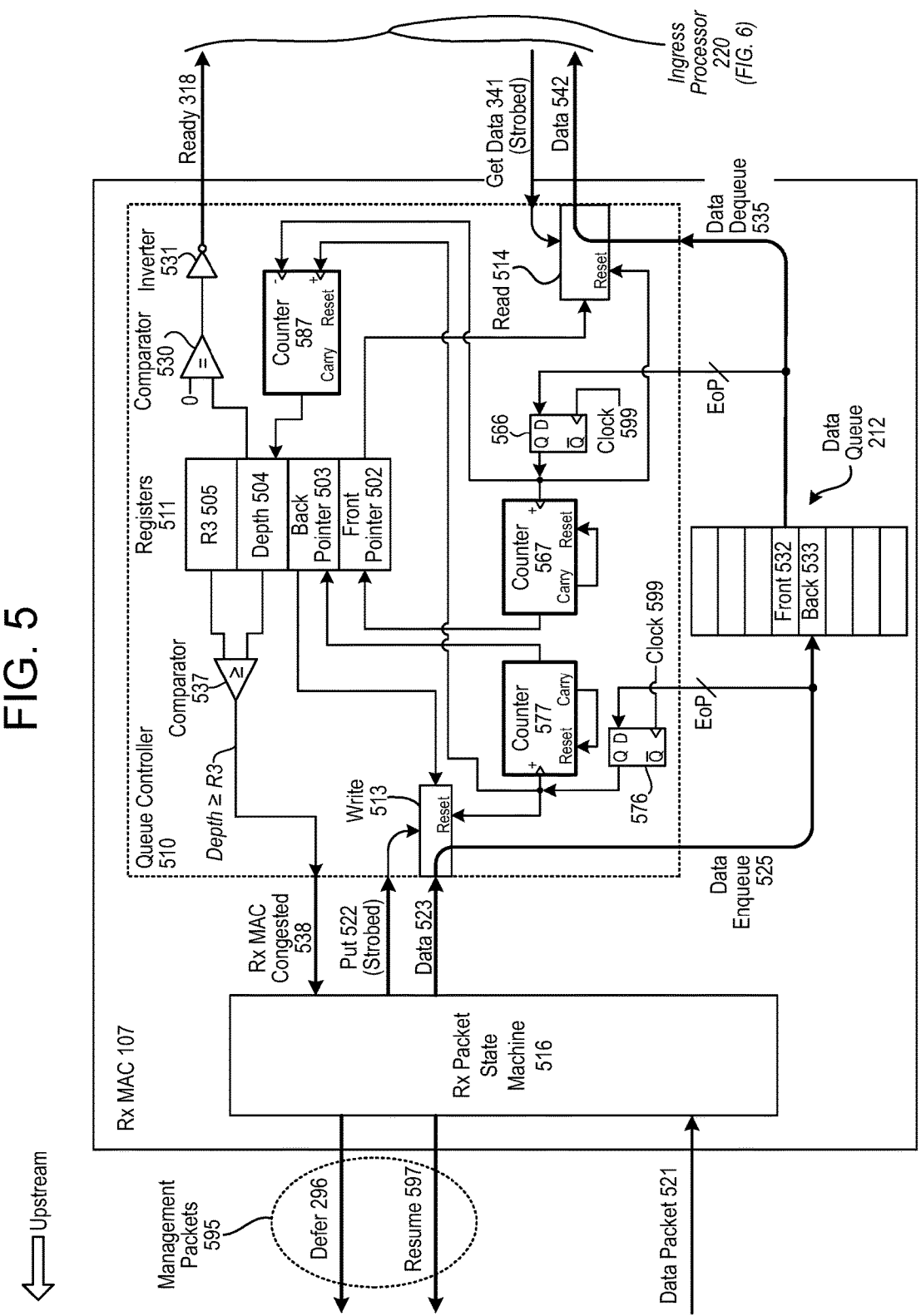
FIG. 5 is a block diagram conceptually illustrating components of a media access control (MAC) receiver.

FIG. 5 is a block diagram conceptually illustrating components of an Rx MAC 107 of the device 100. As in FIGS. 2B and 2D, the external communication channel (PHY 108) is omitted for brevity. An Rx packet state machine 516 of the Rx MAC 107 receives a data packet 521 from an upstream device, and enqueues the packet into the ingress data queue 212, appending the EOP bit 446 and the SOP bit 448 as the words are copied. The Rx packet state machine 516 sets the SOP bit 448 to true for the first word of the packet, and sets the EOP bit 446 true for the last word of the packet. In response to the depth 504 of the data queue 212 equaling or exceeding the threshold value R3 505, the state machine 516 transmits the Defer packet 296. Once the depth 504 returns to a level below R3 505, the state machine 516 transmits a Resume packet 597. The Defer packet 296 and Resume packet 597 are data flow "management" packets 595. Other management packets (not illustrated) may indicate, for example, when the data queue 212 is completely full (e.g., a transmit off "XOFF" packet), and when the data queue 212 has a slot available (e.g., a transmit on "XON" packet).

To enqueue (525) a received packet, the state machine 516 outputs the contents of the packet via a data bus 523 one word at a time. Each time a word is output, the state machine 516 strobes a put signal 522. A write circuit 513 manages addressing the packet data to the back 533 of the queue 212. The write circuit 513 contains a counter that increments (or decrements) with each strobing of the put signal 522. The bits of the back pointer 503 provide the most significant bits of the variable portion of the write address, whereas the output of the counter within the write circuit 513 provide the least significant bits of the variable portion of the write address. The write circuit 513 may use the put signal 522 as a write strobe to trigger the memory cells or registers at the designated write address to store the block of data, comprising a word of the packet and the appended packet management bits. Between enqueued packets, the counter within the write circuit 513 is reset.

Similarly, when the Rx MAC 107 receives a strobed get data signal 341 from an associated ingress processor 220/221, a read circuit 514 manages the dequeuing (535) of the packet data, which is transmitted as a series of words on a data bus 542. The read circuit 514 manages addressing to the front of the queue 212. The read circuit 514 contains a counter that increments (or decrements) with each strobing of the get signal 341. The bits of the front pointer 502 provide the most significant bits of the variable portion of the read address, whereas the output of the counter within the read circuit 514 provide the least significant bits of the variable portion of the read address. Between dequeued packets, the counter within the read circuit 514 is reset.

A bus line used corresponding to the EOP bit 446, of the parallel bus that is used to enqueue 525 the packet, is tied to the "D" input of a D flip-flop 576 that serves as a delay element. On the rising edge of the clock signal 599 following the enqueuing of a word that has a "true" EOP indicator, the non-inverting "Q" output of the flip-flop 576 is asserted, causing a counter 577 to increment the back pointer 503. The counter 577 is set to step through each slot of the data queue 212, and then reset back to zero in a continual loop. Among the many ways such looping may be accomplished, a "carry" output that is asserted when the counter 577 is incremented past the maximum value is tied to the counter's own reset. A rising edge of the non-inverting output of the delay element 576 is also used to reset the counter within the write circuit 513, and to increment an up-down counter 587. The up-down counter 587 keeps track of the depth 504 of the data queue 212.

A bus line used corresponding to the EOP bit 446, of the parallel bus that is used to dequeue 535 the packet, is tied to the "D" input of a D flip-flop 566 that serves as a delay element. On the rising edge of the clock signal 599 following dequeuing of the word that has a "true" EOP indicator, the non-inverting "Q" output of the flip-flop 566 is asserted, causing a counter 567 to increment the front pointer 502. Like the counter 577, the counter 567 is set to step through each slot of the data queue 212, and then reset back to zero in a continual loop. A rising edge of the non-inverting output of the delay element 566 is also used to reset the counter within the read circuit 514, and to decrement the up-down counter 587 that tracks the depth 504 of the data queue 212.

A digital comparator 537 compares the depth 504 of the with the threshold value R3 505 to determine whether the depth is greater than or equal to the threshold R3. As used herein, where a comparator is illustrated as determining whether a first value is "greater than or equal to" a second value, the circuit may comprise a first comparator testing "equal to" and a second comparator testing "greater than," with the outputs of the comparators combined by an OR gate. Likewise, when a comparator is illustrated as determining whether a first value is less than or equal to a second value, the circuit may comprise a first comparator testing "equal to" and a second comparator testing "less than," with the outputs of the comparators combined by an OR gate.

If the comparator 537 determines that the depth is greater than or equal to the threshold R3, a congestion signal 538 is asserted, causing the state machine 516 to issue a defer packet 296. The state machine 516 then enters a wait state while it waits for the congestion signal 538 to be de-asserted, upon which it transmits the resume packet 597. While in the wait state, the state machine 516 can continue to receive and enqueue data packets 521. Another comparator 530 compares the depth 504 to zero to determine whether the depth 504 is equal to zero. The output of the comparator 530 is input into an inverter 531, the output of which is asserted if the depth is not equal to zero, providing the data ready signal 318 to the ingress processor 220/221.

The front pointer 502, the back pointer 503, the depth value 504, and the R3 threshold 505 are illustrated as being stored in registers 511. Using such registers, looping increment and decrement circuits may be used to update the front pointer 502, back pointer 503, and depth value 504 as stored in their registers instead of dedicated counters. In the alternative, using the counters 567/577/587, the registers used to store the front pointer 502, back pointer 503, and depth value 504 may be omitted, with the values read from the counters themselves. The register 505 storing the R3 threshold may be individually programmed for the specific Rx MAC 107, or may be shared among multiple Rx MACs 107, such as all of the Rx MACs associated with external ports sharing one R3 stored threshold value, all of the ports associated with the L2 router 112 sharing another stored R3 threshold value, and the supervisor storing its own R3 threshold value.

Figure 6A:
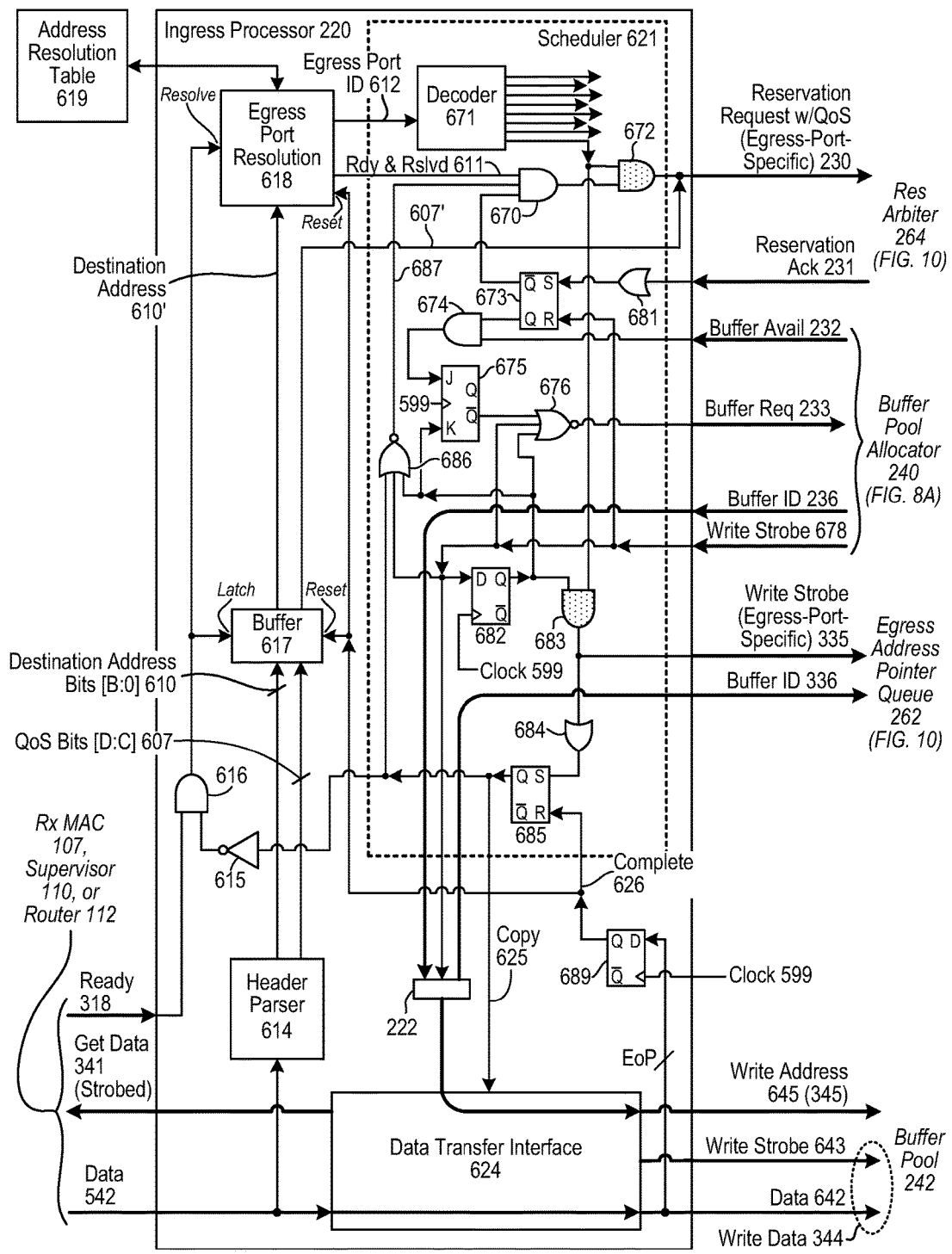
FIGS. 6A and 6B are block diagrams conceptually illustrating example components of ingress processors.

FIG. 6A is a block diagram conceptually illustrating example components of an ingress processor 220 of a chip 100 with an L1 router 102. Each ingress processor 220 includes a header parser 614 that extracts a destination address 610 and a Quality of Service (QoS) packet priority indication 607 from a packet header 402, a buffer 617 that temporarily stores the destination address bits 610 and the QoS bits 607, a route analyzer 618 that resolves which egress port to which to route the packet based on the destination address, a scheduler 621 that makes the reservation with the reservation arbiter 264 and obtains a buffer to use from the buffer allocator 240, and a data transfer interface 624 that sequentially copies data from the ingress data queue 212-214 to the allocated buffer of the buffer pool 242.

Each of the ingress data queues 212-214 exposes the first word of a packet at the front of the queue to the data bus 542, such that even before the packet is dequeued, the header 402 of the packet can be read. The destination address 610 comprises of a specific range of bits within the header 402, such as a range from bit "B" to bit zero (illustrated as bits [B:0], and which will be described further below in connection with FIG. 14), which the header parser 614 outputs to a buffer 617. Likewise, the QoS indicator 607 comprises another specific range of bits within the header 402, such as bits D to C, which the header parser 614 also outputs to the buffer 617.

As determined by logic circuits (inverter 615, AND gate 616), when the associated ingress component (107, 110, 112) asserts the ready signal 318, indicating that there is packet available to be dequeued, and the ingress processor 220 is not currently copying a packet, the buffer 617 latches the destination address 610 and the QoS indicator 607, and the route analyzer 618 is signaled to resolve which egress port should be used to reach the destination address 610. The AND gate 616 may also verify (not illustrated) that the line corresponding to SOP indicator 448 on the data bus 542 is asserted, since the SOP indicator 448 should be asserted when the header 402 is available on the data bus 542.

The route analyzer 618 determines which egress port to which to route the packet based at least in part on a first segment of the destination address being indexed to an egress port identifier in an address resolution table stored in memory 619. The stored address resolution table may be shared among ingress processors 220, or stored locally within each ingress processor 220. Multiple address resolution tables may be used to resolve a single address, with different tables indexed to different segments (i.e., ranges of bits) within the destination address 610. The route analyzer 618 may use any address routing resolution methodology, as known in the art, and may comprise, among other things, a multi-state hardware address resolution engine, or a processor executing a program stored in memory to search the address resolution table 619 to determine which egress processor to use. The address resolution table 619 may be stored in address-based memory storage, arranged in whole or in part as a hash table, and/or may be stored in a content-addressable memory (CAM).

For general background on hardware-based route resolution, see "Routing Lookups in Hardware at Memory Access Speeds" by P. Gupta, S. Lin, and N. McKeown, IEEE INFOCOM '98—Proceedings of the Seventeenth Annual Joint Conference of the Computer and Communications Societies, Vol. 3, pages 1240-1247, IEEE 1998; "Binary Decision Diagrams For Efficient Hardware Implementation of Fast IP Routing Lookups," by R. Sangireddy and A. K. Somani, Tenth International Conference on Computer Communication Networks, pages 12-17, IEEE 2001; and "Hardware Based Routing Lookup for IPv4," by W. S. Yang and J. J. Shieh, ICS 2000, Workshop on Computer Networks, Internet, and Multimedia, Taiwan, pages 223-230, 2000.

Once address resolution is complete, the route analyzer 618 outputs an egress port identifier 612 and asserts a ready and resolved signal 611. A decoder 671 decodes the egress port ID 612, asserting an output line corresponding to the specified egress port. The output line is input into an AND gate 672. Another input of the AND gate 672 receives an output of an AND gate 670. The inputs into the AND gate 670 are the ready and resolved signal 611, the inverting output ("!Q") of an S-R flip-flop 673, and a signal 687 output by a NOR gate 686. The S-R flip-flop 673 asserts and hold its non-inverting output ("Q") in response to receiving a reservation acknowledgement signal 231, such that an assertion of the inverting output ("!Q") of the S-R flip-flop 673 indicates that an acknowledgement has not yet been received. As used herein, an inverted output, a NOT operation, and a de-asserted signal may be noted by an exclamation point "!". The inputs of the NOR gate 686 are the write strobe 678 from the buffer pool allocator 240, a one-clock cycle delayed copy of the write strobe, and the copy signal 625. The output signal 687 of the NOR gate 686 is deasserted from a time a buffer is granted to the scheduler 621 by the buffer pool allocator 240 until packet copying is complete. The result is that the reservation request signal 230 will be asserted in response to the ready and resolved signal 611 for the selected egress port, and thereafter will be deasserted in response to the reservation acknowledgement signal 231.

There is an AND gate 672 for each output of the decoder 671 (denoted in FIG. 6A by the shading of AND gate 672), where the output of each of the AND gates 672 corresponds to a reservation request signal line 230 for the corresponding egress port. After the ready and resolved signal 611 is asserted and the decoder output corresponding to the egress port is asserted, the AND gate 672 asserts the reservation request signal 230 until a reservation acknowledgement 231 is received. The QoS bit lines 607' may be provided to the reservation arbiter 264 along with the reservation signal line 230 (illustrated collectively as 230).

Although a single reservation acknowledgement signal 231 is illustrated, an OR gate 681 may be used to aggregate the reservation acknowledgement signals from all of the egress processors into the single reservation acknowledgement signal, or a ingress-port specific reservation acknowledgement line may be shared among the egress processors 260. Assertion of the reservation acknowledgement signal 231 is input into set "S" input of the S-R flip-flop 673.

After the reservation acknowledgement signal 231 is asserted, the S-R flip-flop 673 asserts its non-inverting "Q" output and deasserts its inverting !Q output, maintaining assertion of the non-inverting output until the scheduler 621 is granted a buffer (indicated by assertion of the write strobe 678). The inverting !Q output of the S-R flip-flop 673 is input into the AND gate 670, and the reset "R" input tied to the to the write strobe 678.

After the reservation has been acknowledged and the buffer available signal 232 is asserted, an AND gate 674 asserts a line input into a set "J" input of a J-K flip-flop 675. This causes the non-inverting Q output of the J-K flip-flop 675 to be asserted on the rising edge of the next cycle of the clock 599. Likewise, the inverting !Q of the J-K flip-flop 675 is de-asserted on the rising edge of the next cycle of the clock 599.

The inverting !Q of the J-K flip-flop 675 is input into a NOR gate 676, the output of which provides the buffer request signal 233. The buffer request signal 233 is asserted on the rising edge of the next clock cycle after the reservation has been acknowledged (231) and a buffer is available (232). The reset "K" input of the J-K flip-flop 675 is connected to a non-inverting "Q" input of the D flip-flop 682, causing the J-K flip-flop 675 to reset on the clock cycle following assertion of the write strobe 678 and receipt of the buffer ID 236. Resetting the flip-flop 675 causes the inverting !Q output to be asserted. The inputs of the NOR gate 676 are the inverting !Q output of flip-flop 675, the write strobe line 678, and the one-cycle delayed state of the write strobe line 678 (as output by the non-inverting Q output of D flip-flop 682). The result is that as soon as the write strobe 678 is received from the buffer pool allocator 240, the buffer request signal 233 is de-asserted.

The buffer pool allocator 240 responds to the assertion of the buffer request signal 233 with an assigned buffer ID 236 and the write strobe 678. The write strobe 678 causes the buffer pool address pointer register 222 to store the buffer ID 236. A delay element 682 (e.g., a D flip-flop) also receives the write strobe as input, and upon the next pulse of the clock signal 599, asserts its non-inverting output ("Q"). The non-inverting Q output of the delay element 682 is input into a plurality of AND gates 683 (one for each output of the decoder 671, as denoted by the shading), where there is one AND gate 683 for each of the egress ports. Another input of each AND gate 683 is tied to a corresponding output of the decoder 671. The result is that the output of the AND gate 683 corresponding to the selected egress port is asserted on the rising edge of the clock cycle following reception of the write strobe 678, producing the egress-port-specific write strobe 335 sent to the egress address pointer queue 262. This causes the buffer ID 336 stored in the register 222 to be enqueued in the queue 262. If the register 222 is dual ported, the write strobe 678 may be input into the AND gate 683 instead of the delayed output of the delay element 682, such that the buffer ID 236 may be written to the register 222 and read from the register (as Buffer ID 336) in a single clock cycle.

The outputs of the AND gates 683 for all of the egress ports are aggregated by an OR gate 684. The output of the OR gate 684 is input into the "set" input of an S-R flip-flop 685, which asserts and holds its non-inverting output ("Q") to provide a "copy" signal 625. The assertion of the copy signal 625 causes the data transfer interface 624 to sequentially copy data from the corresponding ingress data queue 212-214, sequentially receiving words of the packet on data bus 542 in response to the strobing of the get data line 341.

The data transfer interface 624 includes a counter (not illustrated) that outputs a word count that is appended as the least significant bits onto the write address 645. The buffer ID stored in register 222 provides the most significant bits of the write address 645. In the alternative, the write address 645 may begin at the buffer ID stored in the register 222, and then be incremented with each new word from the ingress queue. As the blocks are output on data bus 642 as the write data 344 to the allocated buffer in the buffer pool 242, the data transfer interface 624 toggles a write strobe 643.

A bus line corresponding to the EOP bit 446, of the parallel bus 642 that is used to copy the packet is tied to the "D" input of a D flip-flop 689 that serves as a delay element. On the rising edge of the clock signal 599 following detection of the word that has a "true" EOP indicator, the non-inverting "Q" output of the flip-flop 689 is asserted as the copy-complete signal 626. Assertion of the copy-complete signal 626 is input into the "reset" input of the S-R flip-flop 685, de-asserting the copy signal 625, which also causes the data transfer interface 624 to stop the sequential copy 346 and reset its internal counter. The assertion of the copy-complete signal 626 also resets the destination address/QoS buffer 617, clearing the destination address and the QoS indicator, and resets the route analyzer 618.

Figure 6B:
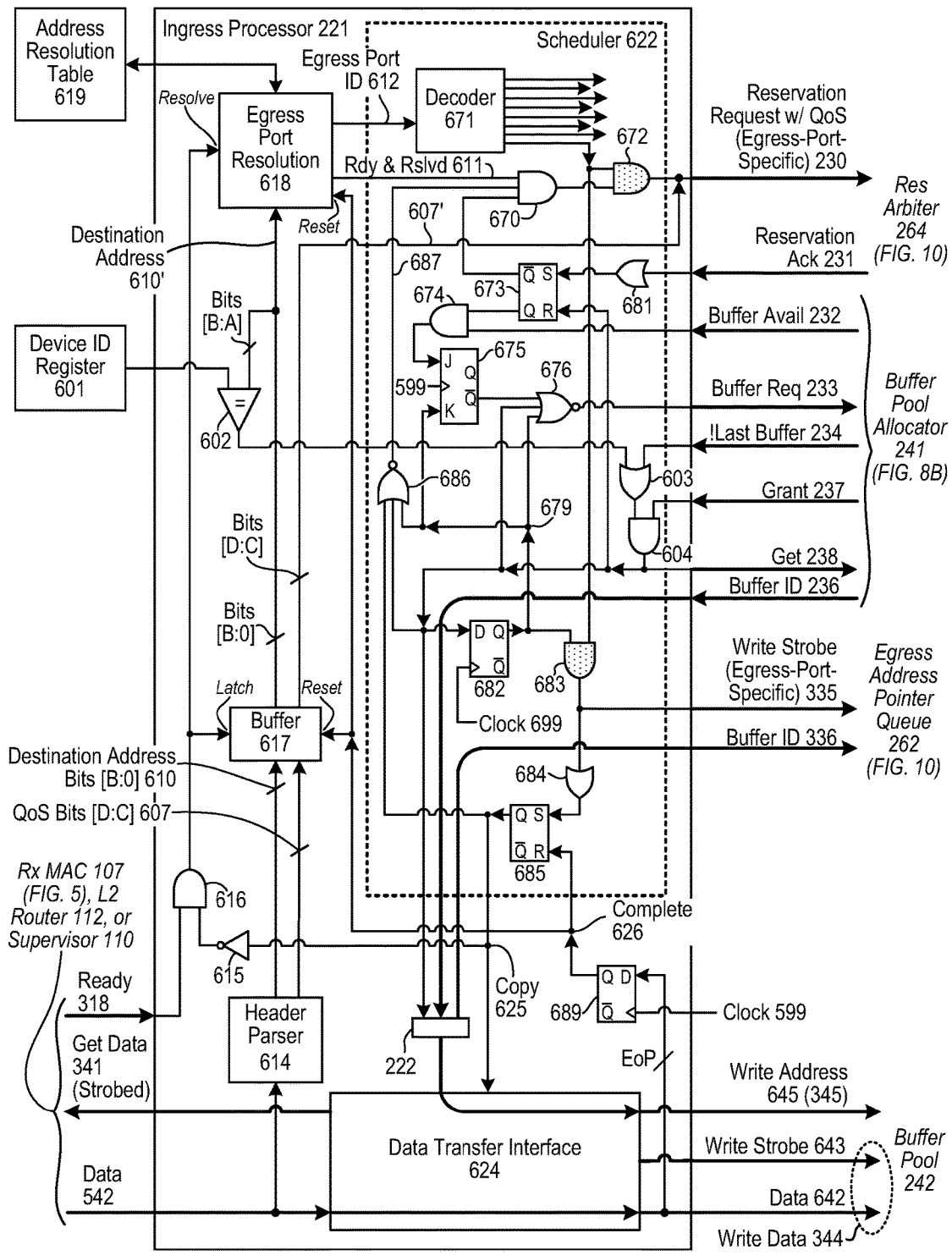

FIG. 6B is a block diagram conceptually illustrating example components of an ingress processor 221 of a chip 100 with an L1 router 142. Each ingress processor 221 includes a header parser 614 that extracts a destination address 610 and a Quality of Service (QoS) packet priority indication 607 from a packet header 402, a buffer 617 that temporarily stores the destination address bits 610 and the QoS bits 607, a route analyzer 618 that resolves which egress port to which to route the packet based on the destination address, a scheduler 622 that makes the reservation with the reservation arbiter 264 and obtains a buffer to use from the buffer allocator 241, and a data transfer interface 624 that sequentially copies data from the ingress data queue 212-214 to the allocated buffer of the buffer pool 242.

Each of the ingress data queues 212-214 exposes the first word of a packet at the front of the queue to the data bus 542, such that even before the packet is dequeued, the header 402 of the packet can be read. The destination address 610 comprises of a specific range of bits within the header 402, such as a range from bit "B" to bit zero (illustrated as bits [B:0], and which will be described further below in connection with FIG. 14), which the header parser 614 outputs to a buffer 617. Likewise, the QoS indicator 607 comprises another specific range of bits within the header 402, such as bits D to C, which the header parser 614 also outputs to the buffer 617.

As determined by logic circuits (inverter 615, AND gate 616), when the associated ingress component (107, 110, or 112) asserts the ready signal 318, indicating that there is packet available to be dequeued, and the ingress processor 221 is not currently copying a packet, the buffer 617 latches the destination address 610 and the QoS indicator 607, and the route analyzer 618 is signaled to resolve which egress port should be used to reach the destination address 610. The AND gate 616 may also verify (not illustrated) that the line corresponding to SOP indicator 448 on the data bus 542 is asserted, since the SOP indicator 448 should be asserted when the header 402 is available on the data bus 542.

Specific bits (e.g., bits B to A) of the data bus lines (e.g., bits B to 0) conveying the latched destination address 610' from the buffer 617 to the router analyzer 618 correspond to a destination device ID in the header 402 of the packet. A digital comparator 602 compares the destination device ID to the device ID of the device containing the L1 router 142. The device ID is stored in a register 601, which may be shared among the ingress processors 221, and/or each ingress processor 221 may store the device ID in an internal register. When the output of the comparator 602 is asserted when the incoming packet is destined for a chip-internal address, and is deasserted when the incoming packet is destined for a chip-external address.

As discussed with the ingress processor 220 in FIG. 6A, the route analyzer 618 determines which egress port to which to route the packet based at least in part on a first segment of the destination address being indexed to an egress port identifier in an address resolution table stored in memory 619. The stored address resolution table may be shared among ingress processors 221, or stored locally within each ingress processor 221. Multiple address resolution tables may be used to resolve a single address, with different tables indexed to different segments (i.e., ranges of bits) within the destination address 610.

Once address resolution is complete, the route analyzer 618 outputs an egress port identifier 612 and asserts a ready and resolved signal 611. A decoder 671 decodes the egress port ID 612, asserting an output line corresponding to the specified egress port. The output line is input into an AND gate 672. Another input of the AND gate 672 receives an output of an AND gate 670. The inputs into the AND gate 670 are the ready and resolved signal 611, the inverting output ("!Q") of an S-R flip-flop 673, and a signal 687 output by a NOR gate 686. The S-R flip-flop 673 asserts and hold its non-inverting output ("Q") in response to receiving a reservation acknowledgement signal 231, such that an assertion of the inverting output ("!Q") of the S-R flip-flop 673 indicates that an acknowledgement has not yet been received. As used herein, an inverted output, a NOT operation, and a de-asserted signal may be noted by an exclamation point "!". The inputs of the NOR gate 686 are a buffer acceptance signal (get buffer 238), a one-clock cycle delayed copy of the get buffer signal, and the copy signal 625. The output signal 687 of the NOR gate 686 is deasserted from a time of acceptance by the scheduler 622 of a granted buffer until packet copying is complete. The result is that the reservation request signal 230 will be asserted in response to the ready and resolved signal 611 for the selected egress port, and thereafter will be deasserted in response to the reservation acknowledgement signal 231.

There is an AND gate 672 for each output of the decoder 671 (denoted in FIG. 6B by the shading of AND gate 672), where the output of each of the AND gates 672 corresponds to a reservation request signal line 230 for the corresponding egress port. After the ready and resolved signal 611 is asserted and the decoder output corresponding to the egress port is asserted, the AND gate 672 asserts the reservation request signal 230 until a reservation acknowledgement 231 is received. The QoS bit lines 607' may be provided to the reservation arbiter 264 along with the reservation signal line 230 (illustrated collectively as 230).

Although a single reservation acknowledgement signal 231 is illustrated, an OR gate 681 may be used to aggregate the reservation acknowledgement signals from all of the egress processors into the single reservation acknowledgement signal, or a ingress-port specific reservation acknowledgement line may be shared among the egress processors 260. Assertion of the reservation acknowledgement signal 231 is input into set "S" input of the S-R flip-flop 673.

After the reservation acknowledgement signal 231 is asserted, the S-R flip-flop 673 asserts its non-inverting "Q" output and deasserts its inverting !Q output, maintaining assertion of the non-inverting output until the scheduler 622 accepts a granted buffer (acceptance indicated by assertion of the get buffer signal 238). The inverting !Q output of the S-R flip-flop 673 is input into the AND gate 670, and the reset "R" input tied to the to the get buffer line 238.

After the reservation has been acknowledged and the buffer available signal 232 is asserted, an AND gate 674 asserts a line input into a set "J" input of a J-K flip-flop 675. This causes the non-inverting Q output of the J-K flip-flop 675 to be asserted on the rising edge of the next cycle of the clock 599. Likewise, the inverting !Q of the J-K flip-flop 675 is de-asserted on the rising edge of the next cycle of the clock 599.

The inverting !Q of the J-K flip-flop 675 is input into a NOR gate 676, the output of which provides the buffer request signal 233. The buffer request signal 233 is asserted on the rising edge of the next clock cycle after the reservation has been acknowledged (231) and a buffer is available (232). The reset "K" input of the J-K flip-flop 675 is connected to a non-inverting "Q" input of the D flip-flop 682, causing the J-K flip-flop 675 to reset on the clock cycle after the scheduler 622 accepts a buffer grant. Resetting the flip-flop 675 causes the inverting !Q output to be asserted. The inputs of the NOR gate 676 are the inverting !Q output of flip-flop 675, the get signal line 238, and the one-cycle delayed state of the get signal line 238 (as output by the non-inverting Q output signal 679 of D flip-flop 682). The result is that as soon as from the scheduler accepts a granted buffer from the buffer pool allocator 241, the buffer request signal 233 is de-asserted.

The buffer pool allocator 241 responds to the assertion of the buffer request signal 233 with a buffer ID 236 and a grant signal 237. The scheduler 622 whether to accept the grant using OR gate 603 and AND gate 604. The OR gate 603 receives the NOT Last Buffer signal 234 and the indication from comparator 602 as to whether the inbound packet is destined for an internal address. If the packet is destined for an internal address, the output of the OR gate 603 will be asserted. If the NOT Last Buffer signal 234 is asserted, the output of the OR gate 603 will also be asserted. However, output of the OR gate 603 will be de-asserted if inbound packet is destined for an external address and the buffer offered by the allocator 241 is the last buffer (indicated by the deassertion of the !Last Buffer signal line 234).

The output of the OR gate 603 and the grant signal line 237 are input into AND gate 604. The output of the AND gate 604 is the "Get" signal line 238 that indicate grant acceptance. Unless the inbound packet is destined for an external address and the offered buffer is the last buffer, the get signal is asserted immediately in response to the grant 237, such that the issuance of the grant and receipt of grant acceptance can be performed within a same clock cycle.

Assertion of the Get signal 238 causes the buffer pool address pointer register 222 to store the buffer ID 236. A delay element 682 (e.g., a D flip-flop) also receives the Get signal 238 as input, and upon the next pulse of the clock signal 599, asserts its non-inverting output ("Q"). The non-inverting Q output of the delay element 682 is input into a plurality of AND gates 683 (one for each output of the decoder 671, as denoted by the shading), where there is one AND gate 683 for each of the egress ports. Another input of each AND gate 683 is tied to a corresponding output of the decoder 671. The result is that the output of the AND gate 683 corresponding to the selected egress port is asserted on the rising edge of the clock cycle following grant acceptance, producing the egress-port-specific write strobe 335 sent to the egress address pointer queue 262. This causes the buffer ID 336 stored in the register 222 to be enqueued in the queue 262. If the register 222 is dual ported, the Get signal 238 may be input into the AND gate 683 instead of the delayed output of the delay element 682, such that the buffer ID 236 may be written to the register 222 and read from the register (as Buffer ID 336) in a single clock cycle.

The outputs of the AND gates 683 for all of the egress ports are aggregated by an OR gate 684. The output of the OR gate 684 is input into the "set" input of an S-R flip-flop 685, which asserts and holds its non-inverting output ("Q") to provide a "copy" signal 625. The assertion of the copy signal 625 causes the data transfer interface 624 to sequentially copy data from the corresponding ingress FIFO data queue 212-214, sequentially receiving words of the packet on data bus 542 in response to the strobing of the get data line 341.

The data transfer interface 624 includes a counter (not illustrated) that outputs a word count that is appended as the least significant bits onto the write address 645. The buffer ID stored in register 222 provides the most significant bits of the write address 645. In the alternative, the write address 645 may begin at the buffer ID stored in the register 222, and then be incremented with each new word from the ingress queue. As the blocks are output on data bus 642 as the write data 344 to the allocated buffer in the buffer pool 242, the data transfer interface 624 toggles a write strobe 643.

A bus line corresponding to the EOP bit 446, of the parallel bus 642 that is used to copy the packet, is tied to the "D" input of a D flip-flop 689 that serves as a delay element. On the rising edge of the clock signal 599 following detection of the word that has a "true" EOP indicator, the non-inverting "Q" output of the flip-flop 689 is asserted as the copy-complete signal 626. Assertion of the copy-complete signal 626 is input into the "reset" input of the S-R flip-flop 685, de-asserting the copy signal 625, which also causes the data transfer interface 624 to stop the sequential copy 346 and reset its internal counter. The assertion of the copy-complete signal 626 also resets the destination address/QoS buffer 617, clearing the destination address and QoS indicator, and resets the route analyzer 618.

Figure 7A:
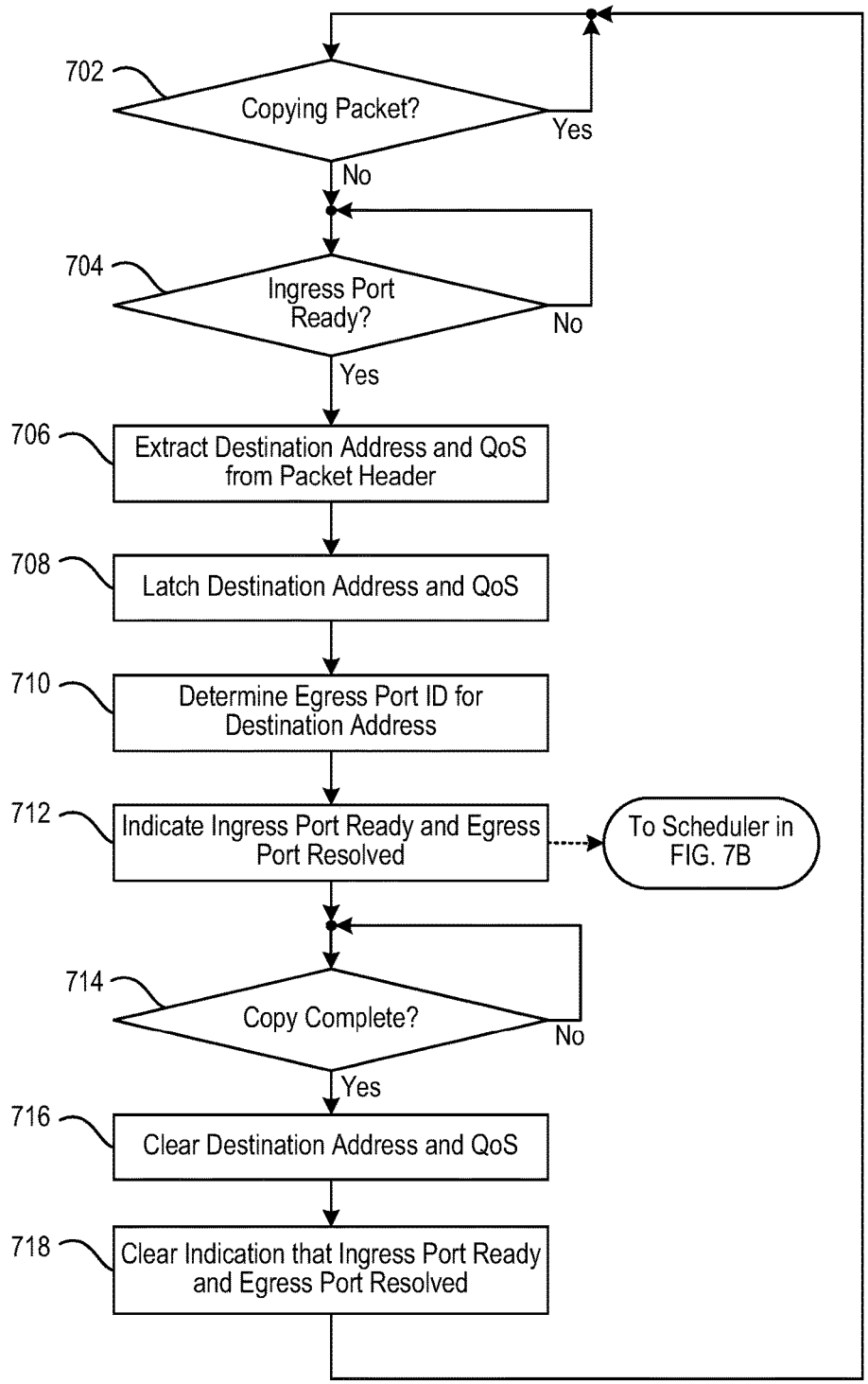
FIGS. 7A to 7C are flow charts illustrating examples of processes performed by an ingress processor.

FIG. 7A is a flow chart illustrating a process performed by the ingress processors 220 and 221. The ingress processor determines (702) whether it is copying a packet, as indicated in FIGS. 6A and 6B by the copy line 625. If it is copying (702 "Yes"), the process waits until copying is completed. With copying completed (702 "No"), the processor determines (704) whether the ingress port has a packet ready for dequeuing, as indicated in FIG. 6A by the ready line 318. If no packet is ready (704 "No"), the processor waits. When a packet is read (704 "Yes"), the destination address 610 and QoS indicator 607 are extracted (706) from the packet header 402. The destination address and QoS indicator are stored/latched (708) in the buffer 617. The route analyzer 618 then determines (710) the egress port identifier 612 of the egress port to which the packet will be routed. After determining the egress port identifier 612, the ingress processor indicates (712) that the ingress port has a packet ready to dequeue and that the egress port has been resolved (e.g., asserting line 611), activating the scheduler 621 (which will be further discussed in FIG. 7B) or scheduler 622 (which will be further discussed in FIG. 7C).

Remaining in FIG. 7A, the ingress processor 220/221 waits (714 "No") for the data transfer interface 624 to complete the copying of the data packet, under the control of the scheduler 621/622. Once the packet is copied (714 "Yes," corresponding to the assertion of the copy-completion signal 626 in FIGS. 6A and 6B), the buffer 617 storing/latching the destination address and QoS indicator is cleared (716), as well as clearing the indication (e.g., de-asserting line 611) that a packet is ready and a destination address has been resolved. The process then loops back to the beginning, checking whether a packet is being copied (702).

Figure 7B:
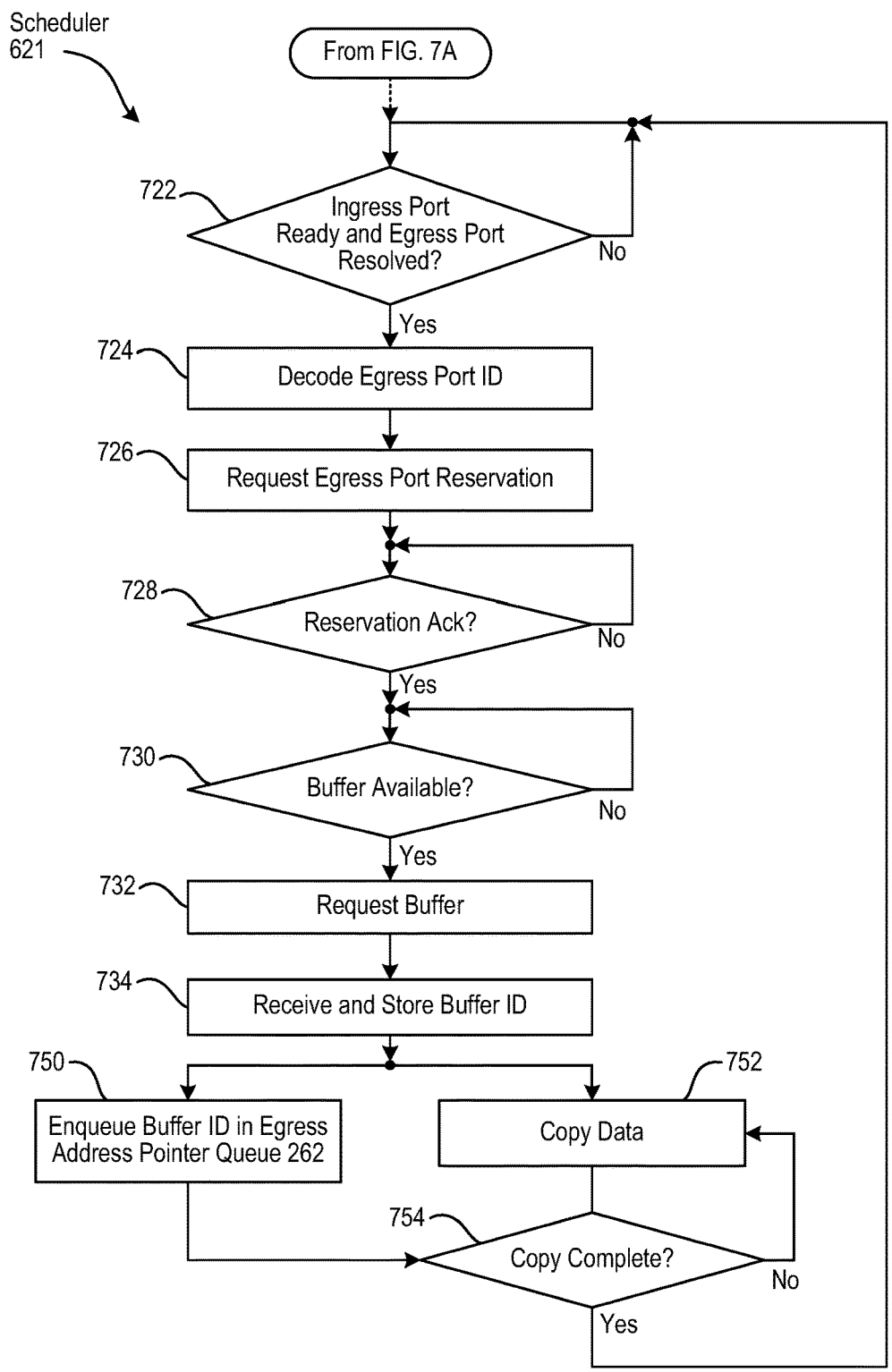

FIG. 7B is a flow chart illustrating a process performed by the scheduler 621 of the ingress processors 220. The process is a loop that begins with waiting (722 "No") for an indication that an ingress packet is ready for dequeuing and the identifier of the egress port to route the packet to has been resolved signal (corresponding to the ready and resolved signal line 611 being asserted). Once a packet is ready and the egress ID resolved (722 "Yes"), the egress port ID 612 is decoded (724), and the reservation request signal 230 for the decoded egress port ID is asserted, requesting (726) a reservation from the egress processor's reservation arbiter 264.

The scheduler 621 then waits (728 "No") for the reservation to be acknowledged. After the reservation acknowledgement is received (728 "Yes", corresponding in FIG. 6A to signal 231 being asserted), the scheduler 621 determines (730) whether a buffer is available in the buffer pool 242, such as by checking whether the buffer available signal 232 is asserted. When a buffer is available (730 "Yes"), the scheduler 621 requests (732) a buffer (e.g., by asserting the buffer request signal 233). Thereafter, the scheduler 621 receives and stores (734) the buffer ID in the register 222.

The scheduler 621 then proceeds to enqueue (750) the buffer ID into the egress address pointer queue 262, and performs (752) the sequential copy 346 of the packet from the ingress FIFO queue 212-214 to the assigned buffer. When the copy is complete (754 "Yes"), the scheduler process loops back to step 722 and waits for the next indication that an ingress packet is ready to be dequeued and the identifier of the egress port to which to route the packet has been resolved.

As an alternative to the process illustrated in FIG. 7B, instead of waiting for the reservation (the 728 "No" loop in FIG. 7B) and then requesting allocation of the buffer, the scheduler 621 may be configured to concurrently request both a reservation (726) and a buffer (732). "Concurrently" in this context means within a same clock cycle. If the scheduler 621 has not received a reservation acknowledgement 231 (728 "No") by the time a buffer is received, the scheduler 621 immediately releases the buffer without using it (e.g., by asserting a buffer release signal 265 in a manner similar to that used by the egress processors to release buffers). Then, after the reservation acknowledgement is received, the scheduler 621 will re-request a buffer (in the same manner as illustrated in FIG. 7B). This alternative approach has the disadvantage of allocating some buffers without really using them, but has the potential to reduce latency by a couple of clocks in the best-case scenarios (such as when a reservation request is granted immediately).

Figure 7C:
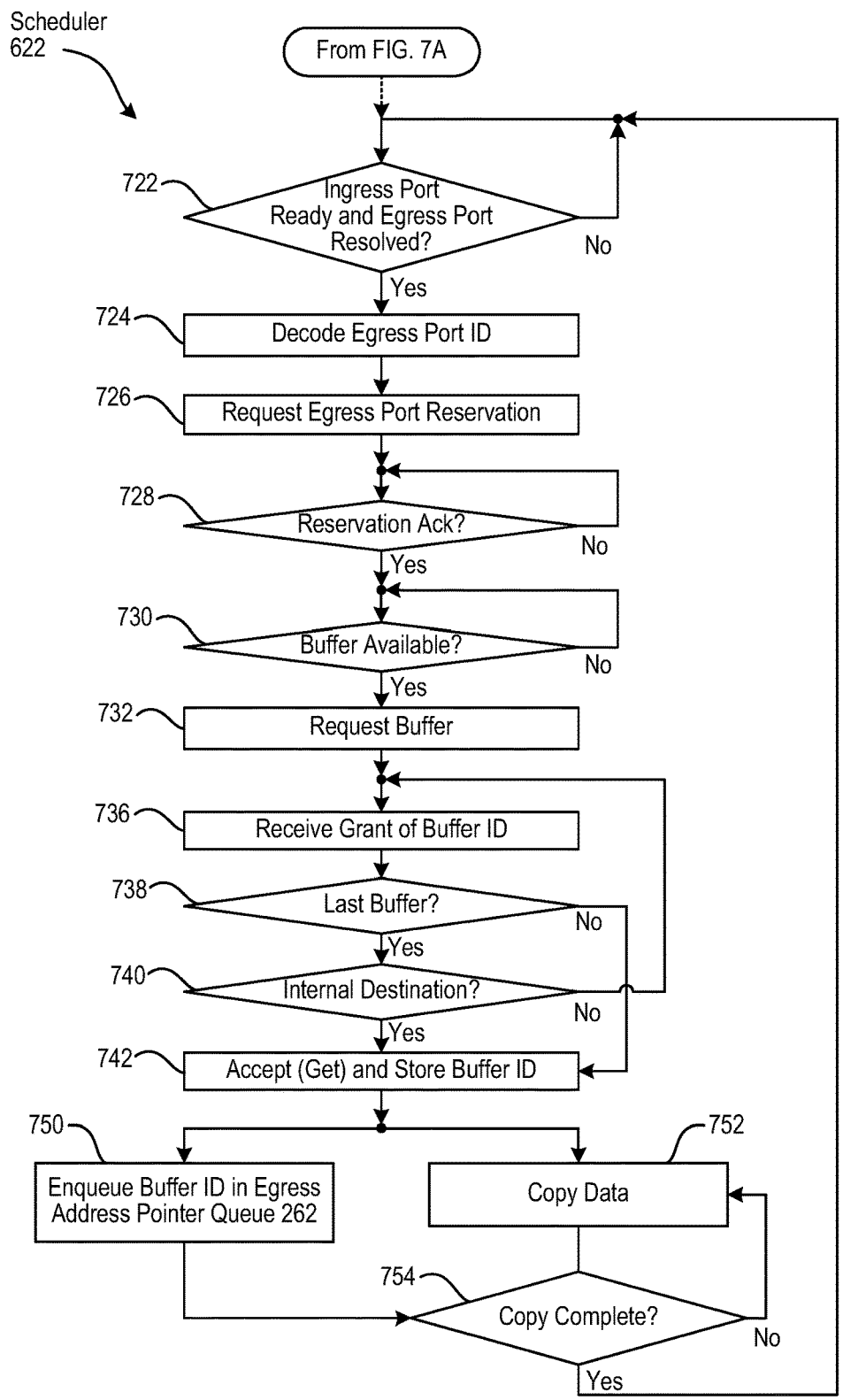

FIG. 7C is a flow chart illustrating a process performed by the scheduler 622 of the ingress processor 221. The process is a loop that begins with waiting (722 "No") for an indication that an ingress packet is ready for dequeuing and the identifier of the egress port to route the packet to has been resolved (corresponding to the ready and resolved signal line 611 being asserted). Once a packet is ready and the egress ID resolved (722 "Yes"), the egress port ID 612 is decoded (724), and the reservation request signal 230 for the decoded egress port ID is asserted, requesting (726) a reservation from the egress processor's reservation arbiter 264.

The scheduler 622 then waits (728 "No") for the reservation to be acknowledged. After the reservation acknowledgement is received (728 "Yes", corresponding in FIG. 6B to signal 231 being asserted), the scheduler 622 determines (730) whether a buffer is available in the buffer pool 242, such as by checking whether the buffer available signal 232 is asserted. When a buffer is available (730 "Yes"), the scheduler 622 requests (732) a buffer (e.g., by asserting the buffer request signal 233).

Thereafter, the scheduler 622 receives (736) a grant of a buffer ID. If the granted buffer is the last buffer (738 "Yes") and the packet is destined for an internal address (740 "Yes"), the buffer is accepted (742). Also, if the granted buffer is not the last buffer (738 "No"), then the buffer is accepted (742). However, if the granted buffer is the last buffer (738 "Yes") and the packet is not destined for an internal address (740 "No"), the process loops back to wait for another grant to be received. When the buffer is accepted (742), the buffer ID is also stored in the register 222. In some implementations, the acceptance of the buffer may be determined by comparing a number of available buffers to a threshold (instead of determining that the buffer is a last available buffer). For example, if a number of available buffers is less than a threshold, then a buffer may not be accepted for packets that are not destined for an internal address.

After the buffer is accepted, the scheduler 622 proceeds to enqueue (750) the buffer ID into the egress address pointer queue 262, and performs (752) the sequential copy 346 of the packet from the ingress data queue 212-214 to the assigned buffer. When the copy is complete (754 "Yes"), the scheduler process loops back to step 722 and waits for the next indication that an ingress packet is ready to be dequeued and the identifier of the egress port to which to route the packet has been resolved.

As an alternative to the process illustrated in FIG. 7C, instead of waiting for the reservation (the 728 "No" loop in FIG. 7C) and then requesting allocation of the buffer, the scheduler 622 may be configured to concurrently request both a reservation (726) and a buffer (732). If the scheduler 622 has not received a reservation acknowledgement 231 (728 "No") by the time a buffer grant is received (736), the scheduler 622 will not accept the buffer, looping back to wait for another buffer grant (i.e., looping back to 736). If a reservation acknowledgement has been received (728 "Yes"), the scheduler 622 will accept (742) a granted buffer. Although concurrency may delay utilization of a buffer, this approach has the potential to reduce latency.

FIG. 8A is a block diagram conceptually illustrating example components of a buffer pool allocator 240 of a chip 100 with an L1 router 102. The buffer ID stack 870 operates as a circular FIFO queue in the manner discussed in connection with FIGS. 4D and 4E. The buffer ID stack 870 has one slot for the buffer ID of every buffer in the buffer pool 242. As such, there is no possibility of the buffer ID stack 870 overflowing or backing-up, since it is always able to accommodate all of the buffer IDs.

A digital comparator 853 compares the depth 878 of the buffer ID stack 870 with a value of "zero" to determine whether there are no free buffers remaining in buffer pool for allocation. The output of the comparator 853 is input into an inverter 854. The output of the inverter 854 provides the buffer signal available signal 232.

The buffer request signals 233 from the affiliated ingress processors 220 are received by an arbiter 839. Each cycle of the clock 599, the arbiter 839 selects between asserted buffer request signals 233, determining which ingress processor will be replied to first when multiple buffer requests pending (e.g., using round-robin scheduling). If the buffer available signal 232 is de-asserted before the arbiter 839 selects a pending buffer request signal 233, the buffer request signals(s) 233 will remain asserted until a buffer becomes available.

The arbiter 839 passes the selected buffer request 848 to a digital one-shot 885. The rising edge of the signal 848 causes the output signal 886 of the digital one-shot 885 to be asserted, outputting a pulse for a remainder of the clock cycle. The output signal 886 of the one-shot 885 is input into a demultiplexer 841, which select which write strobe line 678 is toggled, in accordance with which ingress processor 220 was selected by the arbiter 839 (as indicated on the selection bus 840).

The read address 844 of the front of the buffer ID queue 870 is determined based on the front pointer 832. The read circuit 846 may continually output the buffer ID at the front of the queue 870 in accordance with the front pointer 832.

The signal 886 may be used as the write strobe 678, since the read circuit 846 is already outputting the next available buffer ID, if a buffer ID is available for allocation, when the buffer request signal 233 is selected. All that needs to be done, therefore, is to respond to the ingress processor 220 with the write strobe 678, causing the register 222 of that ingress processor 220 to store the buffer ID 236 available on buffer ID bus. The buffer ID bus may be shared by all of the ingress processors 220 affiliated with a buffer pool allocator 240, with each write strobe line 678 being ingress-processor specific.

The falling edge of the signal 886 causes the front-pointer counter 847 to increment the front pointer 832. As herein illustrated, where a "circle" is illustrated at a bit-line input into a circuit, it denotes that the action is triggered by a falling edge of the input signal. A bit-line input illustrated without a "circle" indicates that the action is triggered on the rising edge of the input signal. The falling edge of the signal 886 also causes a depth counter 877 to decrement the depth 878.

The arbiter 839 selects an asserted buffer request signal 233 when the enable input of the arbiter is "true" (asserted). The enable input of the arbiter 839 is tied to the buffer available signal line 232. So long as there are buffers available and buffer requests pending, the arbiter 839 will select an ingress port each clock cycle. When the enable input is "false," the arbiter 839 freezes its output.

When an egress processor 260 releases a buffer, it asserts the release buffer signal 265 and outputs the buffer ID 270. The buffer pool allocator 240 may include an arbiter 828 to select among released buffer signals 265 from multiple egress processors 260, since more than one release buffer signal 265 may be asserted at a same time. The arbiter's selection 830 also controls a multiplexer 829, which passes the buffer ID 270 from the selected egress processor 260 to a write circuit 836. In response to the selection of an asserted release buffer signal 265, the write circuit 836 enqueues the buffer ID 270 to the back of the buffer ID queue 870. The write address 834 for the back of the buffer ID queue 870 is determined based on the back pointer 833. The write circuit 836 toggles a write strobe 835 to cause the memory cell/register of the buffer ID queue 870 to store the buffer ID 270 passed by the multiplexer 829 is accordance with the selection 830 indicated by the arbiter 828. The write strobe 835 may be based on the release buffer signal 265 upon that signal's selection by the arbiter 828.

The falling edge of the write strobe 835 causes the counter 837 to increment the back pointer 833. The falling edge of the write strobe 835 also increments the depth counter 877. The buffer ID queue 870 may use dual-ported memory/cells registers to allow a buffer ID to be reassigned as soon as it becomes available following the buffer stack being empty. A demultiplexer 831 transmits the write strobe 835 to the selected egress processor 260 as a release acknowledgement 372, or a delay element 871 (e.g., a D flip-flop) may be included so that the release acknowledgement 372 is asserted on the clock cycle following assertion of the write strobe. The release acknowledgement 372 causes the egress processor 260 to deassert its buffer release signal 265. The arbiter 828 may select a different asserted buffer release signal 265 from another egress processor 260 each clock cycle.

Figure 8B:
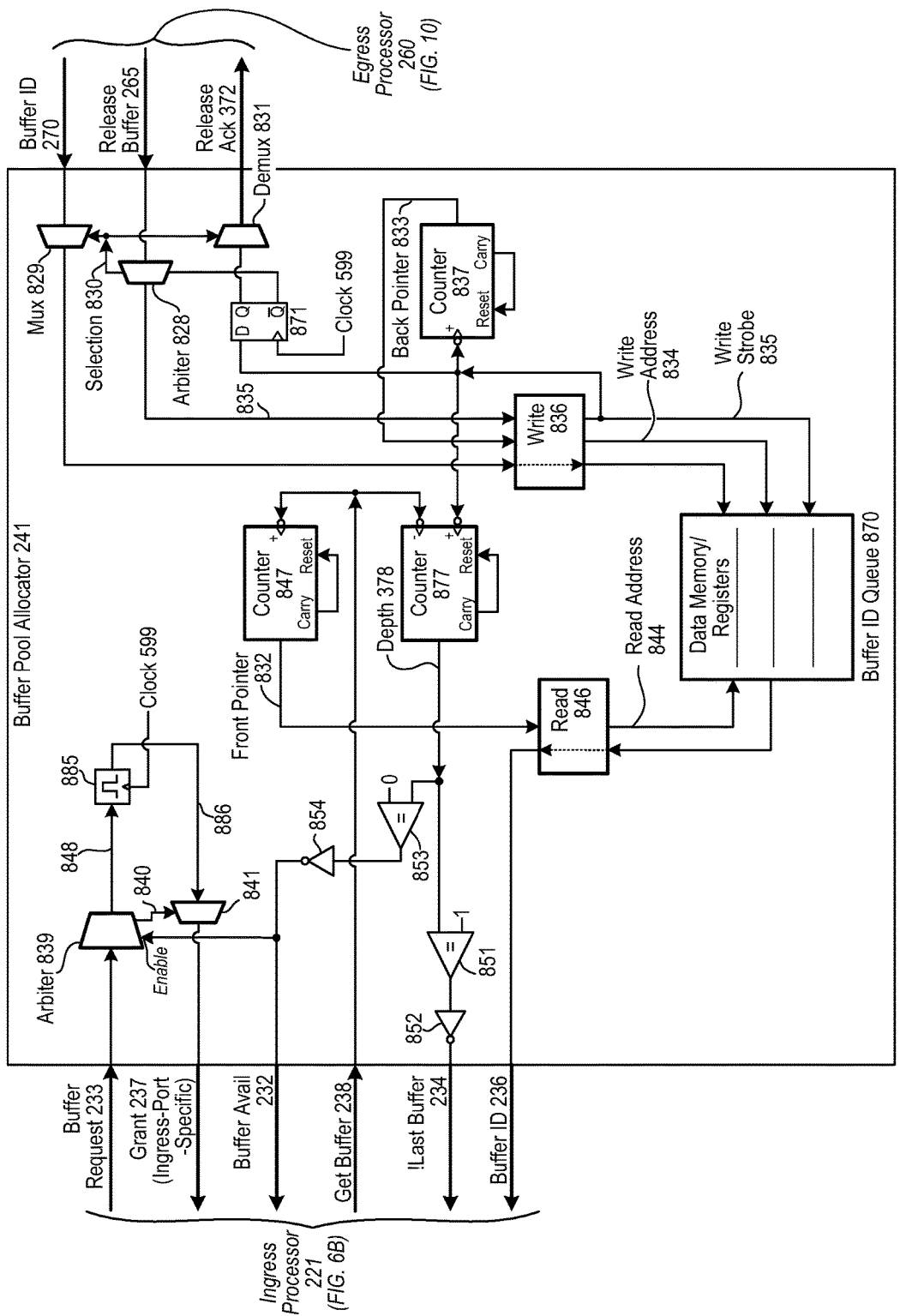

FIG. 8B is a block diagram conceptually illustrating example components of a buffer pool allocator 241 of a chip 100 with an L1 router 142. As discussed with FIG. 8A, the buffer ID stack 870 has one slot for the buffer ID of every buffer in the buffer pool 242. As such, there is no possibility of the buffer ID stack 870 overflowing or backing-up, since it is always able to accommodate all of the buffer IDs.

A digital comparator 851 compares the depth 378 of the buffer ID queue 870 with a value of "one" to determine whether there is only one free buffer remaining in buffer pool for allocation. The outputs of the comparator 851 is input into an inverter 852. The output of the inverter 852 provides the NOT last buffer signal 234. A digital comparator 853 compares the depth 378 of the buffer ID queue 870 with a value of "zero" to determine whether there are no free buffers remaining in buffer pool for allocation. The output of the comparator 853 is input into an inverter 854. The output of the inverter 854 provides the buffer signal available signal 232.

The buffer request signals 233 from the affiliated ingress processors 221 are received by an arbiter 839. Each cycle of the clock 599, the arbiter 839 selects between asserted buffer request signals 233, determining which ingress processor will be replied to first when multiple get buffer requests are pending (e.g., by using round-robin scheduling). If the buffer available signal 232 is de-asserted before the arbiter 839 selects a pending buffer request signal 233, the buffer request signal(s) 233 will remain asserted until a buffer becomes available.

The arbiter 839 passes the selected get buffer request 848 to a digital one-shot 885. The rising edge of the signal 848 causes the output signal 886 of the digital one-shot 885 to be asserted, outputting a pulse for a remainder of the clock cycle. The output signal 886 of the one-shot 885 is input into a demultiplexer 841, which selects which grant line 237 is toggled, in accordance with which ingress processor 221 was selected by the arbiter 839 (as indicated on the selection bus 840).

The read address 844 of the front of the buffer ID queue 870 is determined based on the front pointer 832. The read circuit 846 may continually output the buffer ID at the front of the queue 870 in accordance with the front pointer 832.

The falling edge of the Get buffer signal 238 causes the front-pointer counter 847 to increment the front pointer 832. As herein illustrated, where a "circle" is illustrated at a bit-line input into a circuit, it denotes that the action is triggered by a falling edge of the input signal. A bit-line input illustrated without a "circle" indicates that the action is triggered on the rising edge of the input signal. The falling edge of the Get buffer signal 238 also causes a depth counter 877 to decrement the depth 378.

The arbiter 839 selects an asserted buffer request signal 233 when the enable input of the arbiter is "true" (asserted). When the enable input is "false," the arbiter 839 freezes its output. The enable input of the arbiter 839 is tied to the buffer available signal line 232. So long as there are buffers available and buffer requests pending, the arbiter 839 will select an ingress port each clock cycle.

When an egress processor 260 releases a buffer, it asserts the release buffer signal 265 and outputs the buffer ID 270. The buffer pool allocator 241 may include an arbiter 828 to select among released buffer signals 265 from multiple egress processors 260, since more than one release buffer signal 265 may be asserted at a same time. The arbiter's selection 830 also controls a multiplexer 829, which passes the buffer ID 270 from the selected egress processor 260 to a write circuit 836. In response to the selection of an asserted release buffer signal 265, the write circuit 836 enqueues the buffer ID 270 to the back of the buffer ID queue 870. The write address 834 for the back of the buffer ID queue 870 is determined based on the back pointer 833. The write circuit 836 toggles a write strobe 835 to cause the memory cell/register of the buffer ID queue 870 to store the buffer ID 270 passed by the multiplexer 829 is accordance with the selection 830 indicated by the arbiter 828. The write strobe 835 may be based on the release buffer signal 265 upon that signal's selection by the arbiter 828.

The falling edge of the write strobe 835 causes the counter 837 to increment the back pointer 833. The falling edge of the write strobe 835 also increments the depth counter 877. The buffer ID queue 870 may use dual-ported memory/cells registers to allow a buffer ID to be reassigned as soon as it becomes available following the buffer stack being empty. A demultiplexer 831 transmits the write strobe 835 to the selected egress processor 260 as a release acknowledgement 372, or a delay element 871 (e.g., a D flip-flop) may be included so that the release acknowledgement 372 is asserted on the clock cycle following assertion of the write strobe. The release acknowledgement 372 causes the egress processor 260 to deassert its buffer release signal 265. The arbiter 828 may select a different asserted buffer release signal 265 each clock cycle.

Figure 9B:
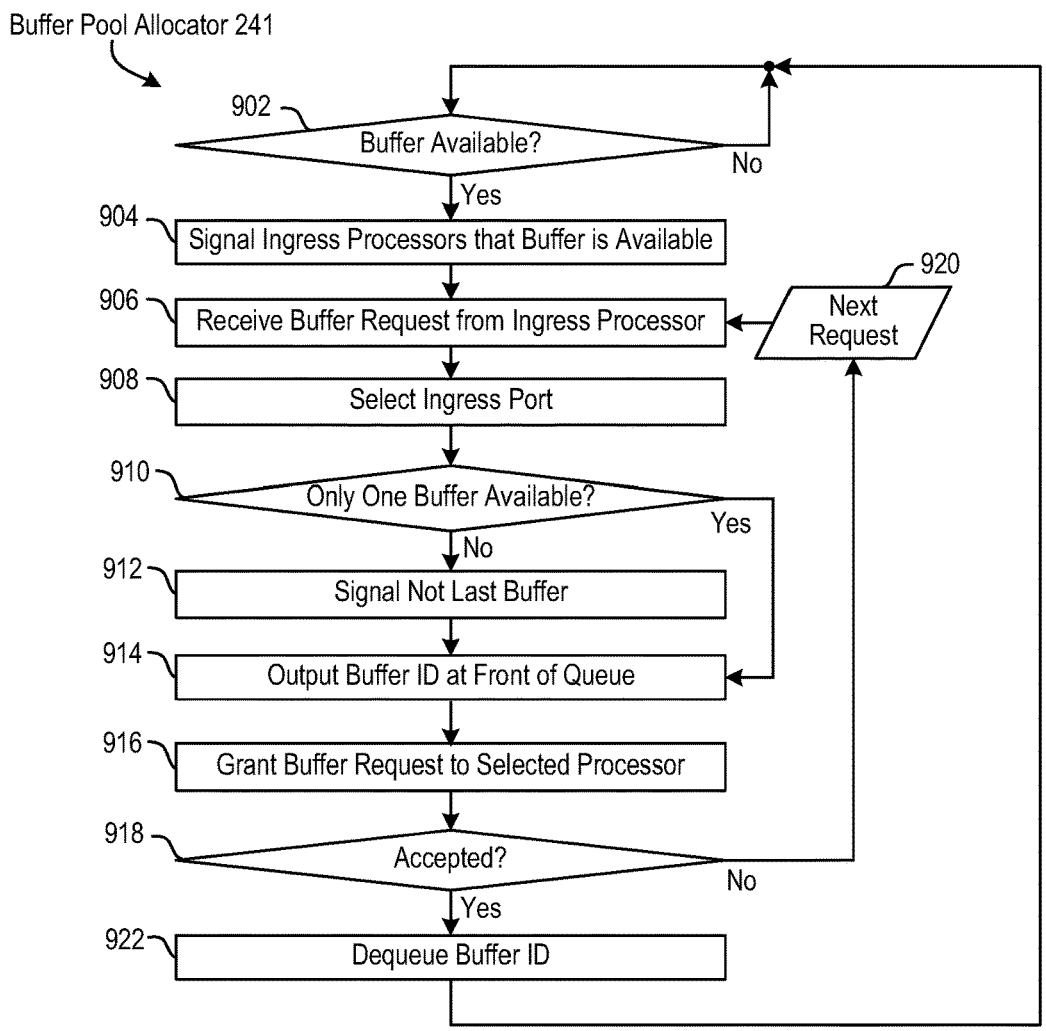
Figure 9C:
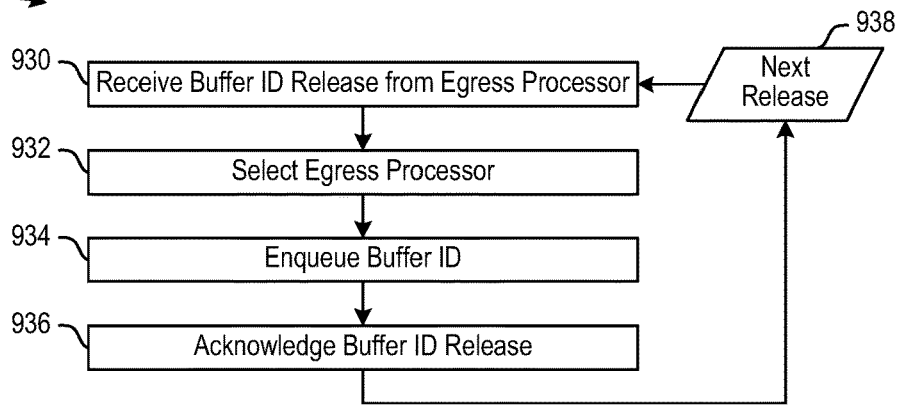

FIG. 9A illustrates a process that may be used by the buffer pool allocator 240 to the dequeue a buffer ID 236 to an ingress processor 220, FIG. 9B illustrates a process that may be used by the buffer pool allocators 241 to the dequeue a buffer ID 236 to an ingress processor 221, and FIG. 9C illustrates a process that may be used by the buffer pool allocators 240 and 241 to enqueue a buffer ID 270 released by an egress processor 260.

Referring to FIG. 9A, when a buffer is available (902 "Yes"), the buffer pool allocator 240 signals (904) associated ingress processors that a buffer is available. After the buffer pool allocator 240 receives (906) a buffer request from an ingress processor, the ingress port/processor is selected (920), a buffer ID is dequeued (922), and the buffer ID is sent (924) to the selected ingress processor. The process then repeats after another buffer becomes available.

Referring to FIG. 9B, when a buffer is available (902 "Yes"), the buffer pool allocator 241 signals (904) associated ingress processors that a buffer is available.

The buffer pool allocator 241 receives (906) one-or-more buffer requests 233 from ingress processors 221, and selects (908) one of the ingress ports to which it will issue a grant.

The buffer port allocator 241 determines (910) whether there is only one buffer available in the pool. If there is not (910 "No"), the allocator signals (912) that the available buffer is not the last buffer. After determining that there is only one buffer available (910 "Yes") or signaling (912) that the available buffer is not the last buffer, the allocator 241 outputs (914) the buffer ID at the front of the queue and issues (916) a grant to the selected ingress processor. If the grant is accepted (918 "Yes"), the buffer ID is dequeued (922) from the buffer ID queue 870, and the process loops back to determining (902) whether a buffer is available. Otherwise, if the grant is not accepted (918 "No"), the process skips (920) to a next buffer request that has been or will be received (906). If no other buffer requests have been received, the same ingress port may be selected again. In some implementations, the acceptance of the buffer may be determined by comparing a number of available buffers to a threshold (instead of determining that the buffer is a last available buffer). For example, if a number of available buffers is less than a threshold, then a buffer may not be accepted for packets that are not destined for an internal address.

Referring to FIG. 9C. after the buffer pool allocator 240/241 receives (930) a buffer release signal 265 from an egress processor, the egress processor is selected (932), the buffer ID 270 is enqueued (934), the release is acknowledged (936), and the process repeats for a next buffer release (938).

Figure 10:
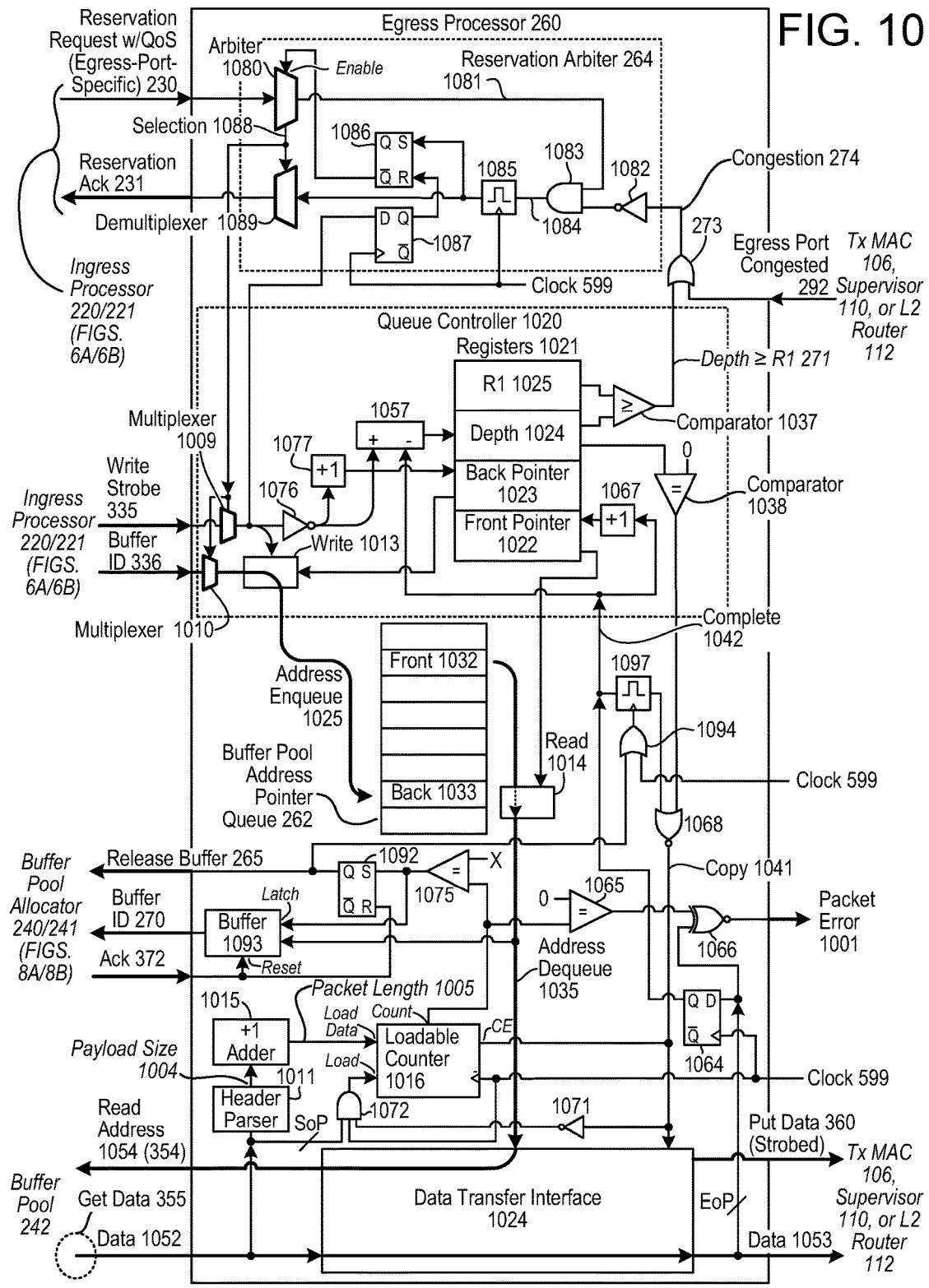
FIG. 10 is a block diagram conceptually illustrating example components of an egress processor.

FIG. 10 is a block diagram conceptually illustrating example components of an egress processor 260. The reservation arbiter 264 of the egress processor 260 manages the granting of reservations. Acknowledgement of reservations is postponed while the congestion signal 274 is asserted.

An input arbiter 1080 of the reservation arbiter 264 selects among the asserted reservation request signals 230. The input arbiter 1080 may consider the QoS indicator 607' associated with the reservation request 230 to determine which request to grant. An example of a QoS indicator would be 2 bits, supporting 4 levels of quality of service, providing priorities such as those in Table 1:

TABLE 1

| Priority | Usage |
| --- | --- |
| 0 | Management messages |
| 1 | Real-time voice |
| 2 | ? |
| 3 | Bulk data |

Table 1 treats the lowest number as signifying the highest priority.

The basic idea is that when ingress ports are competing to reserve an egress port, the data from the priority field is sent to the egress port arbiter 264 along with the buffer request line 230 that assert that a particular ingress port needs to reserve that egress port. The input arbiter 1080 then uses the priority field information 607' when determining which ingress port gets granted a reservation in any given clock cycle.

The input arbiter 1080 may use a scheduling algorithm to determine which ingress port to select, based on the QoS priority indication. Since priority-based scheduling can lead to deadlocks, different scheduling algorithms may be better or worse depending upon the system application and the frequency with which higher priority QoS levels are requested.

A simple scheduling algorithm is to have the arbiter 1080 chooses the highest priority input requesting service in a given clock cycle. Given a number of inputs at the same priority, the arbiter does round-robin scheduling among the requesting inputs.

The simple design outlined above only moves a high priority packet ahead of other packets that arrived in the same clock cycle. To further reduce latency for high priority packets, a design could not only grant arbitration based upon priority, but could also keep egress port packet descriptors sorted by priority, so if a high priority packet arrives, it can "cut the line", and move ahead of packets that had arrived in previous clock cycles.

Depending upon the degree of importance placed on priority, it is also possible to have an "emergency" priority level. In this case, the emergency packet not only moves to the head of the line, but actually forces the packet currently being transmitted by a data transfer interface 1024 to be interrupted, then the emergency packet is transmitted as soon as the port is ready. After the emergency packet has finished being sent, the interrupted packet is re-started. Unlike the previously-outlined algorithms, providing for emergency packet handling can reduce overall system bandwidth, so its use must be considered carefully. Support for such emergency packet handling may require additional circuitry to interrupt copying by the data transfer interface 1024 and bypass the pointer queue 262. Another possible modification to accelerate handling of emergency packets is to bypass the buffer pool, or to have a separate special buffer for emergency packets.

As known in the art, there are many other possibilities. Some arbiter scheduling algorithms are aimed at ensuring that lower-priority packets continue to be sent (albeit at reduced bandwidth) even in the presence of higher-priority packets. In the alternative, the input arbiter 1080 might not consider QoS priority at all, instead using a basic algorithm such as round-robin.

Returning to FIG. 10, the reservation request selected by the input arbiter 1080 is output by the arbiter 1080 as the selected signal 1081, which is input into an AND gate 1083. The congestion signal 274 is inverted by an inverter 1082 and input into a second input of the AND gate 1083. The output 1084 of the AND gate 1083 will be asserted only if a reservation request 230 has been selected by the arbiter 1080 (signal 1081) and the congestion signal 274 is not asserted.

The output signal 1084 from the AND gate 1083 is input into a digital one-shot 1085, which outputs a pulse for the remainder of the clock cycle. A demultiplexer 1089 selects the reservation acknowledgement line 231 back to the selected ingress processor 220/221 in accordance with which ingress processor 220/221 was selected by the arbiter 1080 (as indicated on selection bus 1088), transmitting the output pulse from the one-shot 1085 to the selected ingress processor 220/221 as the reservation acknowledgement signal 231. The ingress processor 220/221 then deasserts its reservation request signal 230, causing the selected reservation request signal 1081 to be de-asserted.

The output pulse from the digital one-shot 1085 is input to the set "S" input of an S-R flip-flop 1086. The inverting !Q output of the S-R flip-flop 1086 is connected to the enable line of the arbiter 1080, freezing the arbiter's selection 1088 after the reservation request is selected, until after the selected ingress processor 220/221 exercises the reservation by enqueuing (1025) a buffer ID 336 into the reserved egress processor's identifier queue 262.

The arbiter's selection 1088 is used to control a multiplexer 1009 to select the write strobe line 335 from the selected ingress processor, and to control a multiplexer 1010 to select the buffer ID bus 336 from the selected ingress processor. A delay element 1087 receives the selected write strobe 335, and upon the following clock cycle, resets the S-R flip-flop 1086. Specifically, the non-inverting output of D flip-flop 1087 is input into the "R" reset input of the S-R flip-flop 1086. The resetting of the S-R flip-flop 1086 re-enables the arbiter 1080, which may then select a reservation request 230 from another ingress processor 220/221.

The queue controller 1020 of the egress processor 260 is similar to the queue controller 510 with a few modifications. The write strobe signal 335, as selected by the multiplexer 1009, is inverted by an inverter 1076. A back pointer counter 1077 increments the back pointer 1023 on the rising edge of the output of the inverter 1076 (i.e., the falling edge of the write strobe 335). The front pointer counter 1067 increments the front pointer 1022 on the leading edge of the "complete" signal 1042. An up-down counter 1057 keeps track of queue depth 1024, incrementing the depth on the rising edge of the output of the inverter 1076 (i.e., the falling edge of the write strobe 335) and decrementing the depth on the leading edge of the complete signal 1042. A comparator 1037 compares the depth 1024 with the threshold R1 1025, asserting the egress processor congestion signal 271 when the depth is greater than or equal to the threshold R1.

A write circuit 1013 enqueues 1025 a received buffer ID 336 into the back 1033 of the egress processor's buffer identifier queue 262 in accordance with the back pointer 1023, at the leading edge of the write strobe 335. Another comparator 1038 compares the depth to zero to determine whether the queue 262 is empty. The output of the comparator 1038 is input into a NOR gate 1068. The output of the NOR gate 1068 serves as the copy signal 1041. As a result, whenever the depth is zero, the copy signal line 1041 is de-asserted. Another input of the NOR gate 1068 is an output of a digital one-shot 1097, which outputs a pulse for at least the remainder of a clock cycle following the data transfer completion signal 1042 being asserted after a packet is transferred from the buffer pool to the egress port by the data transfer interface 1024. The copy signal 1041 is asserted when there is an address in the buffer identifier queue 262 waiting to be dequeued 1035, toggling after each packet is transferred to the associated egress port data queue 282-284, and de-asserted if the buffer identifier queue 262 runs empty. Assertion of the copy signal 1041 causes the data transfer interface 1024 to initiate the sequential copy 356.

To accommodate releasing the assigned buffer pool buffer ID 270 prior to finishing the copying of a packet from the buffer to the egress queue 282-284, the egress processor 260 includes a header parser 1011 that extracts a payload size 1004 from the packet header 402. Prior to beginning the sequential copy 356 from the buffer, the read address 1054 that is output by the data transfer interface 1024 will correspond to the first word of the packet specified by the packet ID 270 at the front of the identifier queue 262. When the copy signal 1041 is asserted 941, the data on data bus 1052 is already that of the packet header 402. The SOP bit 448 appended onto the first word will also be "true."

The payload size 1004 output by the header parser 1011 is input into a plus-one adder 1015, which adds one to the payload size 1004 to obtain the packet length 1005. The SOP bit 448, the clock signal 599, and an output of an inverter 1071 that inverts the copy signal 1041 are input into an AND gate 1072. On the leading edge of the clock signal 599 when the SOP bit 448 on the data bus 1052 is true and the copy signal 1041 is not asserted, the packet length 1005 is loaded into a loadable counter 1016. Thereafter, the assertion of the copy signal 1041 enables the loadable counter 1016 (via a count enable "CE" input) to begin decrementing the count value.

The count is input into a digital comparator 1075 that compares the count value to a value "X", which may be fixed and/or stored in a register. The value "X" indicates how many clock cycles before the end of a packet that the buffer can be released. The predetermined value of "X" corresponds to a minimum number of clock cycles before the data in the released buffer may overwritten by another ingress processor 220/221. When the count equals "X," an S-R flip-flop 1092 is set, with the non-inverting output of the S-R flip-flop 1092 serving as the release buffer signal 265. The release buffer signal 265 remains asserted until the release acknowledgement signal 372 from the buffer pool allocator 240/241 causes the S-R flip-flop 1092 to reset. When the count value equals "X," a buffer 1093 also latches the buffer ID 270 then output by the read circuit 1014. The buffer ID 270 continues to be output by the buffer 1093 until the release acknowledgement signal 372 causes it to reset.

In response to assertion of the copy signal 1041, the data transfer interface 1024 sequentially copies data from the buffer pool to the associated egress data queue 282-284, outputting each word on the data bus 1053 while strobing the put data line 360 for each copied word. A bus line used corresponding to the EOP bit 446 of the parallel bus 1053 that is used to copy the packet is tied to the "D" input of a D flip-flop 1064 that serves as a delay element. On the rising edge of the clock signal 599 following detection of the word that has a "true" EOP indicator, the non-inverting "Q" output of the flip-flop 1064 is asserted as the copy-complete signal 1042. The assertion of the copy-complete signal 1042 triggers the digital one-shot 1097, toggling the copy signal 1041 to cause the data transfer interface 1024 to stop copying and reset its internal counter. The assertion of the copy-complete signal 1042 also causes the front pointer 1022 to increment, and the depth 1024 to decrement.

To manage circumstances where the buffer pool allocator 240/241 receives multiple buffer ID releases at the same time, and is unable to send a release acknowledgement 372 before the data transfer interface 1024 has completed copying, the S-R flip-flop 1092 is set to latch and hold the signal assertion from the output of the comparator 1075, maintaining assertion of the release buffer signal 265 until an assertion of the release acknowledgement signal 372 resets the flip-flop 1092. The release buffer signal 265 and the clock signal 599 are input into an OR gate 1094. The output of the OR gate 1094 is input as the clock input of the digital one-shot 1097. If the release buffer signal 265 has not been cleared before the end of the packet, the output of the OR gate 1094 is held "high." This results in the pulse from the one-shot 1097 to remain high after it is triggered by the complete signal 1042, stalling the start of copying of a next packet until the buffer release is acknowledged (by assertion of signal 372). After the release buffer signal 265 is deasserted in response to the acknowledgement signal 372, the clock signal 599 is again applied to the one-shot 1097, after which the one-shot pulse will end, causing the copy signal 1041 to be reasserted (if there are buffer IDs in the egress processor's identifier queue 262).

The front pointer 1022, the back pointer 1023, the depth value 1024, and the R1 threshold 1025 are illustrated as being stored in registers 1021. Using such registers, looping increment and decrement circuits may be used to update the front pointer 1022, back pointer 1023, and depth value 1024 as stored in their registers instead of dedicated counters. In the alternative, using the counters 1057/1067/1077, the registers used to store the front pointer 1022, back pointer 1023, and depth value 1024 may be omitted, with the values read from the counters themselves. The register 1024 storing the R1 threshold may be individually programmed for the specific egress processor 260, or may be shared among multiple egress processors 260, such as all of the egress processors associated with external ports sharing one R1 stored threshold value, all of the egress processors associated with the internal ports sharing another stored R1 threshold value, and the egress processor associated with the supervisor port storing its own R1 threshold value.

The egress processor 260 may also monitor and signal (1001) packet errors if the length of a packet as determined by the EOP bit 446 does not match the packet length 1005 determined from the header. A comparator 1065 compares the count value output by the loadable counter 1016 with zero. When the complete signal 1042 is asserted after the EOP bit is detected, the count value should be zero. By comparing the output of the comparator 1065 with the copy-complete signal, packet errors can be detected. An XNOR gate 1066 may be used to compare these two values, and if there is a mismatch, a packet error signal 1001 is asserted. The packet error signal 1001 may be logged, reported to a processing element 134 managing chip operations, provided to the egress port receiving the packet for error handling, etc.

Figure 11:
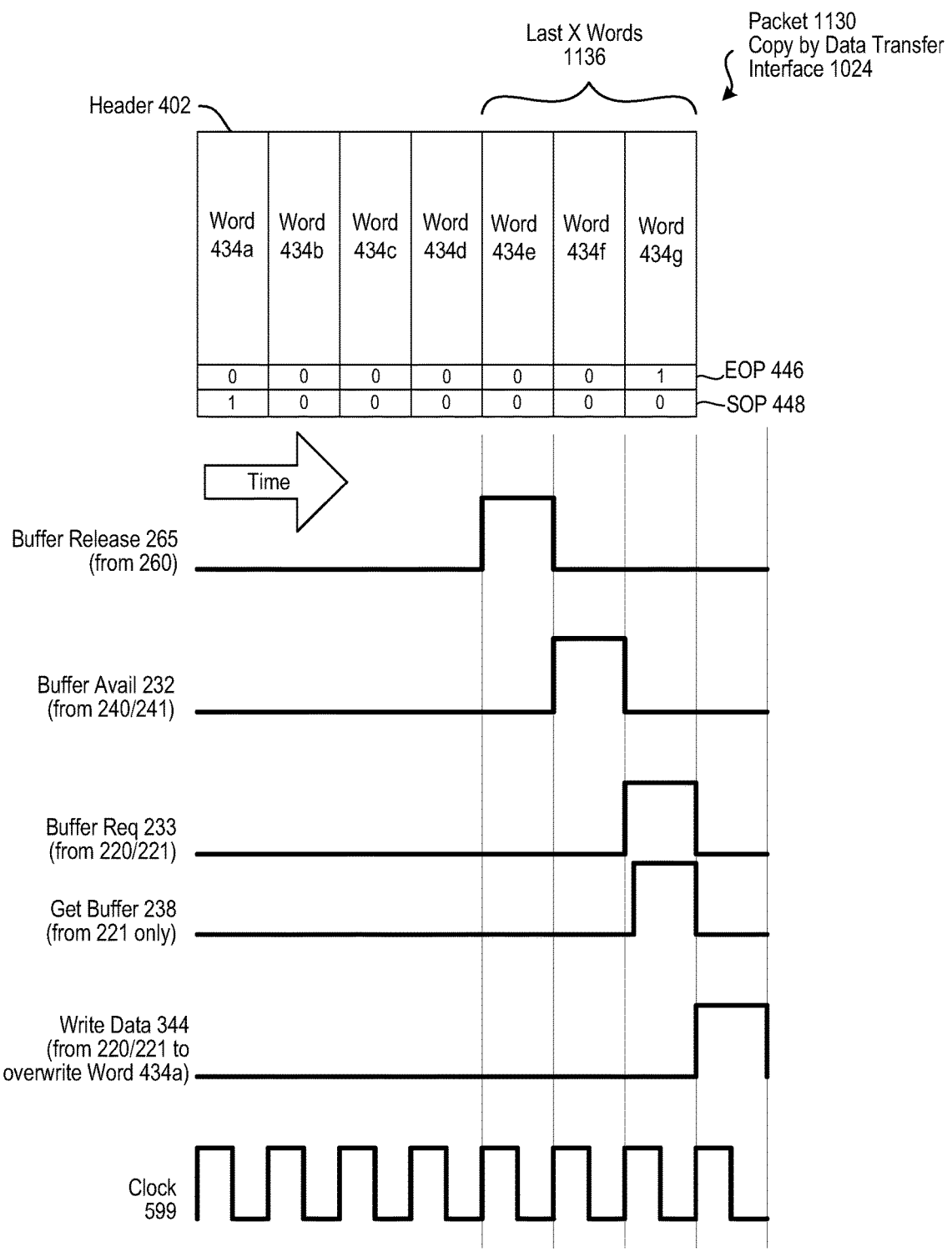
FIG. 11 is a timing diagram illustrating an egress processor releases a buffer prior to completion of copying a packet from the buffer.

FIG. 11 is a timing diagram illustrating how the egress processor can release a buffer prior to completion of copying a packet from that buffer. In this example, the value of "X" is three clock cycles. As a packet 1130 is being copied by the data transfer interface, the egress processor 260 counts down until the last X words (1136) are reached. The buffer release signal 265 is asserted with at the beginning of word 434e, whose transfer begins three clock cycles before the end of the packet (referring to clock signal 599). After receipt and enqueuing of the released buffer ID, the buffer pool allocator 240/241 asserts the buffer available signal 232.

On the next clock pulse, the buffer pool allocator 240 may receive a buffer request signal 233, and respond with a buffer ID 236 (within a same clock cycle). In the case of the buffer pool allocator 241, the buffer pool allocator 241 may receive the buffer request signal 233, offer to grant a buffer (grant 237), and receive acceptance (get 238) (within a same clock cycle). At this point, the packet 1130 has been transferred from the buffer pool, such that data being enqueued into the buffer (overwriting word 434a of the packet 1130) is of no consequence. Since packets can be as short as a single word (header without body), the value of X may be set on the assumption that the writing of any words into a released buffer will overwrite data.

In essence, what "X" should be set at is determined based on worst-case timing. The greater the worst-case latency between releasing the buffer and when the buffer can be overwritten, the larger "X" can be. Likewise, if the time between buffer release and data overwrite is smaller, "X" will be reduced. Even so, in most timing scenarios, "X" can be set to at least one or two clock cycles.

Figure 12A:
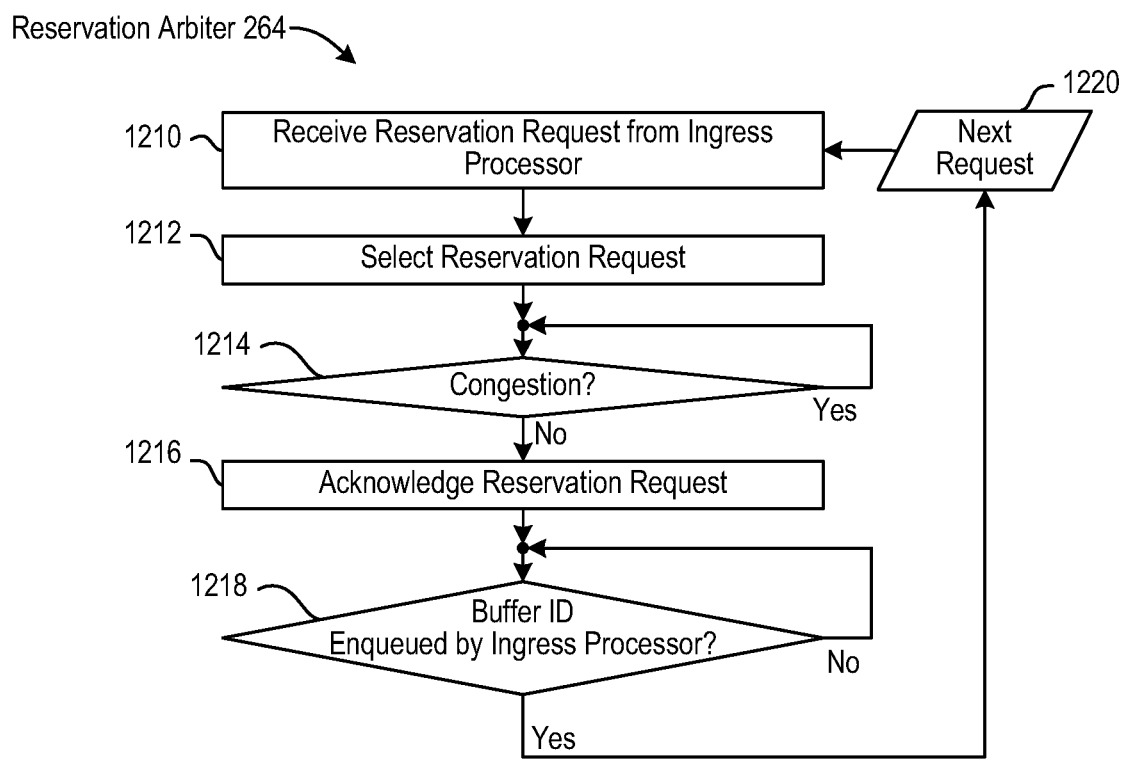
FIGS. 12A and 12B are flow charts illustrating examples of processes performed by an egress processor.
Figure 12B:
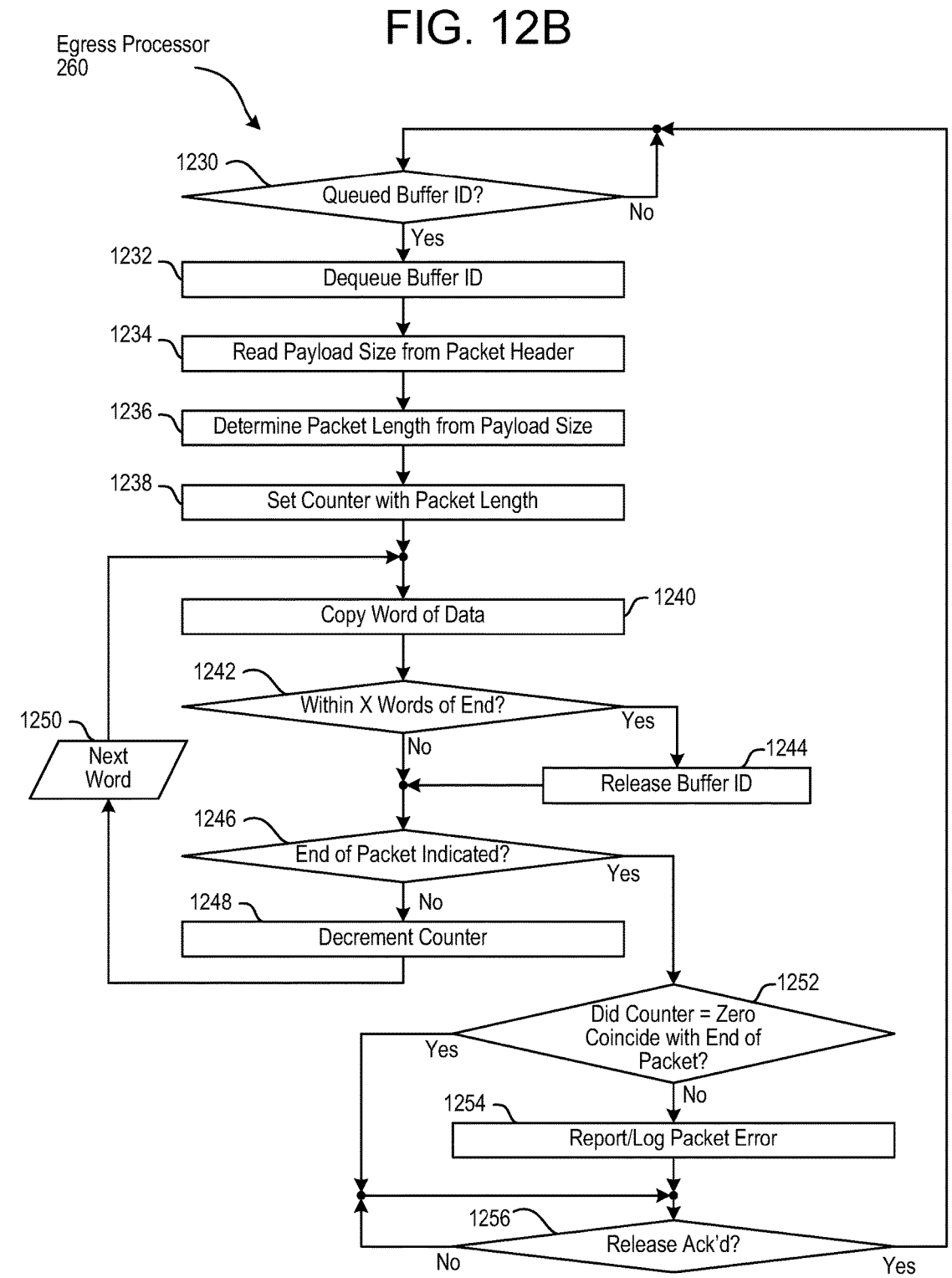

FIGS. 12A and 12B are flow charts illustrating processes performed by the egress processor 260. Referring to FIG. 12A, the reservation arbiter 264 of the egress processor 260 receives (1210) a reservation request from an ingress processor. After selecting (1212) the request, a determination (1214) as to whether there is congestion. If the egress processor's queue 262 is congested, the egress port's data queue 282-284 is congested, and/or a downstream data Rx MAC data queue is congested (1214 "Yes"), the reservation arbiter 264 postpones issuing a reservation. After the congestion clears (1214 "No"), the reservation request is acknowledged (1216). The reservation arbiter 264 then waits (1218) for the buffer ID to be enqueued by the selected ingress processor (1218 "Yes"), after which the process loops to the next reservation request (1220).

Referring to FIG. 12B, the egress processor 260 determines whether there is a buffer ID in queue 262. If there is queued buffer ID (1230 "Yes"), the buffer ID is read/dequeued (1232). Using the buffer ID, the payload size is read (1234) from the packet header to determine (1236) the packet length. A counter is set (1238) with the packet length. After the counter is set, the egress processor 260 copies a word of data from the buffer to the egress data queue 282-284. The count of the counter is checked (1242) to determine whether the count is within "X" words of the end of the packet. If the copying is within "X" words of the end (142 "Yes"), the buffer ID is released (1244). In either case (1242 "Yes" and "No"), a determination (1246) as to whether the end of the packet has been reached. If it has not (1246 "No"), the counter is decremented (1248) and the process loops to copying the next word (1250) of data.

Otherwise, if the end of packet is indicated (1246 "Yes"), a determination (1252) may be made as to whether the counter equaling zero coincided with the end of the packet. If not (1252 "No"), a packet error may be reported (1254). In either case (1252 "Yes" and "No"), a determination (1256) is made as to whether the packet release has been acknowledged. After the packet release is acknowledged (1256 "Yes"), the process loops back to the start (1230).

Figure 13:
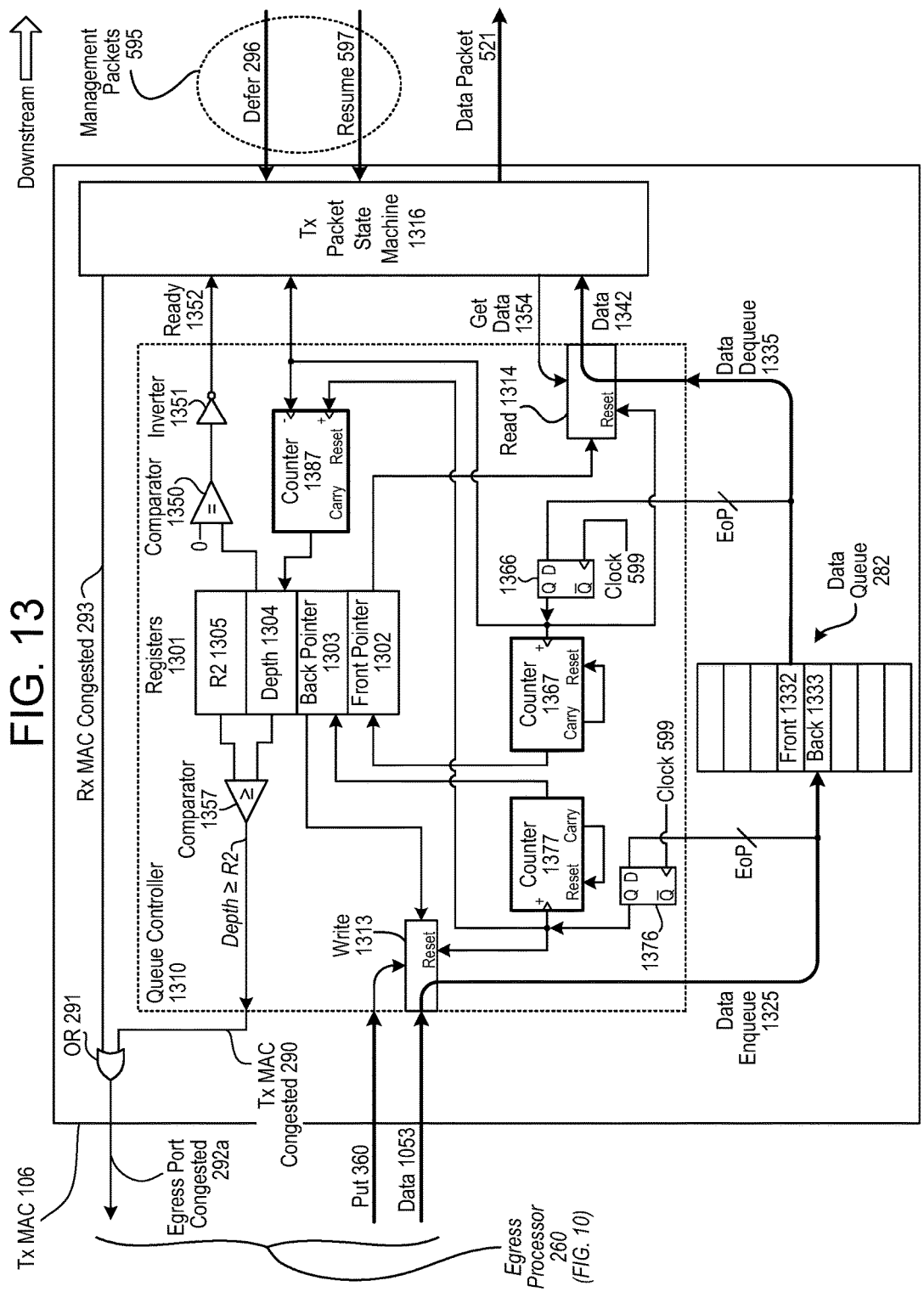
FIG. 13 is a block diagram conceptually illustrating components of a media access control (MAC) transmitter.

FIG. 13 is a block diagram conceptually illustrating components of a Tx MAC 106. As in FIGS. 2B and 2D, the external communication channel (PHY 108) is omitted for brevity. A Tx packet state machine 1316 of the Tx MAC 106 transmits data packets 521 to a downstream device, and dequeues the packet from the data queue 282. When a Defer packet 296 is received, the Tx packet state machine 1316 asserts the Rx MAC congested signal 293, and keeps the signal 293 asserted until a Resume packet 597 is received.

In response to the depth 1304 of the data queue 282 equaling or exceeding the threshold value R2 (1305), a comparator 1357 asserts a Tx MAC congestion signal 290. The congestion signals 290 and 293 are input into an OR gate 291, with the output producing the egress port congested signal 292a, which is asserted if either congestion signal 290 and 293 is asserted.

When the egress processor 260 associated with the Tx MAC 106 asserts a strobed put signal 360, a write circuit 1313 enqueues 1325 the word on the data bus 1053 to the back 1333 of the data queue 282. Each time the put signal 360 is strobed, the write circuit 1313 advances an internal counter that increments (or decrements) the least significant bits of the write address, writing each new word into a corresponding position in the back slot of the data queue 282.

A bus line used corresponding to the EOP bit 446, of the parallel bus 1053 (that is used to enqueue 1325 the packet) is tied to the "D" input of a D flip-flop 1376 that serves as a delay element. On the rising edge of the clock signal 599 following the enqueuing of a word that has a "true" EOP indicator, the non-inverting "Q" output of the flip-flop 1376 is asserted, causing a back pointer counter 1377 to increment the back pointer 1303. The counter 1377 is set to step through each slot of the data queue 282, and then reset back to zero in a continual loop. Among the many ways such looping may be accomplished, a "carry" output that is asserted when the counter 1377 is incremented past the maximum value is tied to the counter's own reset. A rising edge of the non-inverting output of the delay element 1376 is also used to reset the counter within the write circuit 1313, and to increment an up-down counter 1387. The up-down counter 1387 keeps track of the depth 1304 of the data queue 282.

A bus line used corresponding to the EOP bit 446 of the parallel bus 1342 that is used to dequeue 1335 the packet, is tied to the "D" input of a D flip-flop 1366 that serves as a delay element. On the rising edge of the clock signal 599 following dequeuing of the word that has a "true" EOP indicator, the non-inverting "Q" output of the flip-flop 1366 is asserted, causing a front-pointer counter 1367 to increment the front pointer 1302. Like the counter 1377, the counter 1367 is set to step through each slot of the data queue 282, and then reset back to zero in a continual loop. A rising edge of the non-inverting output of the delay element 1366 is also used to reset a word counter within the read circuit 1314, to decrement the up-down counter 1387 that tracks the depth 1304 of the data queue 282, and to signal the Tx Packet State Machine 1316 to transmit the packet.

A digital comparator 1350 compares the depth 1304 to zero. The output of the comparator 1350 is inverted by inverter 1351, producing the data ready signal 1352 that is asserted when the depth 1304 does not equal zero. When the Tx State Machine 1316 is ready to assemble a packet 521 for transmission after the ready signal 1352 is asserted, it strobes a get data signal 1354 to the read circuit 1314, causing the read circuit 1314 to sequentially step through the words associated with the front pointer slot. The Tx State Machine 1316 continues to strobe the get data signal 1316 until the EoP indication output by the delay element 1366 is asserted, at which point the state machine 1316 transmits the data packet 521.

The front pointer 1302, the back pointer 1303, the depth value 1304, and the R2 threshold 1305 are illustrated as being stored in registers 1301. Using such registers, looping increment and decrement circuits may be used to update the front pointer 1302, back pointer 1303, and depth value 1304 as stored in their registers instead of dedicated counters. In the alternative, using the counters 1367/1377/1387, the registers used to store the front pointer 1302, back pointer 1303, and depth value 1304 may be omitted, with the values read from the counters themselves. The register 1305 storing the R2 threshold may be individually programmed for the specific Tx MAC 106, or may be shared among multiple Tx MACs 106, such as all of the Tx MACs associated with external ports sharing one R2 stored threshold value, all of the ports associated with the L2 router 112 sharing another stored R2 threshold value, and the supervisor port 110 using its own R2 threshold value.

Figure 14:
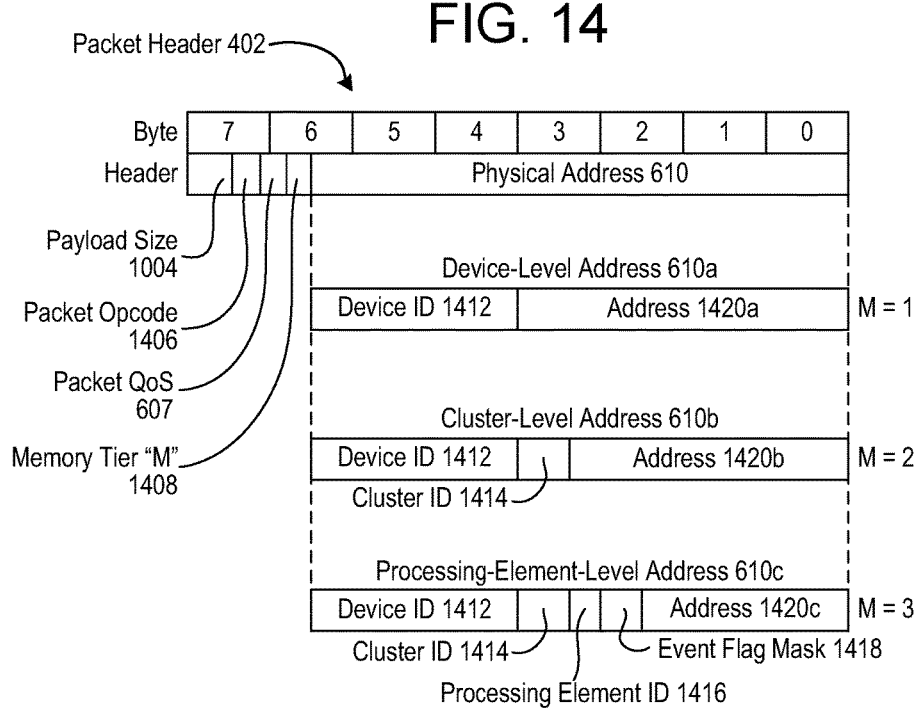
FIG. 14 illustrates an example of a packet header.

FIG. 14 illustrates an example of a packet header used to communicate within the architecture. A processing element 134 may access its own registers directly without a global address or use of packets. For example, if each processor core has two-hundred-fifty-six operand registers, the processor core may access each register via the register's 8-bit unique identifier. Likewise, a processing element can directly access its own program memory. In comparison, a global address may be (for example) 64 bits. Shared memory and the externally accessible locations in the memory and registers of other processing elements may be addressed using a global address of the location, which may include that address' local identifier and the identifier of the tier (e.g., device ID 1412, cluster ID 1414).

For example, as illustrated in FIG. 14, a packet header 402 may include a global address. A payload size 1004 may indicate a size of the payload 436 associated with the header 402. If no payload is included, the payload size 1004 may be zero. A packet opcode 1406 may indicate the type of transaction conveyed by the header 402, such as indicating a write instruction, a read instruction, or a management packet 595. A packet QoS indicator 607 may indicate a priority level for the packet. A memory tier "M" 1408 may indicate what tier of device memory is being addressed, such as main memory (connected to memory supervisor 110), cluster memory 136, or a program memory or registers within a processing element 134.

The structure of the physical address 610 in the packet header 402 may vary based on the tier of memory being addressed. For example, at a top tier (e.g., M=1), a device-level address 610a may include a unique device identifier 1412 identifying the processor chip 100 and an address 1420a corresponding to a location in main-memory. At a next tier (e.g., M=2), a cluster-level address 610b may include the device identifier 1412, a cluster identifier 1414 (identifying both the supercluster 114 and cluster 124), and an address 1420b corresponding to a location in cluster memory 136. At the processing element level (e.g., M=3), a processing-element-level address 610c may include the device identifier 1412, the cluster identifier 1414, a processing element identifier 1416, an event flag mask 1418, and an address 1420c of the specific location in the processing element's operand registers, program memory, etc.

The event flag mask 1418 may be used by a packet to set an "event" flag upon arrival at its destination. Special purpose registers within the execution registers of each processing element 134 may include one or more event flag registers, which may be used to indicate when specific data transactions have occurred. So, for example, a packet header designating an operand register of a processing element 134 may indicate to set an event flag upon arrival at the destination processing element. A single event flag but may be associated with all the registers, or with a group of registers. Each processing element 134 may have multiple event flag bits that may be altered in such a manner. Which flag is triggered may be configured by software, with the flag to be triggered designated within the arriving packet. A packet may also write to an operand register without setting an event flag, if the packet event flag mask 1418 does not indicate to change an event flag bit.

Figure 15:
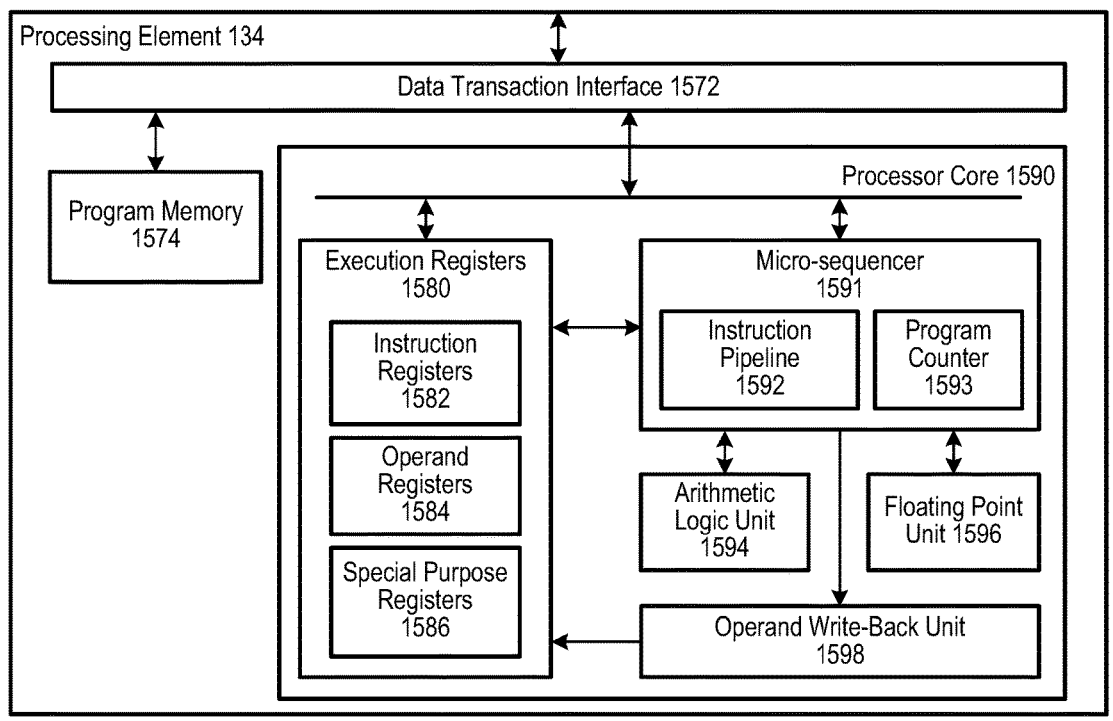
FIG. 15 is a block diagram conceptually illustrating example components of a processing element.

FIG. 15 is a block diagram conceptually illustrating example components of a processing element 134 of device 100 in FIG. 1. A data transaction interface 1572 sends and receives packets and connects the processor core 1590 to its associated program memory 1574. The processor core 1590 may be of a conventional "pipelined" design, and may be coupled to sub-processors such as an arithmetic logic unit 1594 and a floating point unit 1596. The processor core 1590 includes a plurality of execution registers 1580 that are used by the core 1590 to perform operations. The registers 1580 may include, for example, instruction registers 1582, operand registers 1584, and various special purpose registers 1586. These registers 1580 are ordinarily for the exclusive use of the core 1590 for the execution of operations. Instructions and data are loaded into the execution registers 1580 to "feed" an instruction pipeline 1592. While a processor core 1590 may experience no latency (or a latency of one-or-two cycles of the clock controlling timing of a micro-sequencer 1591) when accessing its own execution registers 1580, accessing memory that is external to the core 1590 may produce a larger latency due to (among other things) the physical distance between the core 1590 and the memory.

The instruction registers 1582 store instructions loaded into the core that are being/will be executed by an instruction pipeline 1592. The operand registers 1584 store data that has been loaded into the core 1590 that is to be processed by an executed instruction. The operand registers 1584 also receive the results of operations executed by the core 1590 via an operand write-back unit 1598. The special purpose registers 1586 may be used for various "administrative" functions, such as being set to indicate divide-by-zero errors, to increment or decrement transaction counters, to indicate core interrupt "events," etc.

The instruction fetch circuitry of a micro-sequencer 1591 fetches a stream of instructions for execution by the instruction pipeline 1592 in accordance with an address generated by a program counter 1593. The micro-sequencer 1591 may, for example, may fetch an instruction every "clock" cycle, where the clock is a signal that controls the timing of operations by the micro-sequencer 1591 and the instruction pipeline 1592. The instruction pipeline 1592 comprises a plurality of "stages," such as an instruction decode stage, an operand fetch stage, an instruction execute stage, and an operand write-back stage. Each stage corresponds to circuitry.

The global address may include additional bits so that processing elements 134 and other components may directly access the registers of processing elements 134 across chips. The global addresses may also accommodate the physical and/or virtual addresses of a main memory accessible by all of the processing elements 134 of a chip 100, tiered memory locally shared by the processing elements 134 (e.g., cluster memory 136), etc. Components external to a processing element 134 may directly address the operand registers 1584 of another processing element using global addressing, whereas the processor core 1590 containing the operand registers 1584 may instead use a register's individual identifier.

Other addressing schemes may also be used, and different addressing hierarchies may be used. Whereas a processor core 1590 may directly access its own execution registers 1580 using address lines and data lines, communications between processing elements through the data transaction interfaces 1572 may be via bus-based and/or packet-based networks. The bus-based networks may comprise address lines and data lines, conveying addresses via the address lines and data via the data lines. In comparison, the may packet-based network comprise a single serial data-line, or plural data lines, conveying addresses in packet headers and data in packet bodies via the data line(s).

Figure 16:
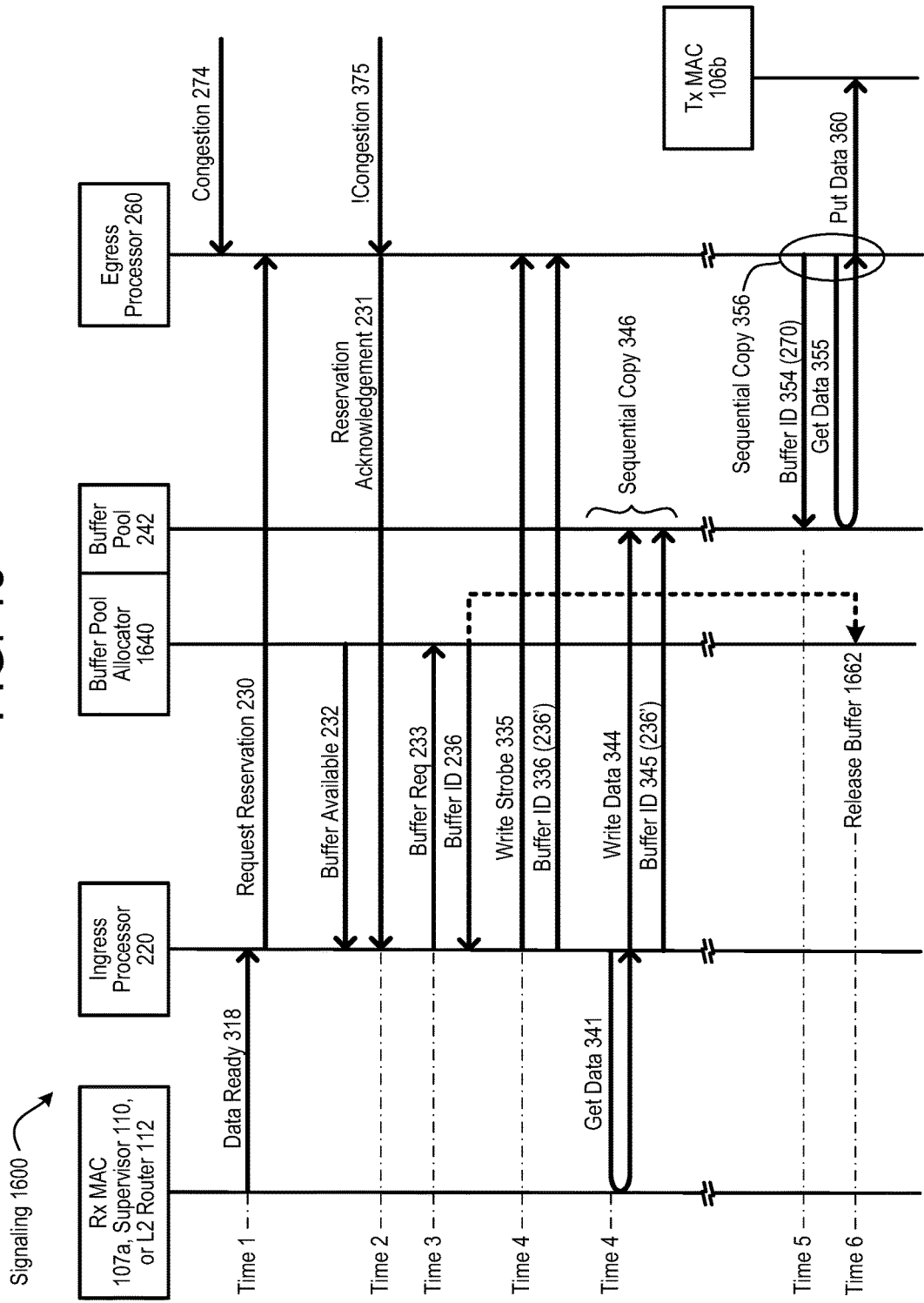
FIG. 16 is a transaction flow diagram illustrating an example of signaling between and within components in FIG. 2B, where the time required to transfer a packet is deterministic.

FIG. 16 is a transaction flow diagram illustrating an alternative example of signaling 1600 between and within components in FIG. 2B, where the time required to transfer a packet is deterministic. The signaling 1600 is substantially the same as the signaling 300 in FIG. 3A, except for how the release of buffers is handled. As mentioned above, if the thresholds R1, R2, and R3 on the external ports is set low enough (e.g., 50% capacity) to accommodate the flow rates, the maximum amount of time between a buffer being allocated and when that buffer can be released for reuse will be fixed, providing a deterministic upper bound for the flow rate. The deterministic upper bound depends, in part, on the maximum length of a packet 430.

In the example in FIG. 16, instead of the egress processor 260 signaling the buffer pool allocator 240 to release (235) the buffer ID 270, a deterministic buffer pool allocator 1640 determines when to each buffer ID can be reassigned based on the number of clock cycles that have transpired since the buffer allocation was made (236). After the requisite number of clock cycles have transpired at Time 6, the buffer pool allocator 1640 unilaterally releases 1662 the buffer for reallocation.

Figure 17:
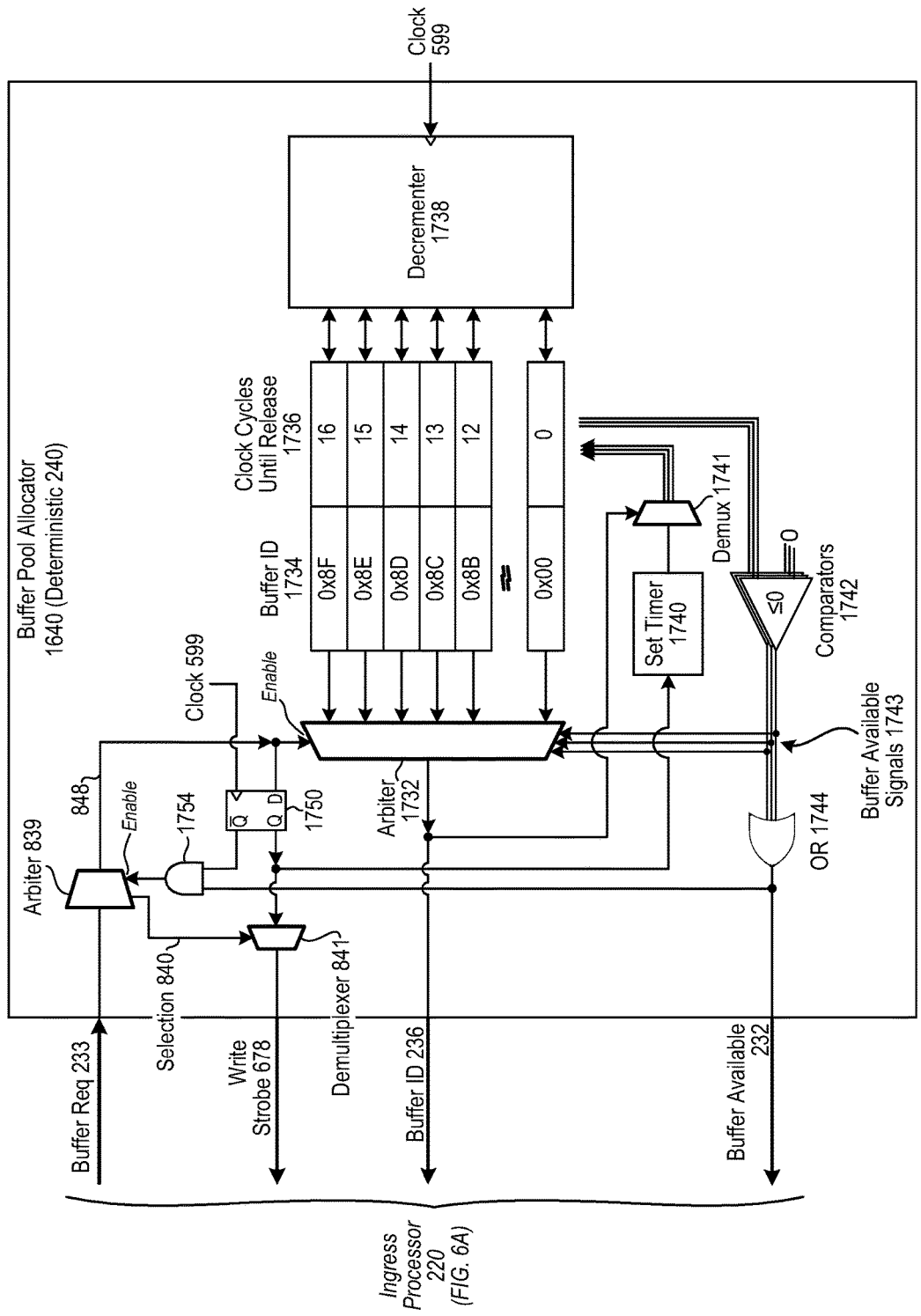
FIG. 17 is a block diagram conceptually illustrating example components of an buffer pool allocator that may be used when the time required to transfer a packet is deterministic.

FIG. 17 is a block diagram conceptually illustrating example components of a deterministic buffer pool allocator 1640 that may be used as an alternative to allocator 240 when the time required to transfer a packet is deterministic. Each buffer ID 1734 is associated with a timer 1736 that tracks a number of clock cycles until the corresponding buffer ID 1734 can be released for reuse. Each timer 1736 is decremented once per clock cycle (e.g., by a decrementer 1738 or plurality of decrement circuits driven by a clock signal 599). Each release time is monitored by a comparator 1742 which determines if the timer has reached zero.

An arbiter (1732) monitors the outputs of the comparators 1742 to determine which buffer IDs 1734 are available. After a buffer request signal 233 is received from an ingress processor 220, it is selected by an arbiter 839 (e.g., in round-robin order). The selected buffer request signal 848 is applied to the enable input of the arbiter 1732, causing it to select and output a buffer ID 1734.

A delay element 1750 outputs a pulse based on the selected buffer request signal 848, on the next cycle of the clock after the selected buffer request signal 848 is asserted. The delayed signal is output to a demultiplexer 841. In accordance with the ingress processor selected (indicated by selection 840), the demultiplexer outputs the delayed signal as the write strobe 678. While the delayed signal is asserted, an AND gate 1754 deasserts the enable input of the arbiter 839, freezing the selection 840. Also, if no buffers are available, the AND gate 1754 deasserts the enable input of the arbiter 839.

The buffer available output signals 1743 of the comparators 1742 may be summed by the OR gate 1744 to produce the buffer available signal 232, which will be asserted if any buffer IDs are available. When a deterministic buffer pool allocator is used, all of the egress processors associated with the deterministic allocator can omit the circuitry associated with releasing buffer IDs. The assertion of the write strobe 678 causes a circuit comprising a timer set circuit 1740 and a demultiplexer 1740 to reset the time 1736 of the currently selected buffer ID.

As a variation of the deterministic buffer pool allocator 1740, a circular buffer of the buffer pool allocator can be modified so that each slot stores a buffer ID and a time value based on the output of a free running timer driven by the clock 599. When a buffer ID reaches a front of the queue, a comparison may be made between the stored time value and the current time value. Once the requisite number of clock cycles have transpired, the buffer ID is assigned. The buffer ID slot changes from being the front of the queue to the back of the queue, with an updated current time value.

In some systems that include a device with an L1 router 142, it may be desirable to have ingress processors tied to external ports not accept the last buffer when a packet is destined for an external destination, but to accept the last buffer for packets originating within the device, even if the packet is destined for an external destination. So loopback, outbound, and inbound packets can use the last buffer, but pass-through packets cannot. In some implementations, ingress processors may use a different threshold and decide to accept a buffer by comparing a number of available buffers to a threshold instead of accepting a buffer depending on whether it is a last available buffer.

The L1 routers 102 and 142 have been described in the context of device 100, where internal egress ports are used for routing to destinations within the device 100 and external egress ports are used for routing to destinations outside of the device 100, However, the principles of operation disclosed herein are applicable to any router where the egress ports are divided into more than one set. For example, a stand-alone router might have a first set of ports used to communicate with local devices, and a second set of ports used to communicate with remote devices. The first set of ports can be treated as internal ports (e.g., 111), and the second set of ports can be treated as external ports (e.g., 103/104).

Local devices can be distinguished from remote devices in a variety of ways. Local/collocated devices will be connected directly to the router or be communicably connected to the router through one or more limited-distance wired or wireless network connections. Examples of limited distance networks include Local Area Networks (LANs) and Personal Area Networks (PANs). Local devices will have addresses related to the router and/or assigned by the router. Typically, if the router has a firewall, the first set of ports would be on the "inside" of the firewall. In comparison, remote devices may be communicably connected via a long distance network such as the Internet or communicably connected via a limited distance network by way of another router. The addresses of remote devices are independent of those of the router. Typically, if the router has a firewall, the second set of ports would be on the "outside" of the firewall.

Although the data queues and identifier queues discussed herein in connection with device 100 are circular queues, other FIFO queue architectures may be used such as shift register queues. A shift register queue comprises a series of registers, where each time a slot is dequeued, all of the contents are copied forward. With shift register queues, the slot constituting the "front" is always the same, with only the back pointer changing. However, circular queues may have advantages over shift register queues, such as lower power consumption, since copying multiple descriptors from slot-to-slot each time a packet 430*b* is dequeued increases power consumption relative to the operations of a circular queue.

As an alternative to a hardware implementation, components of the disclosed system, such as the schedulers 621 and 622, the buffer pool allocators 240, 241, and 1640, the reservation arbiter 264, and the queue controllers, may be stored in memory as firmware or software and implemented as a computer method, or as an article of manufacture such as a memory device or non-transitory computer readable storage medium. The computer readable storage medium may be readable by a processor and may comprise instructions for causing the processor to perform processes described in the present disclosure. The computer readable storage medium may be implemented by a volatile computer memory, non-volatile computer memory, hard drive, solid-state memory, flash drive, removable disk and/or other media. Components may also be implemented as a mix of hardware and software, with some components implemented as sequential logic circuit and other components implemented as an executed program. Sequential logic may be constructed in many different ways, including logic implemented as a field-programmable gate array (FPGA), other programmable logic devices (PLD), or an application-specific integrated circuit (ASIC).

To accommodate the high speeds at which the L1 routers 102 and 142 may operate, it is contemplated that the various queues illustrated in FIGS. 2A to 2D, 5, 8A, 8B, 10, and 13 will be hardware queues. An advantage of hardware queues over software queues is the ease with which multiple operations may be performed within a single clock-cycle: the change of a state of one signal can ripple through the queue's control circuit to alter multiple circuit states. For example, a single signal assertion can advance a front/back pointer, adjust the depth value, reset a read or write circuit, trigger assertion of a congestion signal, and trigger assertion of a signal indicating that the queue contains data—all within a single clock cycle using relative simple and efficient circuitry. However, the general principles set forth would also work with processor-implemented software-controlled queues, so a mix of hardware queues and software-controlled queues may also be used.

The specific logic circuits illustrated in the figures are intended to provide an example of how the egress port reservation process may be implemented in a router. These examples are meant to be illustrative and were chosen to explain the principles operation. They are not intended to be exhaustive or to limit the disclosure. Many modifications and variations may be apparent to those of skill in the art. Persons having ordinary skill in the field of computers, microprocessor and router design, and network architectures should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Different logic and logic elements can be interchanged for the illustrated logic while achieving the same results. For example, instead of using a digital comparator to determine whether a value is zero, the data lines conveying the value can be input into a NOR gate, the output of which will be asserted when the binary value across the data lines equals zero. Further, programmed logic and/or a processor executing program code stored in memory may be substituted for some or all of the illustrated logic to perform substantially the same operations.

As is known in the art, "states" in binary logic may be represented by two voltage levels: high or low. The example circuits herein are discussed in the context of a positive logic convention, sometimes referred to as "active high," where a "true" or "asserted" signal equals high, and a "false" or "deasserted" signal equals low. However, the principles disclosed herein are equally applicable to a negative logic convention, sometimes referred to as "active low," where a "true" equals low and a "false" equals high.

As used in this disclosure, the term "a" or "one" may include one or more items unless specifically stated otherwise. Further, the phrase "based on" is intended to mean "based at least in part on" unless specifically stated otherwise.

What is claimed is:

1. A method, performed by a router having an ingress port, a plurality of buffers, a first set of egress ports and a second set of egress ports, comprising:
receiving first data at the ingress port;
determining to route the first data to a first egress port of the first set of egress ports;
requesting a first buffer of the plurality of buffers;
determining that a number of available buffers of the plurality of buffers is less than a threshold;
declining the request for the first buffer;
receiving second data at the ingress port;
determining to route the second data to the first egress port of the first set of egress ports;
requesting a second buffer of the plurality of buffers;
determining that a number available buffers of the plurality of buffers is greater than or equal to the threshold;
granting the request for the second buffer;
transferring the second data from the ingress port to the first egress port using the second buffer;
receiving third data at the ingress port;
determining to route the third data to a second egress port of the second set of egress ports;
requesting a third buffer of the plurality of buffers;
granting the request for the third buffer, wherein a number of available buffers of the plurality of buffers is less than the threshold; and
transferring the third data from the ingress port to the second egress port using the third buffer.

2. The method of claim 1, wherein:
the router is part of a device;
the first set of egress ports are external egress ports used for data addressed to destinations outside of the device; and
the second set of egress ports are internal egress ports used for data addressed to destinations inside the device.

3. The method of claim 1, wherein the first egress port is associated with an egress identifier queue and wherein the method further comprises:
enqueueing an identifier of the second buffer into the egress identifier queue; and
wherein transferring the second data from the ingress port to the first egress port using the second buffer further comprises reading the identifier of the second buffer from the egress identifier queue.

4. The method of claim 1, wherein the transferring of the second data from the ingress port to the first egress port using the second buffer comprises:
copying the second data from an ingress data queue associated with the ingress port to the second buffer;
copying the second data from the second buffer into an egress data queue associated with the first egress port; and
outputting the second data from the egress data queue via the first egress port.

5. The method of claim 4, further comprising:
releasing the second buffer prior to completing the copying of the second data from the second buffer into the egress data queue.

6. The method of claim 4, wherein the second data comprises a header and a payload, the method further comprising:
determining a length of the second data using the header;
setting a counter based on a number of clock cycles needed to copy the second data from the second buffer into the egress data queue based on the length of the second data;
decrementing a count of the counter as the second data is copied to the egress data queue; and
releasing the second buffer based on a value of the count.

7. The method of claim 6, further comprising:
determining that an entity of the second data has been copied to the egress data queue;

determining that the count is not equal to zero upon the entirety of the second data having been copied; and indicating that an error has occurred in response to the count not being zero upon the entirety of the second data having been copied.

8. The method of claim 1, further comprising:

waiting for an indication that the second buffer is available before requesting the second buffer; and receiving the indication that the second buffer is available.

9. The method of claim 1, wherein determining to route the first data to a first egress port of the set of egress ports comprises selecting the first egress port based on a destination address in the first data.

10. A router comprising:

an ingress port;

a plurality of buffers;

a first set of egress ports and a second set of egress ports; and wherein the router is configured to:

receive first data at the ingress port;

determine to route the first data to a first egress port of the first set of egress ports;

allocate a first buffer of the plurality of buffers for routing the first data based on (i) a destination of the first data being associated with the first set of egress ports and (ii) a number of available buffers of the plurality of buffers being greater than or equal to the threshold;

route the first data to the first egress port using the first buffer;

receive second data at the ingress port;

determine to route the second data to a second egress port of the second set of egress ports; and allocate a second buffer of the plurality of buffers for routing the second data based on a destination of the second data being associated with the second det of egress ports, wherein the allocation of the second buffer is not based on a number of available buffers of the plurality of buffers being greater than or equal to a threshold.

11. The router of claim 10, further comprising:

an ingress processor associated with the ingress port;

a buffer allocator; and an egress processor associated with the first egress port;

wherein:

the ingress processor is configured to request the first buffer from the buffer allocator;

the ingress processor is configured to copy the first data to the first buffer; and the egress processor is configured to copy the first data from the first buffer.

12. The router of claim 11, further comprising:

an ingress data queue associated with the ingress processor;

an egress data queue associated with the egress processor;

wherein:

the ingress processor is configured to copy the first data from the ingress data queue to the first buffer; and the egress processor is configured to copy the first data from the first buffer to the egress data queue.

13. The router of claim 11, wherein:

the ingress processor is configured to write an identifier of the first buffer to a buffer identifier queue; and the egress processor is configured to read the identifier of the first buffer from the buffer identifier queue.

14. The router of claim 11, wherein the ingress processor is configured to request a reservation from the egress processor for routing the first data to the egress port.

15. The router of claim 10, wherein:

the first set of egress ports are external egress ports used for data addressed to destinations outside of a device; and the second set of egress ports are internal egress ports used for data addressed to destinations inside of a device.

16. The router of claim 10, wherein the router is configured to release the first buffer prior to completion of the copy of the first data from the first buffer.

17. The router of claim 16, wherein the router is configured to:

determine a length of the first data;

modify a counter as the first data is copied from the first buffer; and release the first buffer for reallocation in response to a value of the counter equaling a preconfigured value.

18. The router of claim 10, wherein the first data comprises a destination address, and the router is configured that the first data is to be routed to the first egress port based on the destination address.

19. The router of claim 10, wherein the threshold is two.

* * * * *